United States Patent [19]
Tamura et al.

[11] Patent Number: 6,093,784
[45] Date of Patent: Jul. 25, 2000

[54] ELECTROPHOTOGRAPHIC PHOTOCONDUCTOR AND POLYCARBONATE RESIN FOR USE THEREIN

[75] Inventors: Hiroshi Tamura, Susono; Tomoyuki Shimada, Shizuoka-ken; Tsutomu Nakajima, Yokohama; Masaomi Sasaki, Susono; Toshimasa Tokuda, Iyo, all of Japan

[73] Assignee: Ricoh Company, Ltd., Tokyo, Japan

[21] Appl. No.: 08/361,538

[22] Filed: Dec. 22, 1994

[30] Foreign Application Priority Data

Dec. 22, 1993 [JP] Japan .................................. 5-345597
Dec. 22, 1993 [JP] Japan .................................. 5-346500
Apr. 4, 1994 [JP] Japan .................................. 6-089152
Jul. 8, 1994 [JP] Japan .................................. 6-180969

[51] Int. Cl.$^7$ .................................................. C08G 63/02
[52] U.S. Cl. .............................. 528/196; 430/58; 430/59; 528/199
[58] Field of Search ........................ 430/58, 59; 528/196, 528/199

[56] References Cited

U.S. PATENT DOCUMENTS

| | | |
|---|---|---|
| 4,957,838 | 9/1990 | Aruga et al. . |
| 4,959,290 | 9/1990 | Aruga et al. . |
| 4,992,350 | 2/1991 | Sasaki et al. . |
| 4,996,362 | 2/1991 | Sasaki et al. . |
| 5,047,590 | 9/1991 | Shimada et al. . |
| 5,072,061 | 12/1991 | Sasaki et al. . |
| 5,097,022 | 3/1992 | Sasaki et al. . |
| 5,098,807 | 3/1992 | Shimada et al. . |
| 5,166,438 | 11/1992 | Hashimoto et al. . |
| 5,219,692 | 6/1993 | Shimada et al. . |
| 5,233,090 | 8/1993 | Shimada et al. . |
| 5,260,156 | 11/1993 | Hashimoto et al. . |
| 5,334,470 | 8/1994 | Shimada et al. . |
| 5,344,985 | 9/1994 | Tanaka et al. . |
| 5,370,954 | 12/1994 | Ohta et al. . |
| 5,382,692 | 1/1995 | Shimada et al. . |

FOREIGN PATENT DOCUMENTS

| | | |
|---|---|---|
| 610885 | 8/1994 | European Pat. Off. . |
| 610912 | 8/1994 | European Pat. Off. . |
| 06234840 | 8/1994 | Japan . |

*Primary Examiner*—Terressa Mosley
*Attorney, Agent, or Firm*—Oblon, Spivak, McClelland, Maier & Neustadt, P.C.

[57] ABSTRACT

An electrophotographic photoconductor is composed of an electroconductive support and a photoconductive layer formed thereon, which photoconductive layer includes a polycarbonate resin. Aromatic polycarbonate resins not only for the electrophotographic photoconductor, but also for the materials for liquid display panels, optical cards, optical discs, varieties of films having high transparency and heat resistance, deposited plastic reflecting mirrors, and lenses are disclosed.

28 Claims, 20 Drawing Sheets

ELECTROPHOTOGRAPHIC PHOTOCONDUCTOR AND POLYCARBONATE RESIN FOR USE THEREIN

BACKGROUND OF THE INVENTION

1. Field of the Invention

The present invention relates to an electrophotographic photoconductor with excellent electric characteristics, abrasion resistance and durability and high photosensitivity, and polycarbonate resin for use therein.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a low-molecular-weight charge transporting material (CTM) which is dissolved with a predetermined concentration in a binder resin. The addition of the charge generating material (CTM) to the binder resin lowers the intrinsic mechanical strength of the binder resin, so that the CTL film is fragile and has a low tensile strength. Such lowering of the mechanical strength of the CTL causes the wearing of the photoconductor and the peeling of the CTL away from the photoconductor or forms scratches and cracks in the surface of the photoconductor.

It has been proposed to polymerize the charge transporting material (CTM). For instance, M. Stolka et al. have proposed polyvinyl carbazole, polyvinyl anthracene, and polyvinyl pyrene as such polymerized charge transporting materials as reported in J. Polym. Sci. Vol 21.969. Vinyl polymers of hydrazone are described in Japan Hard Copy '89, page 67. Furthermore, polymerization of charge transporting materials (CTM) have been tried as disclosed in U.S. Pat. Nos. 4,801,517, 4,937,165, 4,959,288, 5,030,532, 5,034,296, and 5,080,989, and in Japanese Laid-Open Patent Applications 64-9964, 3-221522, 2-304456, 4-11627, 4-175337, 4-183719, 4-31404, and 4-133065. The polymerized charge transporting materials have not yet been used in practice.

M. A. Abkowitz et al. reported in PHYSICAL REVIEW B VOL46, 6705 that the drift mobility of a polymerized CTM is smaller by one figure than that of a charge transporting material comprising a low-molecular-weight CTM and a binder resin in which the low-molecular-weight CTM is dispersed. It is considered that this indicates that such a polymerized CTM is unsatisfactory for use in practice with respect to the photosensitivity and residual potential thereof.

Furthermore, there has been proposed a method comprising the steps of dispersing a low-molecular-weight CTM in a binder resin, and then curing the binder resin. This method, however, has not yet provided a practical solution to the problem of the wearing of the photoconductor because the CTM is detached from the binder resin due to the concentration of the CTM as high as 30 to 50 wt. % and the insufficient curing reaction of the binder resin.

Conventionally known representative aromatic polycarbonates are obtained by allowing 2,2-bis(4-hydroxyphenyl)propane (hereafter referred to as bisphenol A) to react with a carbonate precursor material such as phosgene or diphenylcarbonate. Such polycarbonates made from bisphenol A are used in many fields because of excellent characteristics, such as high transparency, high heat resistance and dimensional stability.

However, recently, there is a keen demand for an aromatic polycarbonate resin with higher heat resistance and better optical characteristics such as light transparency.

In order to obtain an aromatic polycarbonate resin having higher heat resistance than that of the conventional aromatic polycarbonate resins made from bisphenol A, varieties of aromatic polycarbonates have been proposed, which are produced by use of a bivalent phenol instead of bisphenol A.

However, such aromatic polycarbonates are not satisfactory for use in practice.

SUMMARY OF THE INVENTION

It is therefore a first object of the present invention to provide an electrophotographic photoconductor with improved electric characteristics, abrasion resistance and durability and high photosensitivity.

A second object of the present invention is to provide a polycarbonate resin with excellent transparency and heat resistance, which can be used not only in the above-mentioned electrophotographic photoconductor as a binder agent for an organic photoconductor, but also in liquid crystal panels, optical cards, optical discs, and varieties of films.

The first object of the present invention can be achieved by an electrophotographic photoconductor comprising an electroconductive support and a photoconductive layer formed thereon, which photoconductive layer comprises a polycarbonate resin of formula (I):

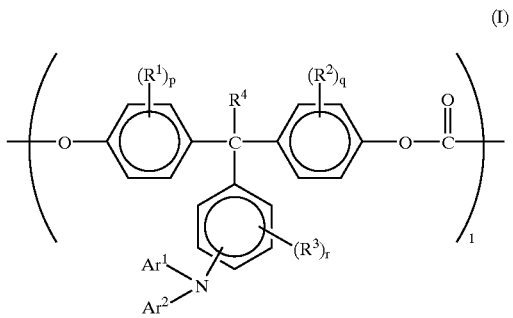

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; and l is an integer of 5 to 10,000.

The first object of the present invention can also be achieved by an electrophotographic photoconductor comprising an electroconductive support and a photoconductive layer formed thereon, which photoconductive layer comprises a copolymer polycarbonate resin of formula (II):

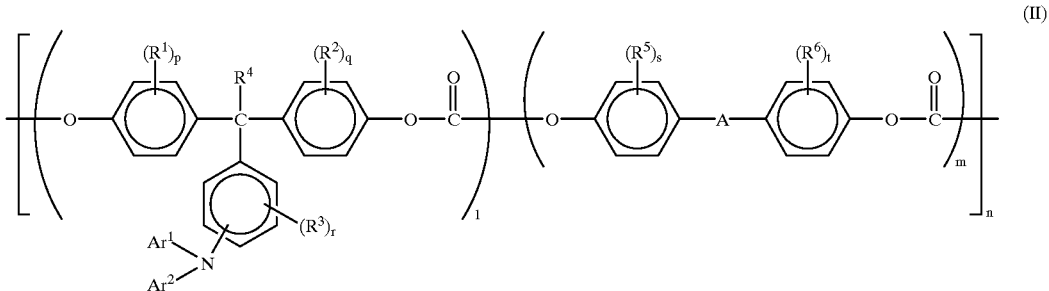

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer of 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; and l is an integer of 5 to 10,000.

The second object of the present invention can also be achieved by a copolymer polycarbonate resin of formula (II):

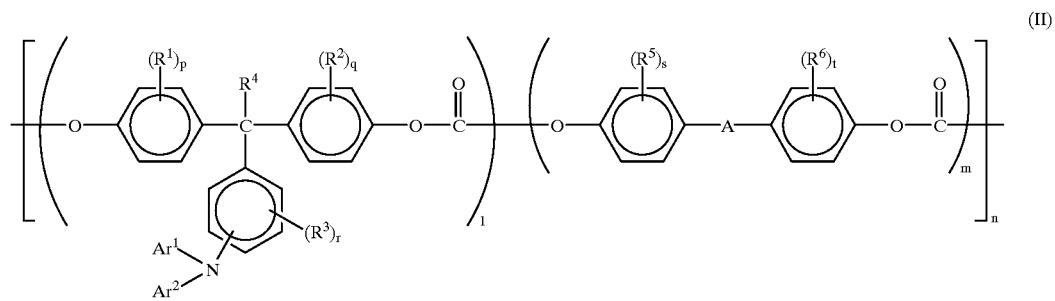

The second object of the present invention can be achieved by a polycarbonate resin of formula (I):

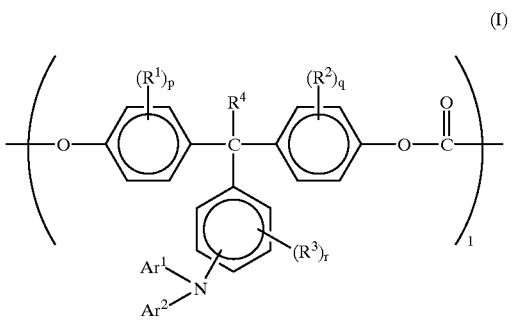

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer of 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

Furthermore, the second object of the present invention can be achieved by an aromatic polycarbonate resin comprising a repeating unit of formula (1):

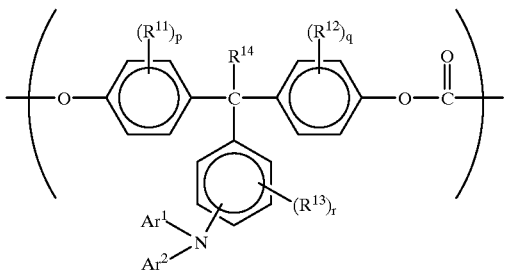

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; $Ar^1$ and $Ar^2$ each represents an unsubstituted or substituted aromatic hydrocarbon group; and a methylene chloride solution of the polycarbonate resin, which is prepared by dissolving 0.7 g of the polycarbonate resin in 100 ml of methylene chloride, having a specific viscosity in a range of 0.068 to 1.04 at 20° C.

Furthermore, the second object of the present invention can be achieved by an aromatic polycarbonate resin comprising:

a repeating unit of formula (1):

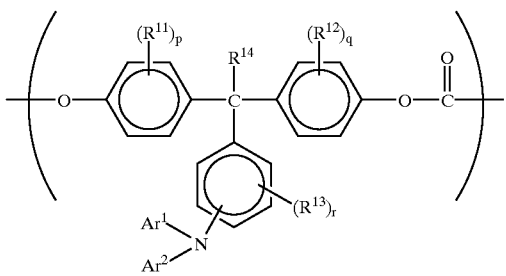

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; $Ar^1$ and $Ar^2$ each represents an unsubstituted or substituted aromatic hydrocarbon group; and a repeating unit of formula (2):

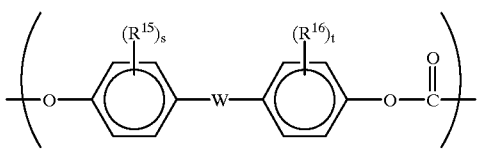

wherein $R^{15}$ and $R^{16}$ each independently represents a hydrocarbon group having 1 to 5 carbon atoms, or a halogen atom; s and t each independently is an integer of 0 to 4; W represents a single bond, a straight chain, branched or cyclic bivalent hydrocarbon group having 1 to 12 carbon atoms, which may comprise a benzene ring therein, an oxide group, a sulfide group, a sulfoxide group, a sulfone group, or a ketone group; a methylene chloride solution of the aromatic polycarbonate resin, which is prepared by dissolving 0.7 g of the aromatic polycarbonate resin in 100 ml of methylene chloride, having a specific viscosity in a range of 0.168 to 1.04 at 20° C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
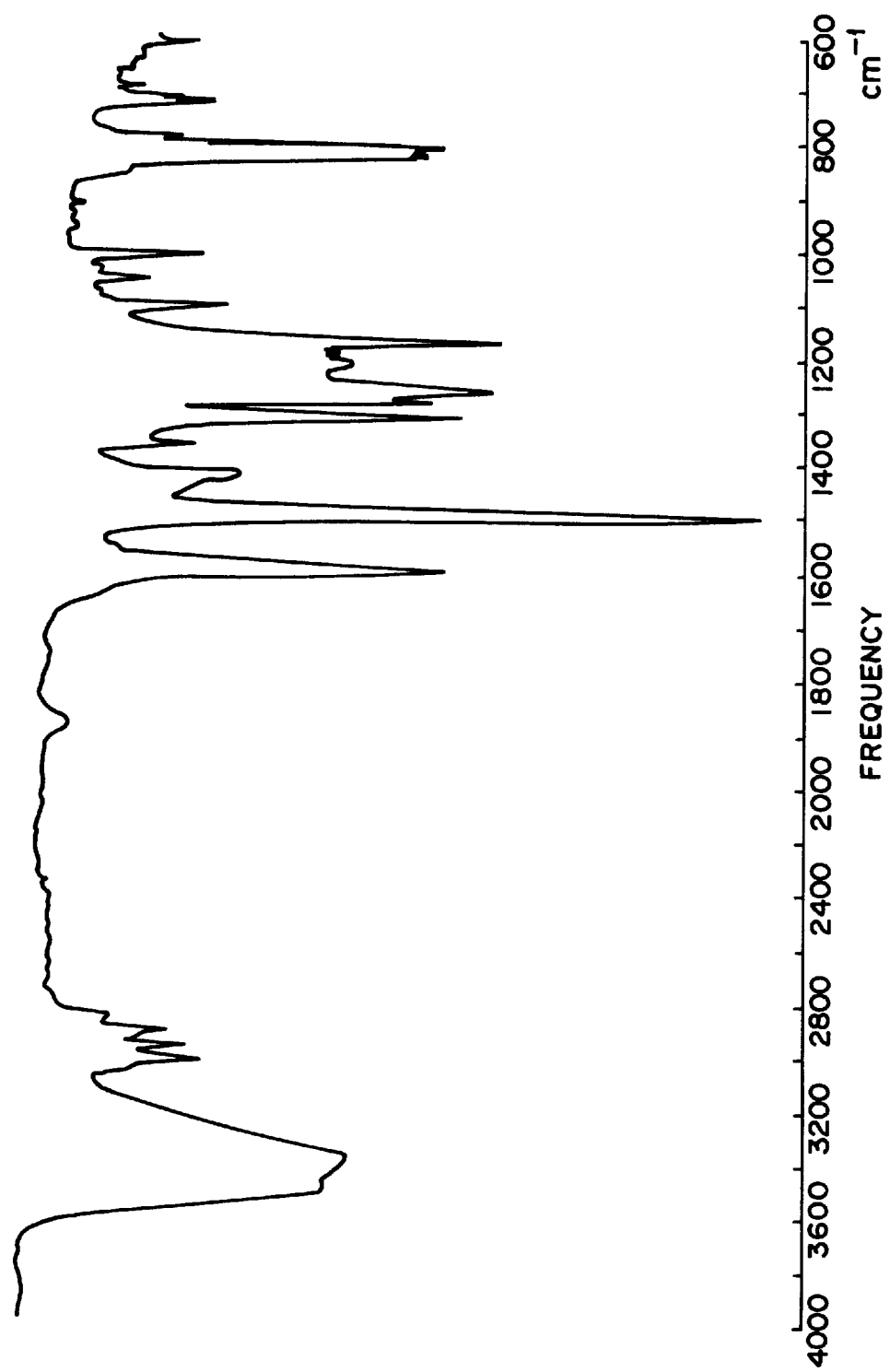
FIG. 1 is an infrared spectrum of a bisphenol compound synthesized in Production Example 1.

An electrophotographic photoconductor of the present invention comprises an electroconductive support and a photoconductive layer formed thereon, which photoconductive layer comprises a polycarbonate resin of formula (I):

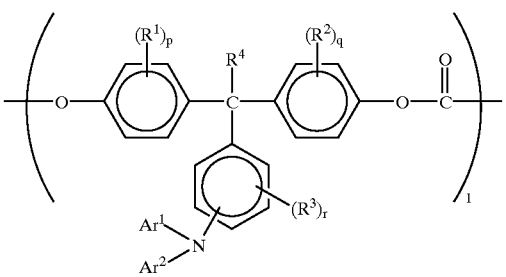

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; and l is an integer of 5 to 10,000.

In the above electrophotographic photoconductor of the present invention, the polycarbonate resin of the above formula (I) may be replaced by a polycarbonate resin of the following formula (II):

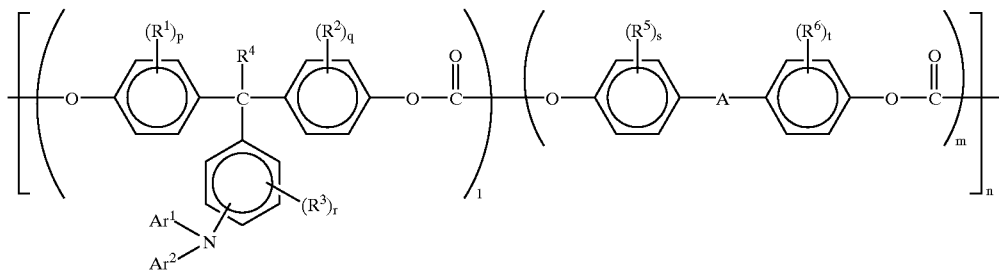

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer of 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

The above polycarbonate resins of formula (I) and (II) have a charge transporting function and a high mechanical strength, so that the electrophotographic photoconductor according to the present invention has high photosensitivity and high durability.

The polycarbonate resin of formula (I) is a charge-carrier transporting polycarbonate compound having a triarylamine skeleton serving as a hopping site in a side chain thereof.

The polycarbonate resin of formula (I) can be synthesized in any of the following reaction schemes I, II, and III:

Reaction Scheme I in which $Ar^1$ and $Ar^2$ are the same

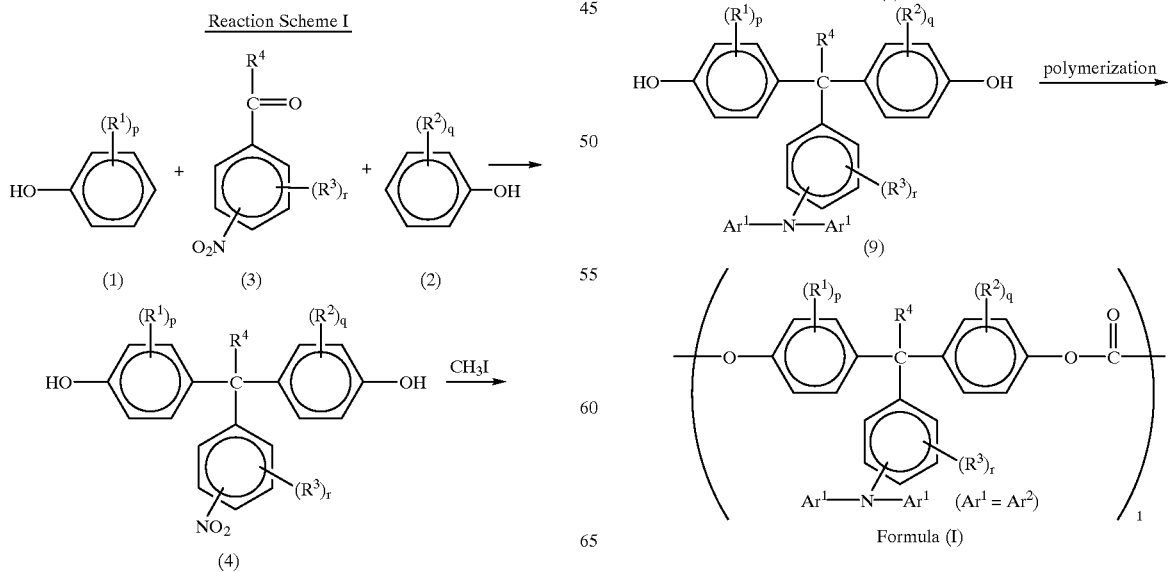

In the above Scheme I, the phenol compounds (1) and (2) are allowed to react with, for instance, the nitroacetophenone compound (3) in the presence of hydrogen chloride gas to produce 1,1-bis(4-hydroxyphenyl)-1-(nitrophenyl)ethane compound (4).

The hydroxyl groups are then methylated so that the methylated compound (5) is obtained. The methylated compound (5) is then subjected to a catalytic reduction in the presence of palladium carbon and hydrogen to reduce the nitro group, whereby an amino compound (6) is obtained. The amino compound (6) is then allowed to react with an aryl compound (7) of formula $Ar^1$-X in which X is a halogen atom, in accordance with the Ulmann condensation reaction, whereby a diaryl amino compound (8) is obtained. The diaryl amino compound (8) is then subjected to demethylation, for instance, by use of sodium thioethylate, to obtain a hydroxy compound (9). The thus obtained hydroxy compound (9) is then polymerized with phosgene by interfacial polymerization, or by the ester interchange with diester carbonate, whereby the polycarbonate resin of formula (I) is synthesized.

Reaction Scheme II in which $Ar^1$ and $Ar^2$ are different

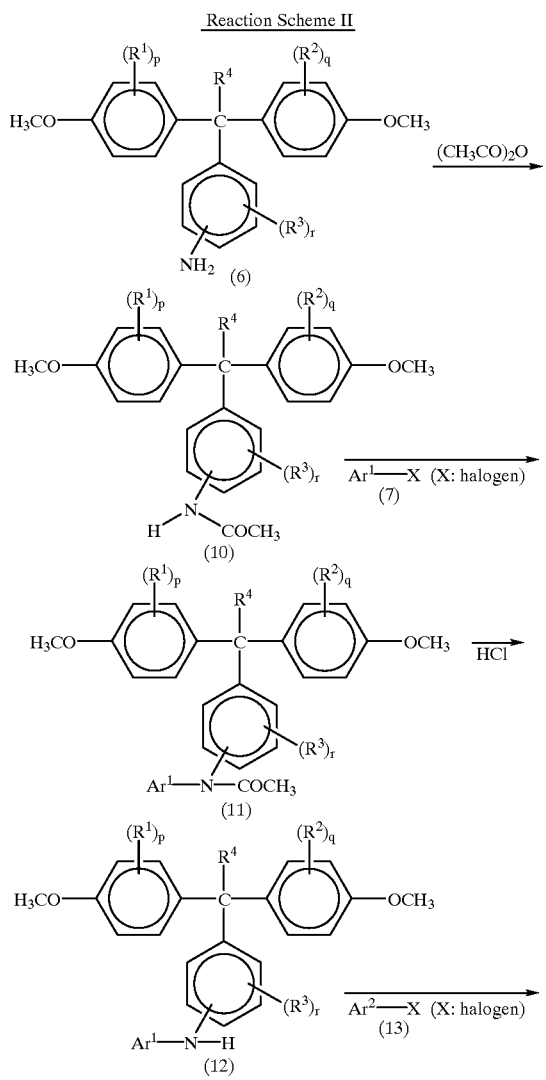

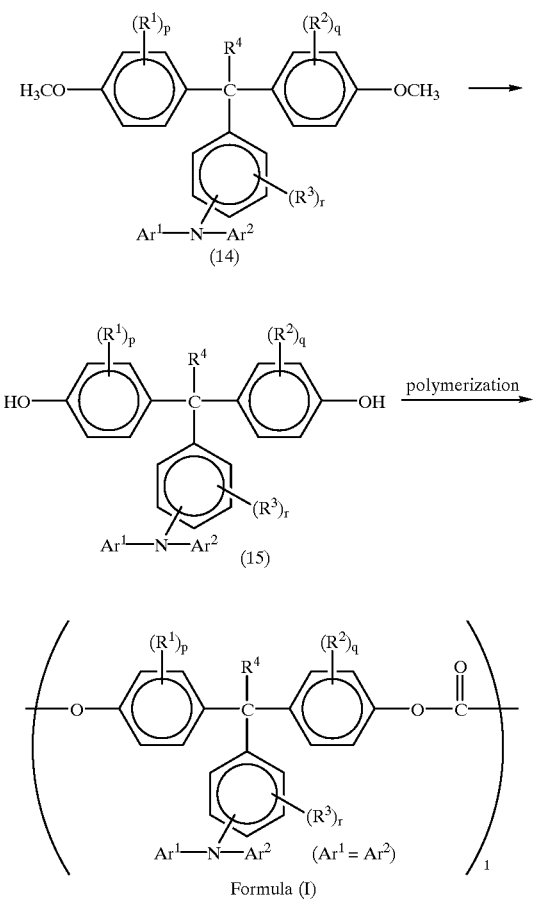

Reaction Scheme III in which $Ar^1$ and $Ar^2$ are different

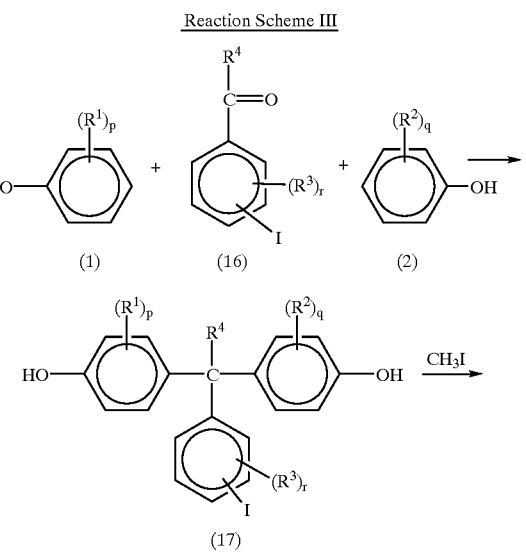

-continued

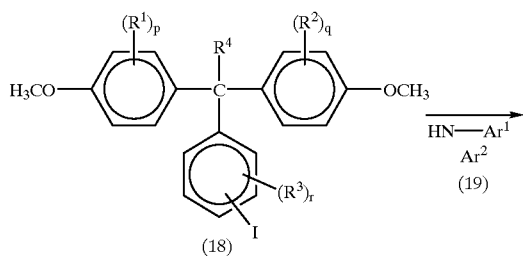

(18)

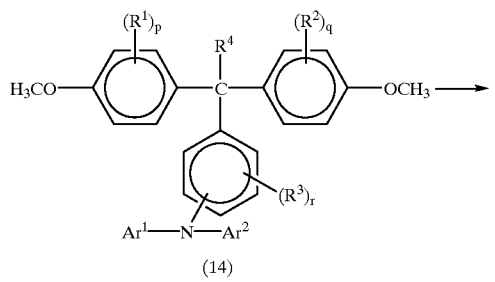

(14)

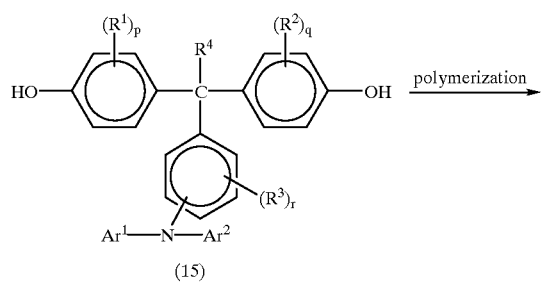

(15)

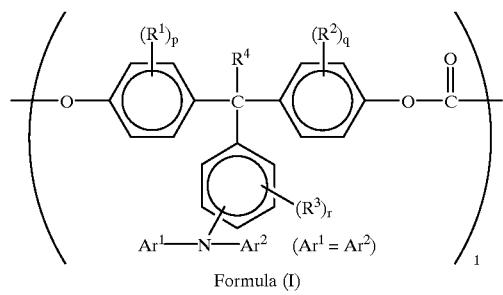

Formula (I)

The hydroxy compound (15) is polymerized with phosgene by interfacial polymerization, or by the ester interchange with diester carbonate, whereby the polycarbonate resin of formula (I) is synthesized.

In formula (I), specific examples of the halogen atom represented by $R^1$, $R^2$, or $R^3$ are fluorine, chlorine, bromine and iodine.

The alkyl group represented by $R^1$, $R^2$, $R^3$ or $R^4$ may be a straight chain or branched alkyl group with 1 or 12 carbon atoms.

Furthermore, the alkyl group represented by $R^1$, $R^2$, $R^3$ or $R^4$ may have a substituent selected from the group consisting of a fluorine atom, cyano group, phenyl group, a halogen atom, and a phenyl group substituted with an alkyl group having 1 or 4 carbon atoms.

Specific examples of the unsubstituted or substituted alkyl group represented by $R^1$, $R^2$, $R^3$ or $R^4$ are methyl group, ethyl group, n-propyl group, i-propyl group, n-butyl group, i-butyl group, s-butyl group, t-butyl group, trifluoromethyl group, 2-cyanoethyl group, benzyl group, 4-chlorobenzyl group, 4-methylbenzyl group, and 4-phenyl benzyl group.

Specific examples of the aryl group represented by $R^1$, $R^2$, $R^3$, $R^4$, $Ar^1$ or $Ar^2$ are phenyl group, naphthyl group, biphenylyl group, terphenylyl group, pyrenyl group, fluorenyl group, azurenyl group, triphenylenyl group, chrysenyl group, and anthryl group. The aryl group represented by $R^1$, $R^2$, $R^3$, $R^4$, $Ar^1$ or $Ar^2$ may have a substituent selected from the group consisting of the above-mentioned halogen atoms represented by $R^1$, $R^2$, or $R^3$, the alkyl groups represented by $R^1$, $R^2$, $R^3$ or $R^4$ and the above-mentioned substituents thereof.

As mentioned previously, in the electrophotographic photoconductor of the present invention, the following polycarbonate resin of the following formula (II) can alternatively employed:

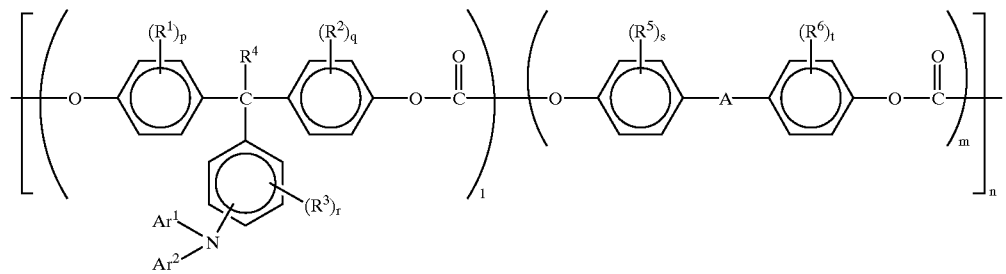

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer of 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

The following moiety of formula (IIa) of the polycarbonate resin of formula (II),

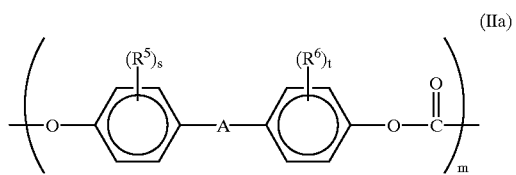
(IIa)

is prepared from the following hydroxy compound of formula (IIb):

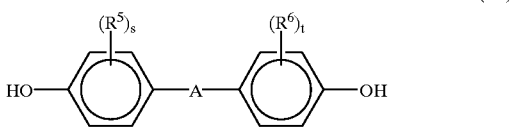
(IIb)

wherein $R^5$ and $R^6$ each independently represents a hydrogen atom, an unsubstituted or substituted alkyl group, an unsubstituted or substituted aryl group, or a halogen atom; s and t each independently is an integer or 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group.

Specific examples of the above hydroxy compound of formula (IIb) are as follows:

2,2-bis(4-hydroxyphenyl)propane,
2,2-bis(3-methyl-4-hydroxyphenyl)propane,
2,2-bis(3,5-dimethyl-4-hydroxyphenyl)propane,
2,2-bis(4-hydroxyphenyl)hexafluoropropane,
2-(3-hydroxyphenyl)-2-(4-hydroxyphenyl)propane,
1,1-bis(4-hydroxyphenyl)cyclohexane,
1,1-bus(3-methyl-4-hydroxyphenyl)cyclohexane,
1,1-bis(4-hydroxyphenyl)-3,5,5-trimethylcyclohexane,
1,1-bis(4-hydroxyphenyl)ethane,
1,1-bis(3-methyl-4-hydroxyphenyl)ethane,
2,2-bis(3,5-dibromo-4-hydroxyphenyl)propane,
2,2-bis(3-chloro-4-hydroxyphenyl)propane,
2,2-bis(3-allyl-4-hydroxyphenyl)propane,
1,1-bis(4-hydroxyphenyl)-1-phenylethane,
1,1-bis(3-methyl-4-hydroxyphenyl)-1-phenylethane,
Bis(4-hydroxyphenyl)methane, and 4,4'-dihydroxytriphenylmethane.

In addition, as such hydroxy compounds, there can be employed 4,4'-dihydroxydiphenylether, 4,4'-dihydroxydiphenylthioether, 4,4'-dihydroxydiphenylsulfone, 4,4'-dihydroxy-benzophenone, 4,4'-dihydroxydiphenyl, and bisphenol compounds described, for instance, in J. Appl. Poly. Sci. Vol. 39 2083, Angew. Chem. Int. Ed. Engl. 30 (1991) 1598.

Specific examples of monomers for the preparation of the polycarbonate resin of formula (I) are shown in the following TABLE 1:

TABLE 1
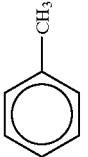
| No. | R¹ | p | R² | q | R³ | r | R⁴ | Position of N | Ar¹ | Ar² |
|---|---|---|---|---|---|---|---|---|---|---|
| 1 | H | 1 | H | 1 | H | 1 | $CH_3$ | 4″ | 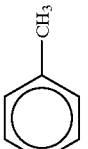 | 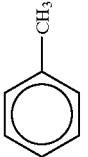 |
| 2 | 3-$CH_3$ | 1 | 3'-$CH_3$ | 1 | H | 1 | $CH_3$ | 4″ | 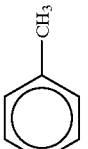 | 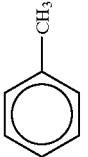 |
| 3 | H | 1 | H | 1 | H | 1 | $CH_3$ | 4″ | 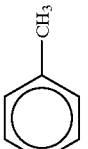 | 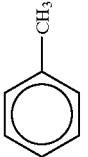 |
| 4 | H | 1 | H | 1 | H | 1 | $CH_3$ | 4″ | 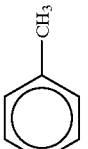 | 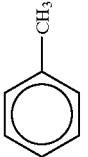 |
| 5 | H | 1 | H | 1 | H | 1 | $CH_3$ | 4″ | 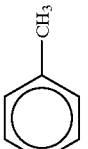 | |

TABLE 1-continued

| No. | R¹ | p | R² | q | R³ | r | R⁴ | Position of N | Ar¹ | Ar² |
|---|---|---|---|---|---|---|---|---|---|---|
| 6 | H | 1 | H | 1 | H | 1 | $CH_3$ | 4" | 4-methylbiphenyl | 4'-methylbiphenyl |
| 7 | H | 1 | H | 1 | H | 1 | $CH_3$ | 4" | 4-methylbiphenyl | 4-methylbiphenyl |
| 8 | 3-$CH_3$ | 1 | 3'-$CH_3$ | 1 | H | 1 | $CH_3$ | 4" | 4-methylbiphenyl | 4-methylbiphenyl |
| 9 | H | 1 | H | 1 | H | 1 | H | 4" | 4-methylphenyl | 4-methylphenyl |
| 10 | H | 1 | H | 1 | H | 1 | H | 4" | 4-methylbiphenyl | 4-methylbiphenyl |
| 11 | H | 1 | H | 1 | H | 1 | H | 4" | 4-methylphenyl | 4'-methylbiphenyl |

TABLE 1-continued

| No. | R¹ | p | R² | q | R³ | r | R⁴ | Position of N | Ar¹ | Ar² |
|---|---|---|---|---|---|---|---|---|---|---|
| 12 | H | 1 | H | 1 | H | 1 | H | 4″ | 4-CH₃-C₆H₄ | pyrenyl (methyl-substituted) |
| 13 | H | 1 | H | 1 | H | 1 | H | 4″ | 4-CH₃-C₆H₄ | 8-methylnaphth-1-yl |
| 14 | 3-CH₃ | 1 | 3′-CH₃ | 1 | H | 1 | H | 4″ | 4-CH₃-C₆H₄ | 4-CH₃-C₆H₄ |
| 15 | 3-CH₃, 5-CH₃ | 2 | 3′-CH₃, 5′-CH₃ | 2 | H | 1 | CH₃ | 4″ | 4-CH₃-C₆H₄ | 4-CH₃-C₆H₄ |
| 16 | 3-Br | 1 | 3′-Br | 1 | H | 1 | CH₃ | 4″ | 4-CH₃-C₆H₄ | 4-CH₃-C₆H₄ |

TABLE 1-continued
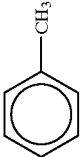
| No. | $R^1$ | p | $R^2$ | q | $R^3$ | r | $R^4$ | Position of N | $Ar^1$ | $Ar^2$ |
|---|---|---|---|---|---|---|---|---|---|---|
| 17 | 3-CH(CH$_3$)$_2$ | 1 | 3'-CH(CH$_3$)$_2$ | 1 | H | 1 | CH$_3$ | 4" | 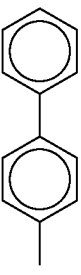 | 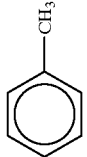 |
| 18 | 3-CH$_2$CH=CH$_2$ | 1 | 3'-CH$_2$CH=CH$_2$ | 1 | H | 1 | CH$_3$ | 4" | 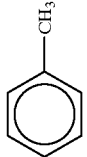 |  |
| 19 |  | 1 | 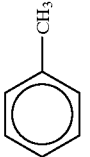 | 1 | H | 1 | CH$_3$ | 4" | 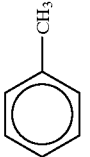 | 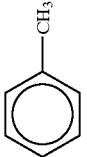 |
| 20 | H | 1 | H | 1 | H | 1 | 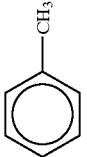 | 4" | 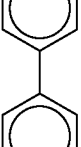 | 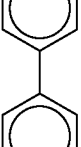 |
| 21 | H | 1 | H | 1 | H | 1 | CH$_3$ | 3" | | |
| 22 | H | 1 | H | 1 | H | 1 | CH$_3$ | 3" | | |

TABLE 1-continued
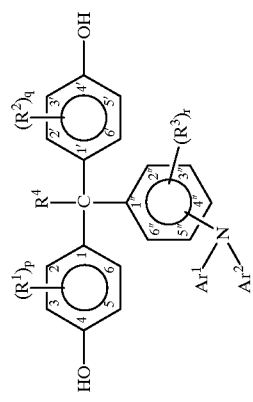
| No. | R¹ | p | R² | q | R³ | r | R⁴ | Position of N | Ar¹ | Ar² |
|---|---|---|---|---|---|---|---|---|---|---|
| 23 | H | 1 | H | 1 | H | 1 | H | 3" | 4-CH₃-C₆H₄ | 4-biphenyl |
| 24 | H | 1 | H | 1 | H | 1 | CH₃ | 3" | 4-CH₃-C₆H₄ | 3-CH₃-C₆H₄ |
| 25 | H | 1 | H | 1 | H | 1 | CH₃ | 4" | 4-CH₃-C₆H₄ | 3-CH₃-C₆H₄ |
| 26 | H | 1 | H | 1 | H | 1 | CH₃ | 4" | C₆H₅ | C₆H₅ |

In the present invention, not only the polycarbonate resin of formula (I), which is a homopolymer, but also copolymers prepared from the above-mentioned monomers for the polycarbonate resin of formula (I) and the previously mentioned hydroxy compound of formula (II$b$), can be employed. When such copolymers are employed, the copolymerization ratio, monomer species, the number of monomers, and the molecular weight thereof are determined in accordance with the desired electric characteristics, physical film properties, solubility, and solution characteristics, and the polymerization is not restricted to any specific polymerization such as random copolymerization, block copolymerization, and alternating copolymerization.

Specific examples of the hydroxy compound of formula (II$b$) for the above-copolymerization are shown in the following TABLE 2. Such hydroxy compounds for use in the present invention are not limited to those give in TABLE 2.

TABLE 2

| No. | Monomer for Copolymerization | Monomer No. in TABLE 1 | Copolymerization Ratio (Wt) |
|---|---|---|---|
| 1 | HO—⟨C₆H₄⟩—C(CH₃)₂—⟨C₆H₄⟩—OH | 1 | 1:1 |
| 2 | HO—⟨C₆H₄⟩—C(cyclohexyl)—⟨C₆H₄⟩—OH | 3 | 1:1 |
| 3 | HO—⟨C₆H₄⟩—C(CF₃)₂—⟨C₆H₄⟩—OH | 6 | 1:1 |
| 4 | HO—⟨C₆H₃(CH₃)⟩—C(CH₃)₂—⟨C₆H₃(CH₃)⟩—OH | 9 | 1:1 |
| 5 | HO—⟨C₆H₄⟩—CH(CH₃)—⟨C₆H₄⟩—OH | 4 | 1:0.7 |
| 6 | HO—⟨C₆H₄⟩—C(C₆H₅)₂—⟨C₆H₄⟩—OH | 22 | 1:1 |
| 7 | HOOC(CH$_2$)$_{19}$COOH | 4 | 1:10 |
| 8 | HO—⟨C₆H₄⟩—C(cyclohexyl)—⟨C₆H₄⟩—OH | 1 | 1:1 |

TABLE 2-continued

| No. | Monomer for Copolymerization | Monomer No. in TABLE 1 | Copolymerization Ratio (Wt) |
|---|---|---|---|
| 9 | 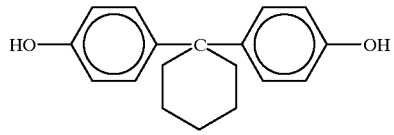 | 4 | 1:1 |
| 10 | 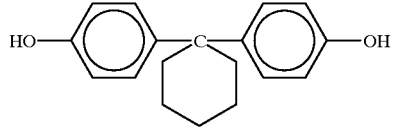 | 6 | 1:1 |
| 11 | 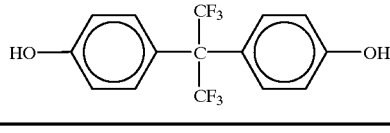 | 3 | 1:1 |

Generally, there are known the following four types of electrophotographic photoconductors:

(1) A negative-chargeable electrophotographic photoconductor comprising an electroconductive support, and a charge generation layer and a charge transport layer which are successively overlaid on the electroconductive support;

(2) A positive-chargeable electrophotographic photoconductor comprising an electroconductive support, and a charge transport layer and a charge generation layer which are successively overlaid on the electroconductive support;

(3) A single-layered positive-chargeable electrophotographic photoconductor comprising an electroconductive support and a photoconductive layer formed thereon, which photoconductive layer comprises a charge generating material and a charge transporting material which are dispersed in a binder resin; and (4) A negative-chargeable electrophotographic photoconductor comprising an electroconductive support, and a charge generation layer and a charge transport layer which are successively overlaid on the electroconductive support, and a protective layer which is provided on the charge transport layer.

The present invention can be applied to any of the above-mentioned types of electrophotographic photoconductors. More specifically, the polycarbonate resin for use in the present invention can be contained in the charge transport layer in the case of the negative-chargeable electrophotographic photoconductor (1), in the charge generation layer of the positive-chargeable electrophotographic photoconductor (2), in the photoconductive layer of the single-layered positive-chargeable electrophotographic photoconductor (3) and in the protective layer of the electrophotographic photoconductor (4), whereby the photosensitivities and durabilities thereof can be significantly improved.

The above-mentioned electrophotographic photoconductors will now be respectively explained in more detail.

When preparing the negative-chargeable electrophotographic photoconductor (1), it is preferable that the charge generation layer be prepared by pulverizing a charge generating material (CGM) in a ketone solvent such as methyl ethyl ketone or cyclohexanone, in an ether solvent such as tetrahydrofuran or dioxane, in an ester solvent such as ethyl acetate, in a halogenated solvent such as dichloroethane or chlorobenzene, or in an aromatic solvent such as toluene or xylene, in a ball mill, a beads mill, a vibration mill or the like, to particles with an average particle size of 0.3 μm or less, and by dispersing the pulverized CGM. In this case, a binder resin may be added to the above dispersion. Examples of the binder resin are polyvinyl butyral, polyvinyl acetal, cellulose derivatives, phenolic resin, epoxy resin, and acryl polyol.

When no binder resin is added to the dispersion, an intermediate layer is provided between the electroconductive support and the charge generation layer in order to prevent the charge injection from the electroconductive support to the charge generation layer.

Examples of a binder resin for the intermediate layer are polyamide, polyacrylanilide, casein, vinyl chloride/vinyl acetate/maleic acid copolymer, and phenolic resin.

The charge generation layer (CGL) can be provided by conventional coating methods such immersion coating method, spray coating method, and roll coating method. It is preferable that the thickness of the charge generation layer (CGL) be in a range of 0.005 to 5 μm, more preferably in a range of 0.05 to 1 μm.

The charge transport layer (CTL) can also be provided with a thickness of 15 to 50 μm by any of the above-mentioned coating methods on the charge generation layer (CGL).

When a low-molecular-weight charge transporting material is also employed, it is preferable that the amount of the low-molecular-weight charge transport material be in a range of 0.5 to 5 parts by weight to 10 parts by weight of the homopolymer type polycarbonate of formula (I) or the copolymer type polycarbonate of formula (II).

In the case of the positive-chargeable electrophotographic photoconductor (2), the charge generation layer (CGL) is a top layer, so that the polycarbonate resin of formula (I) or formula (II) is contained in the charge generation layer (CGL).

A charge generating material (CGM) and the polycarbonate are pulverized together and then dispersed, or the charge generating material (CGM) is pulverized, and the polycarbonate is then added thereto to prepare a mixture of the CGM and the polycarbonate. This mixture is then coated on the charge transport layer (CTL) with a thickness of 15 to 50 μm by the same coating method as mentioned previously, whereby a charge generation layer (CGL) with a thickness of 0.5 to 10 μm is provided on the CTL.

It is preferable that the weight amount ration of the polycarbonate resin of formula (I) or (II): the charge generating material (CGM) be 10:2 to 30.

Additives, for example, a polyether compound such as polyethylene glycol, a cyclic ether such as crown ether, and a phosphorous ester such as tridecyl phosphite, may be added to the charge generation layer (CGL). These additives serve to prevent the deterioration of the chargeability of the charge generation layer while in use. It is preferable that the amount ratio by parts by weight of the charge generating material (CGM): the above additive be 10:0.1 to 5.

The charge transport layer (CTL) comprises a low-molecular-weight charge transporting material (CTM) and a binder agent in which the charge transporting material (CTM) is dispersed. Examples of the binder agent for use in the CTL are polymethyl acrylate, methyl methacrylate-styrene copolymer, polystryrene, polyesters derived from terephthalic acid or isophthalic acid and diol, polycarbonate, epoxy resin, polyurethane, and the particular polycarbonates for use in the present invention.

In the case of the single-layered positive-chargeable electrophotographic photoconductor (3), a photoconductive layer comprising a charge generating material (CGM) and the polycarbonate resin of formula (I) or (II) is provided on the electroconductive support. In this case, it is preferable that the amount ratio by parts by weight of the polycarbonate of formula (I) or (II): the charge generating material (CGM) be 10:1 to 10. To this photoconductive layer, the above-mentioned additives for the prevention of the deterioration of the chargeability can be also added.

In the case of the electrophotographic photoconductor (4), the polycarbonate resins of formula (I) and (II) can be used for the protective layer. It is preferable that a protective layer with a thickness of 0.5 to 10 μm be provided on a charge transport layer (CTL) which comprises a conventional CTM and a binder agent in which the CTM is dispersed.

The charge generation layer (CGL) may consist of a charge generating material (CGM) or may comprise a charge generating material (CGM) and a binder resin.

Specific examples of the charge generating material (CGM) are condensed polycyclic quinone compounds such as C.I. No. 59300 Vat Orange 3, perylene compounds such as C.I. No. 38001, azo pigments having a carbazole skeleton (Japanese Laid-Open Patent Application 53-95033), azo pigments having a stilbene skeleton (Japanese Laid-Open Patent Application 53-138229), azo pigments having a triphenylamine skeleton (Japanese Laid-Open Patent Application 53-132547), azo pigments having a dibenzothiophene skeleton (Japanese Laid-Open Patent Application 54-21728), azo pigments having an oxadiazole skeleton (Japanese Laid-Open Patent Application 54-12742), azo pigments having a fluorenone skeleton (Japanese Laid-Open Patent Application 54-22834), azo pigments having a bisstilbene skeleton (Japanese Laid-Open Patent Application 54-17733), azo pigments having a distyryl oxadiazole skeleton (Japanese Laid-Open Patent Application 54-2129), azo pigments having a distyryl carbazole skeleton (Japanese Laid-Open Patent Application 54-17734), trisazo pigments having a carbazole skeleton (Japanese Laid-Open Patent Application 57-195767 and 57-195768), azo pigments having an anthraquinone skeleton (Japanese Laid-Open Patent Application 57-202545), squarylium dyes, metal or metal-free phthalocyanines, selenium, selenium alloys, and a-silicon.

As low-molecular-weight charge transporting material (CTM) to be dispersed in the previously mentioned binder resins, for example, there can be also employed oxazole derivatives and oxadiazole derivatives (Japanese Laid-Open Patent Applications 52-139065 and 52-139066), imidazole derivatives and triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063 and 56-81850), triphenylmethane derivatives (Japanese Patent Publication 51-10983), anthrancene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

As the materials for the electroconductive support for the electrophotographic photoconductor of the present invention, for example, electroconductive metals such as aluminum, copper, nickel and stainless steel, and alloys thereof; inorganic insulating materials such as glass and ceramics; and electroconductive drum-, sheet- or plate-shaped materials, which are prepared by coating the surface of an organic insulating material such as polyester, polyimide, phenolic resin, nylon resin or paper, with an electroconductive material such as aluminum, copper, nickel, stainless steel, carbon black, tin oxide, indium oxide, antimony oxide, or electroconductive titanium oxide, by vacuum deposition, sputtering, or spray coating.

The following are production examples of polycarbonates for use in the present invention:

PRODUCTION EXAMPLE 1

[Synthesis of 1,1-bis(4-hydroxyphenyl)-1-(4-nitro-phenyl) ethane]

165.15 g (1 mol) of p-nitroacetophenone and 470.55 g (5 mol) of phenol were placed in a 1-l. Erlenmeyer flask and hydrogen chloride gas was blown through the reaction mixture for 5 hours at room temperature. The reaction mixture was then allowed to stand for 2 hours.

Yellow crystals separated out from the reaction mixture. The yellow crystals were then washed with 2 l of hot water at 80° C. two times, whereby a yellow oil was obtained. The yellow oil was then washed with 500 ml of toluene, so that 266 g of yellow crystals was obtained.

The thus obtained yellow crystals were washed with 800 ml of hot toluene and filtered off, whereby the desired product, 1,1-bis(4-hydroxyphenyl)-1-(4-nitro-phenyl) ethane was obtained in a yield of 144 g.

Melting point: 179.5 to 180.5° C.

I.R. (KBr tablet): OH 3400 cm$^{-1}$, NO$_2$ 1340 cm$^{-1}$.

Elemental Analysis:

|  | % C | % H | % N |
|---|---|---|---|
| Found | 71.60 | 4.95 | 3.81 |
| Calc. | 71.62 | 5.12 | 4.18 |

[Synthesis of 1,1-bis(4-methoxyphenyl)-1-(4-nitro-phenyl)ethane]

100 g (0.3 mol) of the above synthesized 1,1-bis(4-hydroxyphenyl)-1-(4-nitro-phenyl)ethane, 1 l of acetone and 29.8 g (0.75 mol) of sodium hydroxide were placed in a 3-l four-necked flask, and the mixture was refluxed for 1 hour. A yellow material separated out. To this reaction mixture, 105.8 g (0.75 mol) of methyl iodide was added dropwise over a period of 2 hours, and the reaction mixture was refluxed for 4 hours.

This reaction mixture was cooled to room temperature and was then poured into 2 l of water. This mixture was then extracted with 2 l of toluene. Toluene was distilled away from the extract under reduced pressure, whereby a brown oil was obtained. To this brown oil, 700 ml of ethanol was added. This mixture was heated and then allowed to stand at room temperature for cooling. As a result, cream-colored crystals separated out.

The crystals were obtained by filtration and recrystallized from 1.4 l of ethanol, whereby 1,1-bis(4-methoxyphenyl)-1-(4-nitro-phenyl)ethane was obtained in the shape of white needle crystals in a yield of 74.5 g (68.8%).

Melting point: 87.5 to 88.5° C.

I.R. (KBr tablet): $OCH_3$ 2850, 1250, 1030 $cm^{-1}$

[Synthesis of 1,1-bis(4-methoxyphenyl)-1-(4-amino-phenyl)ethane]

70 g (0.19 mol) of the above synthesized 1,1-bis(4-methoxyphenyl)-1-(4-nitro-phenyl)ethane, 200 ml of tetrahydrofuran and 3.5 g of palladium carbon were placed in an Erlenmeyer flask, and the 1,1-bis(4-methoxyphenyl)-1-(4-nitro-phenyl)ethane was reduced by 13.65 l of hydrogen. After this reduction reaction, the tetrahydrofuran was distilled away from the reaction mixture under reduced pressure, whereby 1,1-bis(4-methoxyphenyl)-1-(4-amino-phenyl)ethane was obtained in the form of a white solid in a yield of 64.2 g.

Melting point: 134.5 to 136° C.

I.R. (KBr tablet): $NH_2$ 3380, 3480 $cm^{-1}$

[Synthesis of 1,1-bis(4-methoxyphenyl)-1-[N,N-bis(4-methylphenyl)-(4-aminophenyl)ethane]

57.5 g (0.172 mol) of the above synthesized 1,1-bis(4-methoxyphenyl)-1-(4-amino-phenyl)ethane, 150 g (0.69 mol) of p-iodotoluene, 95.3 g (0.69 mol) of potassium carbonate, and 11 g (0.172 mol) of copper powder were placed in a 500-ml four-necked flask. This reaction mixture was allowed to react in a stream of nitrogen at 235° C. for 7 hours.

The reaction mixture was then cooled, and the inorganic components contained therein were removed by filtration. The p-iodotoluene was distilled away from the filtrate under reduced pressure while applying heat thereto by use of an oil bath, whereby a brown oil was obtained.

To the thus obtained brown oil, 3 l of ethanol was added, and the mixture was heated and then cooled rapidly. A light yellow-soil-colored product separated out. This product was 1,1-bis(4-methoxyphenyl)-1 -[N,N-bis(4-methylphenyl)-4-aminophenyl)ethane and was obtained by filtration in a yield of 62 g (m.p. 144.5 to 147.5 ° C.).

Part of the above product was recrystallized from ethanol, whereby 1,1-bis(4-methoxyphenyl)-1-[N,N-bis(4-methylphenyl)-(4-aminophenyl)ethane was obtained in the shape of white needle crystals.

Melting point: 147 to 148.5° C.

I.R. (KBr tablet): C—N 1320 $cm^{-1}$

Elemental Analysis:

|       | % C   | % H  | % N  |
|-------|-------|------|------|
| Found | 84.20 | 6.67 | 2.85 |
| Calc. | 84.16 | 6.88 | 2.73 |

[Synthesis of 1,1-bis(4-hydroxyphenyl)-1-[N,N-bis(4-methylphenyl)-(4-aminophenyl)ethane]

A mixture of 71 g (0.139 mol) of the above synthesized 1,1-bis(4-methoxyphenyl)-1-[N,N-bis(4-methylphenyl)-(4-aminophenyl)ethane, 30.4 g (0.36 mol) of sodium thioethylate and 800 ml of dimethylformamide was refluxed for 10 hours. This reaction mixture was then poured into 2 l of water. This mixture was then made acidic with the addition of hydrochloric acid thereto, whereby an oily material was obtained. This oily material was washed with water, so that a yellow solid material was obtained. The yellow solid material was dried, and recrystallized two times from toluene, whereby 1,1-bis(4-hydroxyphenyl)-1-[N,N-bis(4-methylphenyl)-(4-aminophneyl)ethane was obtained in the form of light grey crystals in a yield of 39.5 g.

An infrared spectrum of this product, taken by use of a KBr tablet is shown in FIG. 1.

Melting point: 192 to 194.5° C.

Elemental Analysis:

|       | % C   | % H  | % N  |
|-------|-------|------|------|
| Found | 84.42 | 6.50 | 2.86 |
| Calc. | 84.08 | 6.45 | 2.88 |

PRODUCTION EXAMPLE 2

[Synthesis of 1,1-bis(4-hydroxyphenyl)-1-(4-iodo-phenyl)ethane]

100 g (0.4 mol) of p-iodoacetophenone and 191.2 g (5 mol) of phenol were placed in a 1-l. Erlenmeyer flask and hydrogen chloride gas was blown through the reaction mixture for 5 hours at room temperature. The reaction mixture was then allowed to stand for 2 weeks.

The reaction mixture was washed with 500 ml of hot water at 80° C. four times, whereby a brown oil was obtained.

The thus obtained brown oil was chromatographed on silica gel and eluted with an eluent composed of toluene and ethyl acetate (4:1 by volume), thereby eliminating colored components therefrom. The product was then recrystallized from toluene, whereby 1,1-bis(4-hydroxyphenyl)-1-(4-iodophenyl)ethane was obtained in the form of light yellow-soil colored crystals in a yield of 102.6 (60.6%).

Melting point: 108 to 109.5° C.

Synthesis of 1,1-bis(4-methoxyphenyl)-1-(4-iodophenyl)ethane 100 g (0.24 mol) of the above synthesized 1,1-bis(4-hydroxyphenyl)-1-(4-iodophenyl)ethane, 1 l of acetone and 24.02 g (0.6 mol) of sodium hydroxide were placed in a 2-l four-necked flask, and the mixture was refluxed for 1 hour. A white material separated out in the reaction mixture. To this reaction mixture, 85.3 g (0.6 mol) of methyl iodide was added dropwise over a period of 1 hour, and the reaction mixture was refluxed for 4 hours.

From this reaction mixture, 500 ml of acetone was distilled under reduced pressure. The reaction mixture was then poured into 1.2 l of water. As a result, a precipitate separated out. This precipitate was filtered off, washed with 500 ml of water, dried, and recrystallized from a mixed solvent consisting of 1400 ml of ethanol and 300 ml of toluene, whereby 1,1-bis(4-methoxyphenyl)-1-(4-iodophenyl)ethane was obtained in a yield of 76.5 g (71.7%).

Melting point: 164 to 164.5° C.

Elemental Analysis:

|  | % C | % H |
|---|---|---|
| Found | 59.51 | 4.82 |
| Calc. | 59.46 | 4.77 |

Synthesis of 1,1-bis(4-methoxyphenyl)-1-[N,N-bis(4-methylphenyl)-4-aminophenyl]ethane 70 g (0.157 mol) of the above synthesized 1,1-bis(4-methoxyphenyl)-1-(4-iodophenyl)ethane, 37.3 g (0.19 mol) of p,p'-ditolylamine, 26.1 g (0.19 mol) of potassium carbonate, 10 g (0.16 mol) of copper powder, and 280 ml of nitrobenzene were placed in a four-necked flask. This reaction mixture was refluxed for 8 hours, with the elimination of the produced water therefrom during the reaction.

The reaction mixture was then cooled to room temperature, and filtered from sellite. The filtrate was heated by use of an oil bath, and nitrobenzene was distilled from the filtrate under reduced pressure. The residue was washed with 200 ml of methanol, and chromatographed on silica gel and elute with an eluent composed of toluene and n-hexane (5:1 by volume), whereby 1,1-bis(4-methoxyphenyl)-1-[N,N-bis (4-methylphenyl)-4-aminophenyl]ethane was obtained in a yield of 44.5 g (55%).

Melting point: 147 to 148.5° C.

Synthesis of 1,1-bis(4-hydroxyphenyl)-1-[N,N-bis(4-methylphenyl)-(4-aminophenyl)ethane From the above synthesized 1,1-bis(4-methoxyphenyl)-1-[N,N-bis(4-methylphenyl)-(4-aminophenyl)ethane, 1,1-bis(4-hydroxyphenyl)-1-[N,N-bis(4-methylphenyl)-(4-aminophenyl)ethane was synthesized in the same manner as in the last step in Production Example 1.

PRODUCTION EXAMPLE 3

Synthesis of 1,1-bis(4-methoxyphenyl)-1-(p-acetamidephenyl)ethane 274 g (0.822 mol) of 1,1-bis(4-methoxyphenyl)-1-(4-aminophenyl)ethane was dissolved in 1.6 l of toluene under the application of heat thereto. This reaction mixture was then cooled to room temperature, and 100.7 g of acetic anhydride was added dropwise, with stirring, to the reaction mixture over a period of 1 hour. During the dropwise addition of the acetic anhydride to the reaction mixture, the reaction proceeded with evolution of heat, so that the reactants were dissovled in the reaction mixture. The reaction was continued for 3 hours, and the reaction mixture was concentrated under reduced pressure, and the precipitate was filtered off and washed with toluene, whereby 1,1-bis(4-methoxyphenyl)-1-(p-acetamidephenyl)ethane was obtained in a yield of 250.4 g (81.1%).

Melting point: 151 to 152.5° C.

I.R.(KBr tablet): —NHCO— 3250, 1660 cm$^{-1}$

Elemental Analysis:

|  | % C | % H | % N |
|---|---|---|---|
| Found | 76.97 | 6.58 | 3.71 |
| Calc. | 76.76 | 6.72 | 3.73 |

Synthesis of 1,1-bis(4-methoxyphenyl)-1-[4-(p-tolylaminophenyl)ethane 250.4 g (0.667 mol) of 1,1-bis(4-methoxyphenyl)-1-(p-acetamidephenyl)ethane, 456.3 g (2.67 mol) of p-bromotoluene, 110.6 g (0.8 mol) of potassium carbonate and 42.4 g of copper powder were placed in a four-necked flask. This reaction mixture was refluxed, with stirring, at 187° C. for 12 hours. After the completion of the reaction, the inorganic components were filtered off by sellite, and the p-bromotoluene was distilled away from the filtrate under reduced pressure, whereby a glass-like product was obtained. The thus obtained glass-like material was dissolved in 580 ml of dioxane, and 250 g of concentrated hydrochloric acid was added thereto. This reaction mixture was allowed to react at 88° C. for 5 hours. The reaction mixture was then poured into 1.7 l of water, whereby a grey precipitate was obtained.

This grey precipitate was recrystallized from 4 l of ethanol, whereby 1,1-bis(4-methoxyphenyl)-1-(4-(p-tolylaminophenyl)ethane was obtained in a yield of 186 g (65.8%).

Melting point: 123 to 125° C.

I.R. (KBr tablet): —NH— 3400 cm$^{-1}$

Synthesis of 1,1-bis(4-methoxyphenyl)-1-[N-(4-biphenylyl)-N-(4-methylphenyl)-4-aminophenyl]ethane 86.9 g (0.205 mol) of 1,1-bis(4-methoxyphenyl)-1-[4-(p-tolylaminophenyl)ethane, 224.1 g (0.8 mol) of 4-iodophenyl, 66.3 g (0.48 mol) of potassium carbonate, and 12.7 g of copper powder were placed in a four-necked flask. The reaction mixture was allowed to react at 186° C. for 36 hours. After this reaction, the reaction mixture was extracted with toluene. The toluene was distilled from the extract, whereby a brown residue was obtained.

The brown reside was then extracted with n-hexane with the application of heat thereto, whereby 280 g of a yellow material was obtained. The yellow material was chromatographed on silica gel and eluted with an eluent of toluene and cyclohexanone (1:1 by volume), whereby 1,1-bis(4-methoxyphenyl)-1-[N-(4-biphenylyl)-N-(4-methylphenyl)-4-aminophenyl]ethane was obtained in a yield of 108.5 g.

Synthesis of 1,1-bis(4-hydroxyphenyl)-1-[N-(4-biphenylyl)-N-(4-methylphenyl)-4-aminophenyl]ethane 91.2 g (0.158 mol) of the above synthesized 1,1-bis(4-methoxyphenyl)-1-[N-(4-biphenylyl)-N-(4-methylphenyl)-4-aminophenyl]ethane, 66.6 g (0.79 mol) of sodium thioethylate and 800 ml of dimethylformamide were allowed to react at 120 to 130° C. for 8 hours.

This reaction mixture was then poured into 3 l of water. This mixture was then made acidic with the addition of 80 ml of hydrochloric acid thereto. A white precipitate was formed in the reaction mixture. The white precipitate was filtered off, washed with 1.5 l of water several times, dried, and recrystallized from toluene. The thus obtained crystals were chromatographed on silica gel, eluted with an eluent composed of toluene and ethyl acetate (3:1 by volume), and recrystallized from toluene, whereby 1,1-bis(4-hydroxyphenyl)-1-[N-(4-bi-phenylyl)-N-(4-methylphenyl)-4-aminophenyl]ethane was obtained in a yield of 58.7 g (67.7%).

Figure 2:
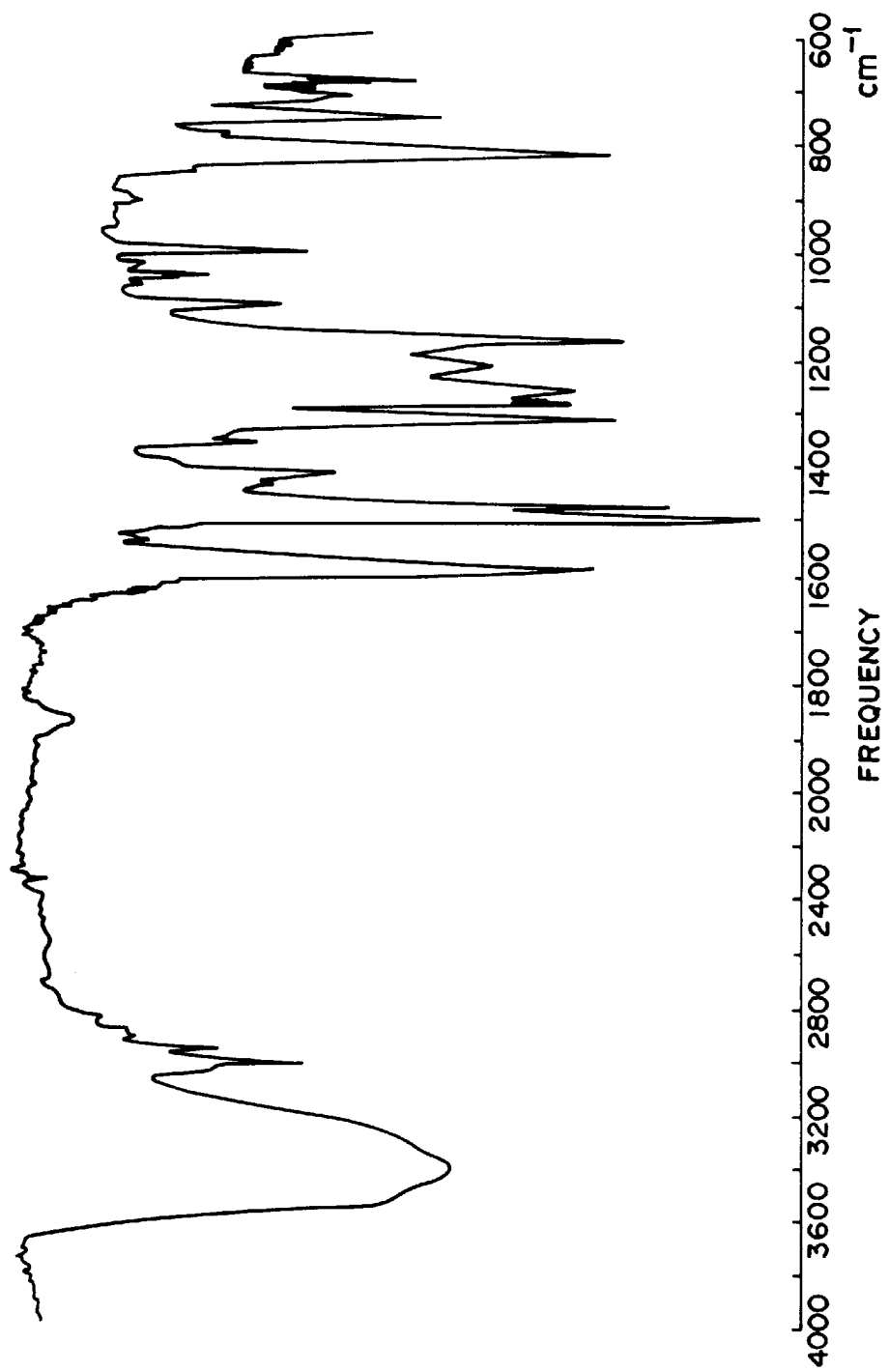
FIG. 2 is an infrared spectrum of a bisphenol compound synthesized in Production Example 3.

An infrared spectrum of this product, taken by use of a KBr tablet, is shown in FIG. 2.

Melting point: 235 to 236° C.

Elemental Analysis:

|       | % G   | % H  | % N  |
|-------|-------|------|------|
| Found | 85.73 | 6.09 | 2.64 |
| Calc. | 85.51 | 6.09 | 2.56 |

PRODUCTION EXAMPLE 4

Bisphenol compound No. 7 in TABLE 1 was synthesized in the same manner as in Production Example 1.

The melting point of the thus synthesized bisphenol compound No. 7 was 171° C.

Figure 3:
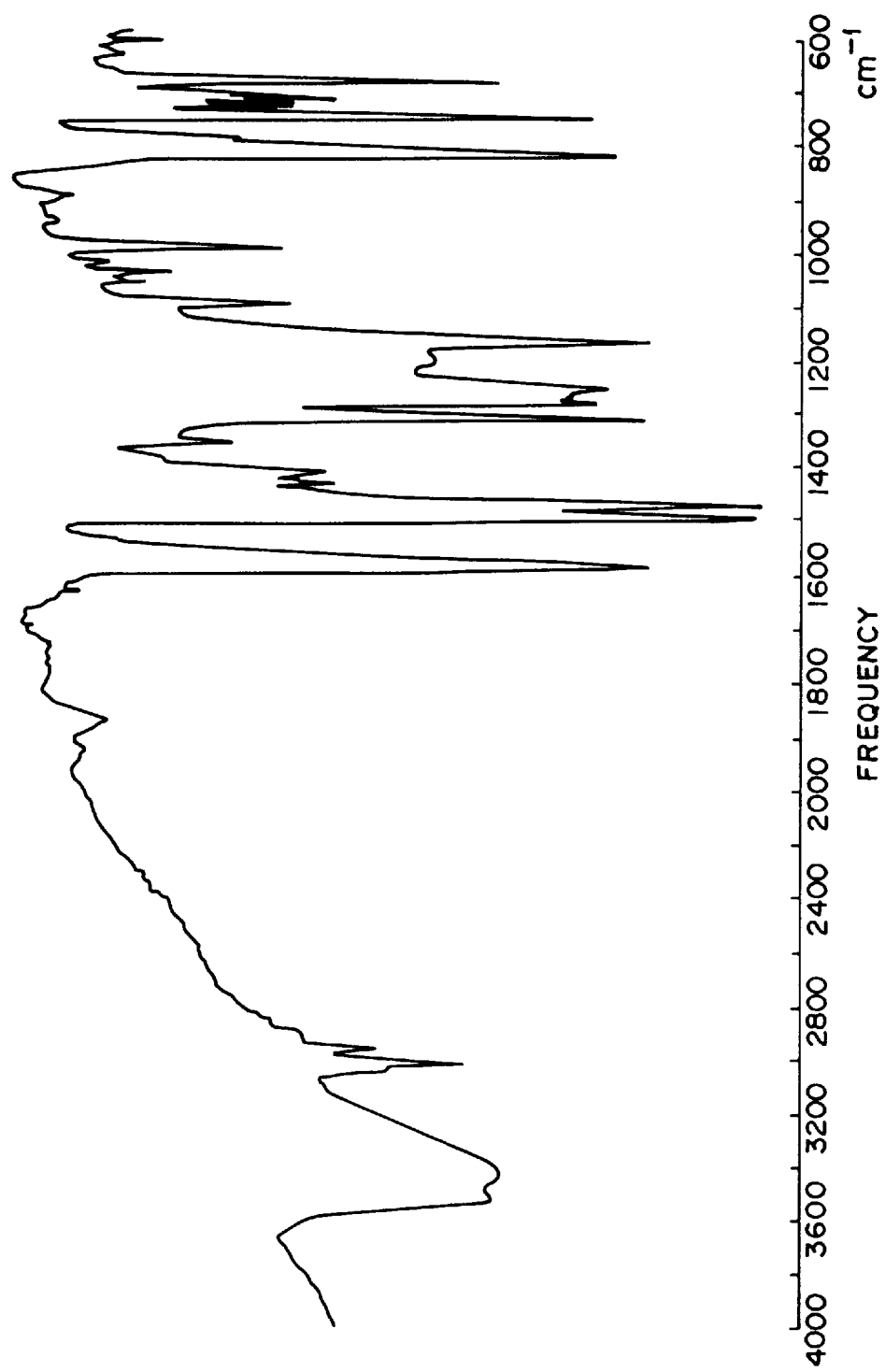
FIG. 3 is an infrared spectrum of bisphenol compound No. 7 in TABLE 1.

FIG. 3 is an infrared spectrum of the bisphenol compound No. 7 in TABLE 1, taken by use of a KBr tablet.

PRODUCTION EXAMPLE 5

Bisphenol compound No. 4 in TABLE 1 was synthesized in the same manner as in Production Example 3.

The melting point of the thus synthesized bisphenol compound No. 4 was 139° C.

Figure 4:
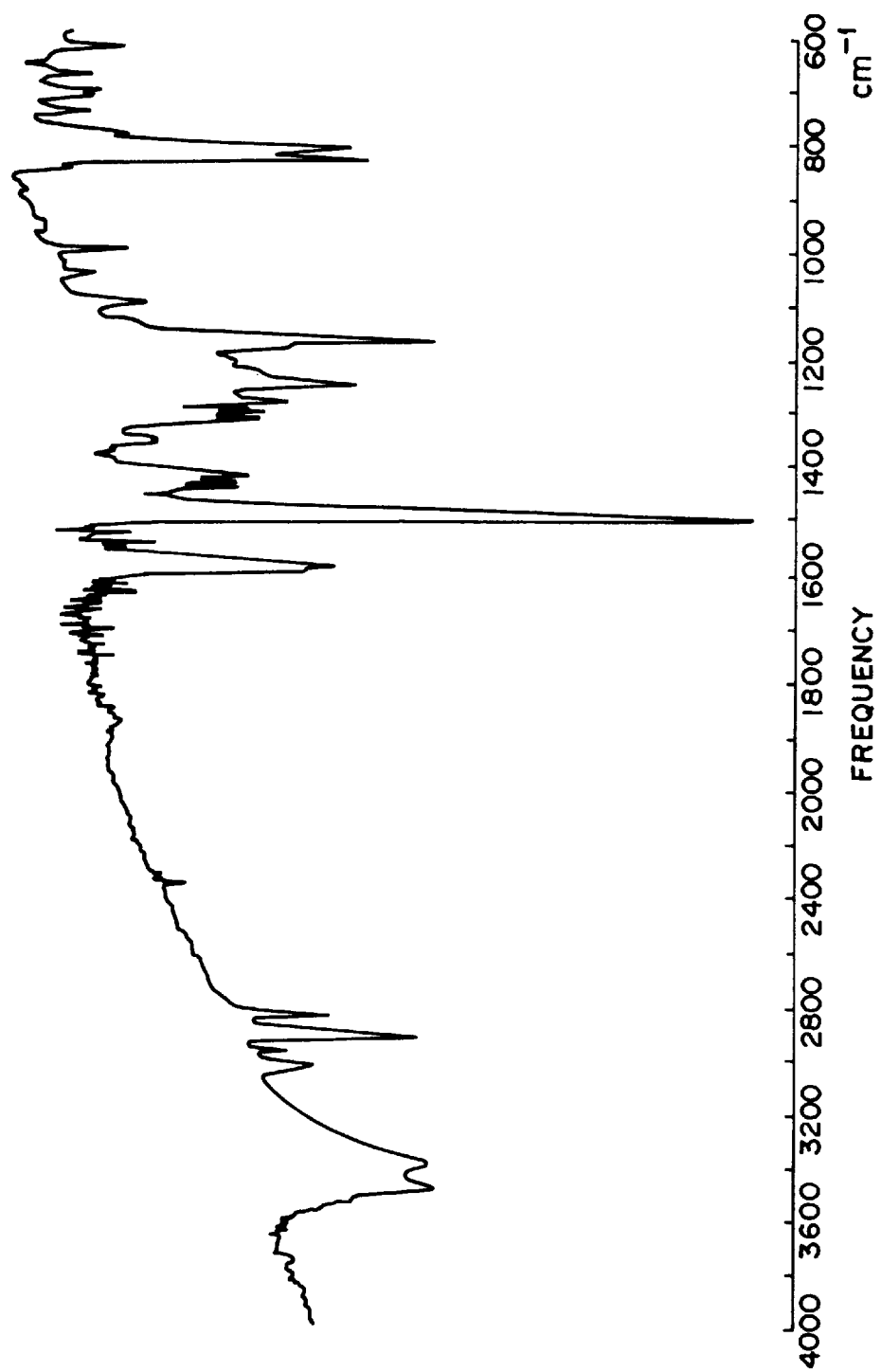
FIG. 4 is an infrared spectrum of bisphenol compound No. 4 in TABLE 1.

FIG. 4 is an infrared spectrum of the bisphenol compound No. 4, taken by use of a KBr tablet.

PRODUCTION EXAMPLE 6

Bisphenol compound No. 2 in TABLE 1 was synthesized in the same manner as in Production Example 1.

The melting point of the thus synthesized bisphenol compound No. 2 was 185–186.5° C.

Figure 5:
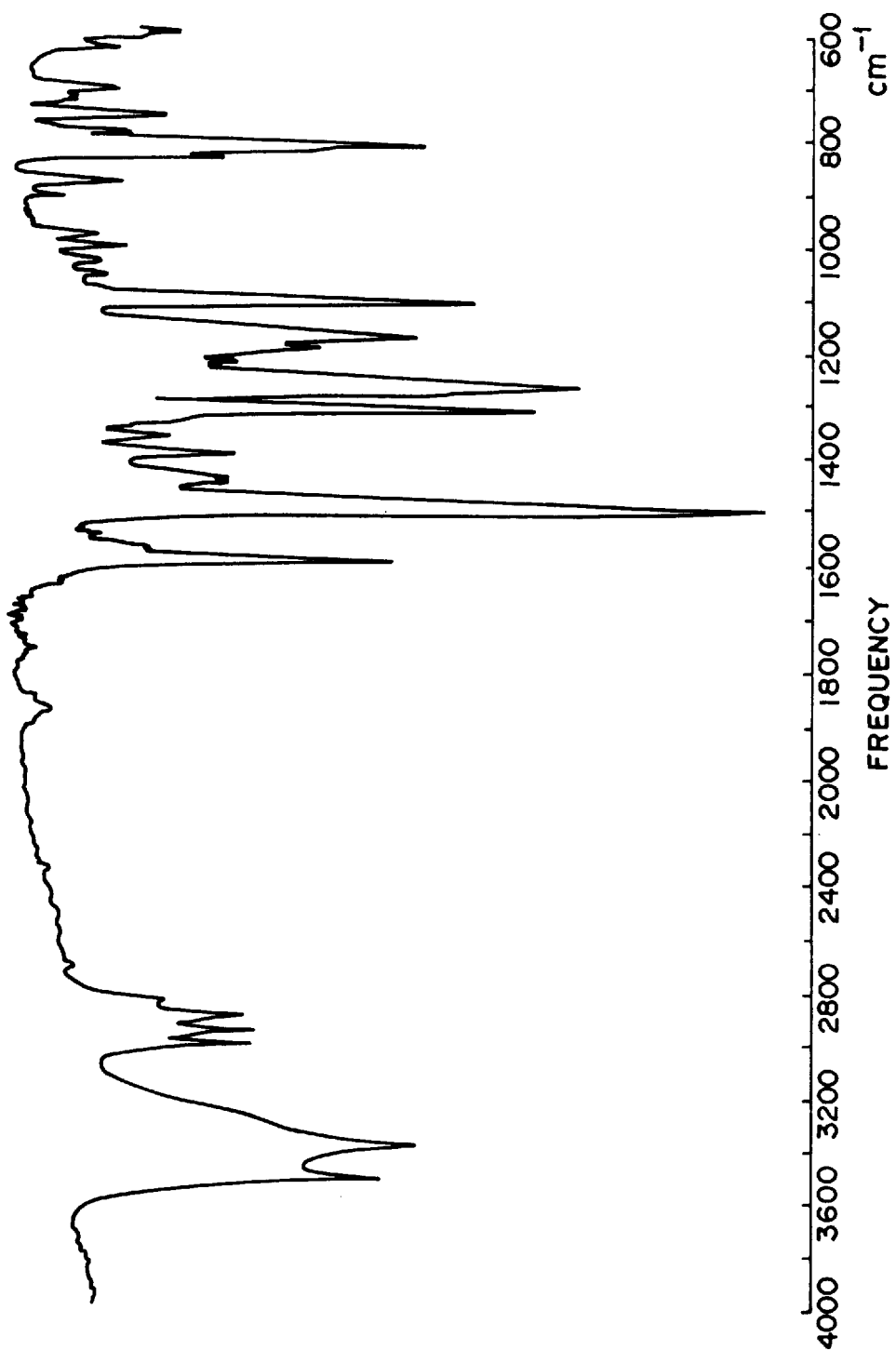
FIG. 5 is an infrared spectrum of bisphenol compound No. 2 in TABLE 1.

FIG. 5 is an infrared spectrum of the bisphenol compound No. 2, taken by use of a KBr tablet.

PRODUCTION EXAMPLE 7

Bisphenol compound No. 26 in TABLE 1 was synthesized in the same manner as in Production Example 1.

The synthesized bisphenol compound No. 26 was amorphous.

PRODUCTION EXAMPLE 8

Bisphenol compound No. 21 in TABLE 1 was synthesized in the same manner as in Production Example 1.

The melting point of the thus synthesized bisphenol compound No. 21 was 178–180° C.

Figure 6:
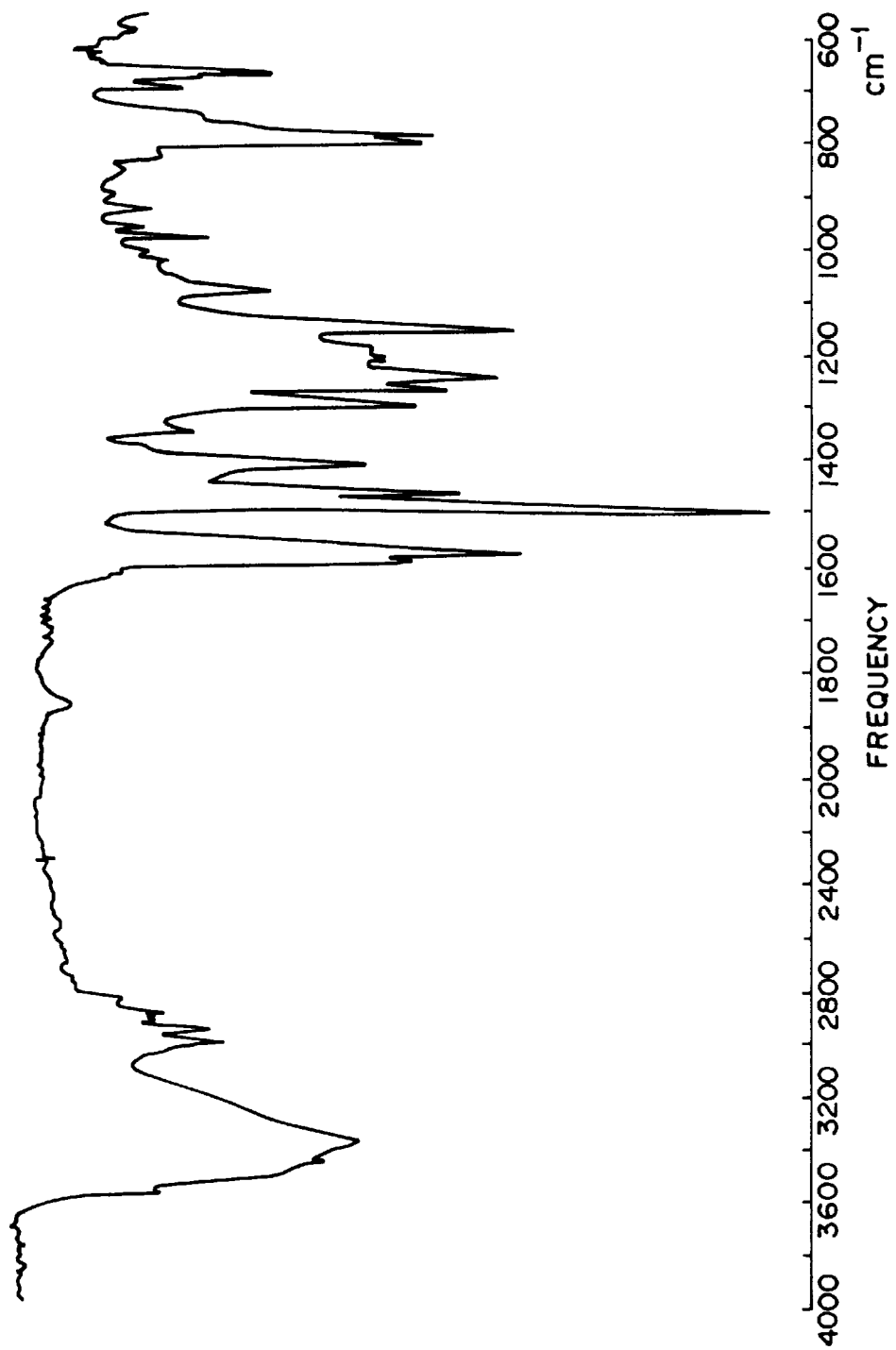
FIG. 6 is an infrared spectrum of bisphenol compound No. 21 in TABLE 1.

FIG. 6 is an infrared spectrum of the bisphenol compound No. 21, taken by use of a KBr tablet.

PRODUCTION EXAMPLE 9

Bisphenol compound No. 25 in TABLE 1 was synthesized in the same manner as in Production Example 1.

The melting point of the thus synthesized bisphenol compound No. 25 was 180–181° C.

Figure 7:
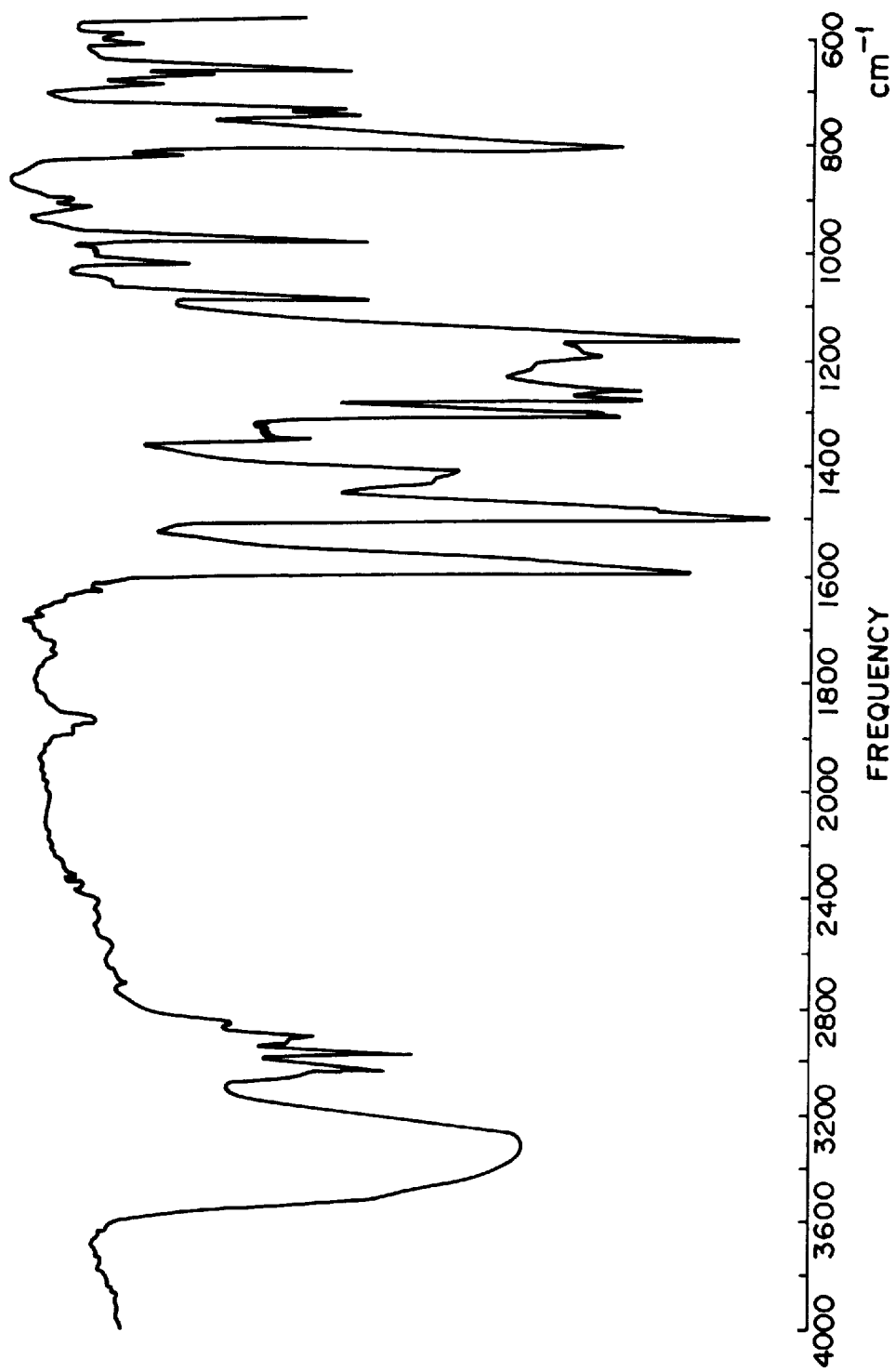
FIG. 7 is an infrared spectrum of bisphenol compound No. 25 in TABLE 1.

FIG. 7 is an infrared spectrum of the bisphenol compound No. 25, taken by use of a KBr tablet.

PRODUCTION EXAMPLE 10

Bisphenol compound No. 24 in TABLE 1 was synthesized in the same manner as in Production Example 1.

The melting point of the thus synthesized bisphenol compound No. 24 was 177–179° C.

Figure 8:
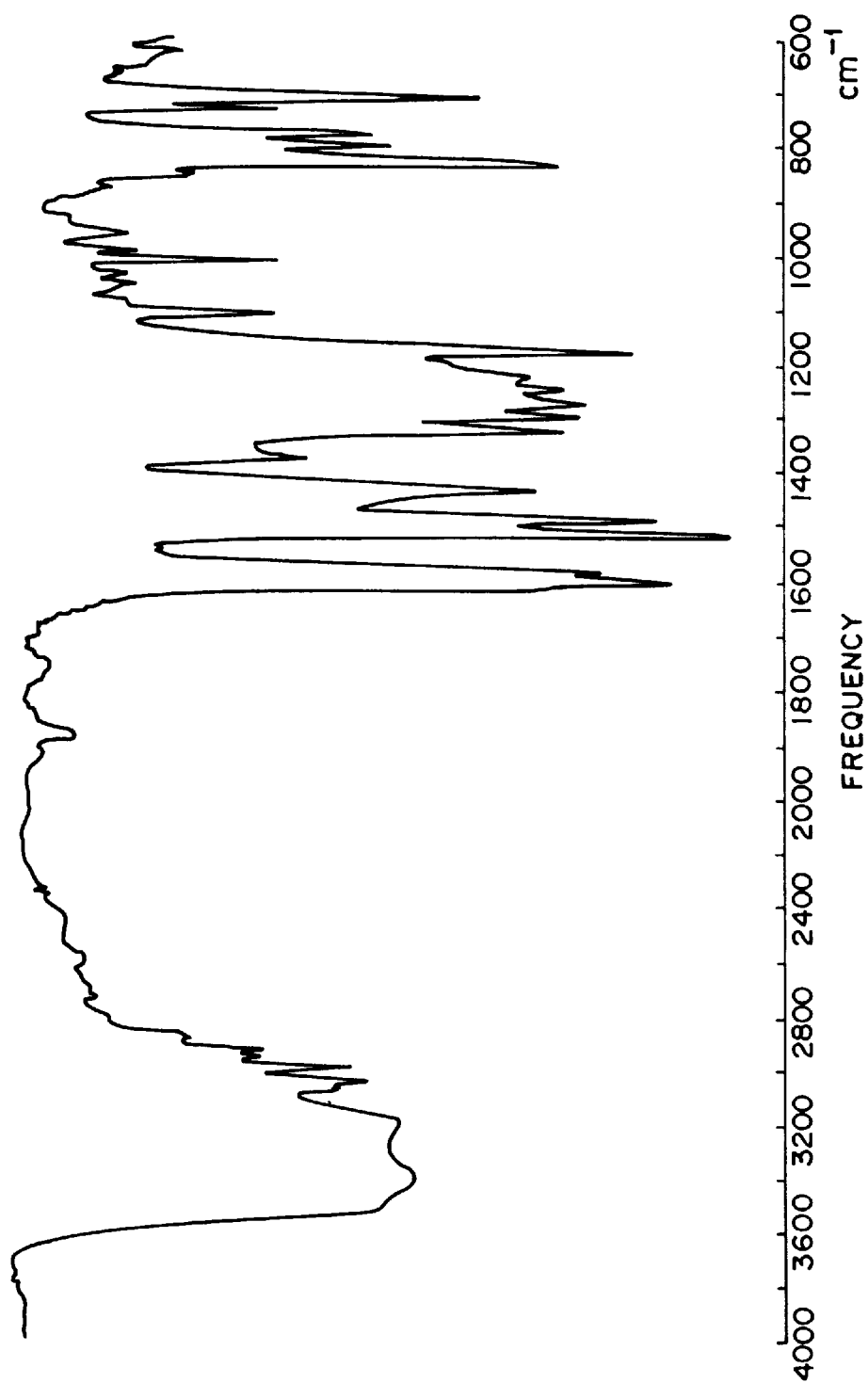
FIG. 8 is an infrared spectrum of bisphenol compound No. 24 in TABLE 1.

FIG. 8 is an infrared spectrum of the bisphenol compound No. 25, taken by use of a KBr tablet.

PRODUCTION EXAMPLE 11

220 parts by weight of ion-exchanged water and 46.1 parts by weight of a 48% aqueous solution of sodium hydroxide were placed in a reactor equipped with a thermometer, a stirrer and a dropping funnel.

60.5 parts by weight of 1,1-bis(4-hydroxyphenyl)-1-(N, N-d-p-tolyl-4-aminophenyl)ethane (Compound No. 1 in TABLE 1) synthesized in Production Example 1, and 0.04 parts by weight of hydrosulfite were dissovled in the above reaction mixture.

To the above-mentioned reaction mixture, 104 parts by weight of methylene chloride were added, and 14.8 parts by weight of phosgene was blown through the reaction mixture over a period of 25 minutes. After the blowing of the phosgene, a solution of 0.4 parts by weight of 4-(p-hydroxyphenyl)-N,N-di-p-tolylaniline in 20 parts by weight of methylene chloride was added as a terminator to the reaction mixture.

After the emulsification of the reaction mixture, 0.04 parts by weight of triethylamine were added to the reaction mixture, and the reaction mixture was stirred at 28–33° C. for about 2 hours to complete the reaction.

The reaction produce was then diluted with methylene chloride. The diluted mixture was washed with water, made acidic with the addition of hydrochloric acid, and then washed with water. When the electric conductivity of the water phase of this mixture became almost the same as that of the ion exchanged water, the methylene chloride was caused to evaporate, whereby 61 parts by weight of a colorless polymer, a polycarbonate resin, were obtained.

The specific viscosity of the thus obtained polymer was 0.688 and the glass transition point thereof was 199° C.

PRODUCTION EXAMPLE 12

220 parts by weight of ion-exchanged water and 46.1 parts by weight of a 48% aqueous solution of sodium hydroxide were placed in a reactor equipped with a thermometer, a stirrer and a dropping funnel.

60.5 parts by weight of Bisphenol Compound No. 3 in TABLE 1, and 0.04 parts by weight of hydrosulfite were dissovled in the above reaction mixture.

To the above-mentioned reaction mixture, 104 parts by weight of methylene chloride were added, and 14.8 parts by weight of phosgene was blown through the reaction mixture over a period of 25 minutes. After the blowing of the phosgene, a solution of 0.4 parts by weight of p-tert-butylphenol in 20 parts by weight of methylene chloride was added to the reaction mixture.

After the emulsification of the reaction mixture, 0.04 parts by weight of triethylamine were added to the reaction mixture, and the reaction mixture was stirred at 28–33° C. for about 2 hours to complete the reaction.

The reaction product was then diluted with methylene chloride. The diluted mixture was washed with water, made acidic with the addition of hydrochloric acid, and then washed with water. When the electric conductivity of the water phase of this mixture became almost the same as that of the ion exchanged water, the methylene chloride was caused to evaporate, whereby 61 parts by weight of a colorless polymer were obtained.

The specific viscosity of the thus obtained polymer was 1.324 and the glass transition point thereof was 199° C.

EXAMPLE 1

On the outer surface of an aluminum cylinder with an outer diameter of 80 mm and a length of 340 mm, a commercially available polyamide resin (Trademark "CM-800" made by Toray Industries, Inc.) was spray coated, and dried, whereby an intermediate layer with a thickness of 0.3 μm was provided on the surface of the aluminum cylinder.

On the thus provided intermediated layer, a dispersion prepared by dispersing finely-divided particles of an azo pigment of the following formula (I) in cyclohexanone was spray coated and dried, whereby a charge generation layer with thickness of 0.2 μm was provided on the intermediate layer:

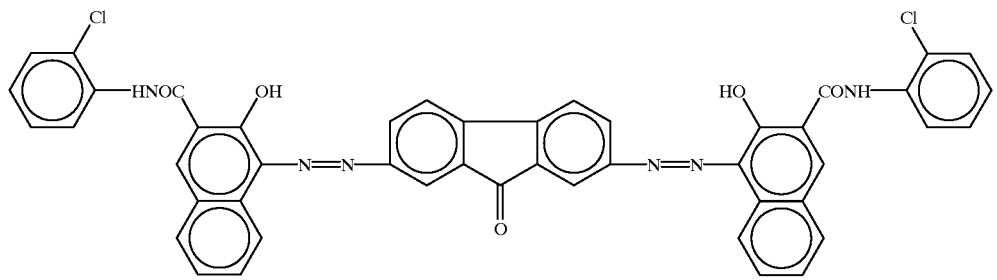

A charge transport layer formation liquid was prepared by dissolving 10 parts by weight of the polycarbonate resin synthesized in Production Example 11 in a mixture of 80 parts by weight of toluene and 40 parts by weight of cyclohexanone.

The thus prepared charge transport layer formation liquid was spray coated on the charge generation layer and dried at 120° C. for 20 minutes, whereby a charge transport layer with a thickness of 23 μm was provided on the charge generation layer.

Thus, an electrophotographic photoconductor No. 1 of the present invention was fabricated.

The above fabricated electrophotographic photoconductor No. 1 was incorporated in a test apparatus described in Japanese Laid-Open Patent Application 60-100167. A voltage of −6 KV was applied to the photoconductor No. 1 in the dark for 20 seconds while the photoconductor No. 1 was rotated at 1000 rpm and the surface potential Vm of the photoconductor No. 1 after this charge application was measured.

The photoconductor No. 1 was allowed to stand in the dark without applying any charges thereto for 20 seconds to measure the dark decay thereof, and the surface potential $V_0(V)$ of the photoconductor No. 1 after the dark decay was measured.

The photoconductor No. 1 was then illuminated by a tungsten lamp with a slit width of 6 mm in such a manner that the illuminance on the illuminated surface of the photoconductor was 26 lux, and the exposure $E_{1/2}$ (lux sec) required to reduce the surface potential $V_0$ (V) to ½ the surface potential $V_0$ (V) was measured. Furthermore, the exposure $E_{1/10}$ (lux sec) required to reduce the surface potential $V_0$ (V) to 1/10 the surface potential $V_0$ (V) was also measured under the same conditions as mentioned above. The results are shown in TABLE 3.

Furthermore, the residual surface potential Vr (V) of the photoconductor No. 1 was measured by exposing the surface of the photoconductor to the above-mentioned light of the tungsten lamp for 20 seconds. The result is also shown in TABLE 3.

The photoconductor No. 1 was incorporated in a commercially available electrophotographic copying machine (Trademark "FT-4820" made by Ricoh Company, Ltd.) and subjected to a durability test by making 100,000 copies, with an initial dark area surface potential ($V_0$) being set at −800 V, and an initial light area surface potential ($V_L$) at −80 V.

Furthermore, the abrasion of the charge transport layer in the course of this 100,000-copies durability test was also measured. The results are shown in TABLE 4.

EXAMPLES 2 TO 19

The procedure for the fabrication of the photoconductor No. 1 of the present invention in Example 1 was repeated except the polycarbonate resin employed in Example 1 was replaced by each of the polycarbonate resins prepare in the same manner as in Production Example 11 except that the 1,1-bis(4-hydroxyphenyl)-1-(N,N-d-p-tolyl-4-aminophenyl)ethane (Compound No. 1 in TABLE 1) was replaced by Compounds Nos. 2 to 19, respectively, whereby electrophotographic photoconductors Nos. 2 to 19 of the present invention were fabricated.

Vm (V), $V_0$ (V), $E_{1/2}$(lux sec) and $E_{1/10}$(lux sec) of each of the electrophotographic photoconductors Nos. 2 to 19 were measured in the same manner as in Example 1. The results are shown in TABLE 3.

Furthermore, the electrophotographic photoconductors Nos. 2 to 19 were also subjected to the same durability test as in Example 1. The results are shown in TABLE 4.

COMPARATIVE EXAMPLE 1

On the outer surface of an aluminum cylinder with an outer diameter of 80 mm and a length of 340 mm, the same intermediate layer as provided in Example 1 was provided, and on the intermediate layer, the same charge generation layer as provided in Example 1 was provided.

A charge transport layer formation liquid was prepared by mixing the following components:

| | Parts by Weight |
|---|---|
| Polycarbonate resin (Trademark: "C-1400", made by Teijin Chemicals Ltd.) | 100 |
| [Structural formula: H₃C-phenyl-N(phenyl-CH₃)-phenyl-phenyl-OCH₃] | 90 |
| Dichloromethane | 800 |

The thus prepared charge transport layer formation liquid was coated on the charge generation layer by immersion method, and dried at 120° C. for 20 minutes, whereby a charge transport layer with a thickness of 23 μm was provided on the charge generation layer.

Thus, a comparative electrophotographic photoconductor No. 1 was fabricated.

COMPARATIVE EXAMPLE 2

The procedure for the fabrication of the comparative electrophotographic photoconductor No. 1 was repeated except that the charge transport layer formation liquid employed in Comparative Example 1 was replaced by a charge transport layer formation liquid with the following formulation, whereby a comparative electrophotographic photoconductor No. 2 was fabricated:

| | Parts by Weight |
|---|---|
| Polycarbonate resin (Trademark: "Iupilon PCZ", made by Mitsubishi Gas Chemical Company, Inc.) | 100 |
| [Structural formula: H₃C-phenyl-N(phenyl-CH₃)-phenyl-phenyl-OCH₃] | 90 |
| Dichloromethane | 800 |

$V_m$ (V), $V_0$ (V), $E_{1/2}$(lux sec) and $E_{1/10}$(lux sec) of each of the comparative electrophotographic photoconductors Nos. 1 and 2 were measured in the same manner as in Example 1. The results are shown in TABLE 3.

Furthermore, the comparative electrophotographic photoconductors Nos. 1 and 2 were also subjected to the same durability test as in Example 1. The results are shown in TABLE 4.

TABLE 3

| | $V_m$ (V) | $V_0$ (V) | $E_{1/2}$ (Lux · Sec) | $E_{1/10}$ (Lux · Sec) | $V_r$ (V) |
|---|---|---|---|---|---|
| Ex. 1 | 1540 | 1390 | 1.26 | 2.59 | 5 |
| Ex. 2 | 1470 | 1260 | 1.31 | 2.76 | 8 |
| Ex. 3 | 1480 | 1280 | 1.29 | 2.86 | 4 |
| Ex. 4 | 1580 | 1350 | 1.15 | 2.24 | 3 |
| Ex. 5 | 1450 | 1380 | 1.35 | 2.81 | 8 |
| Ex. 6 | 1450 | 1340 | 1.41 | 2.98 | 9 |
| Ex. 7 | 1520 | 1320 | 1.30 | 2.65 | 4 |
| Ex. 8 | 1560 | 1340 | 1.36 | 2.73 | 5 |
| Ex. 9 | 1480 | 1270 | 1.64 | 3.32 | 9 |
| Ex. 10 | 1440 | 1230 | 1.49 | 2.93 | 6 |
| Ex. 11 | 1430 | 1350 | 1.66 | 3.36 | 7 |
| Ex. 12 | 1230 | 1150 | 1.16 | 2.30 | 3 |
| Ex. 13 | 1520 | 1390 | 1.92 | 3.91 | 9 |
| Ex. 14 | 1560 | 1370 | 1.40 | 2.39 | 6 |
| Ex. 15 | 1530 | 1340 | 1.53 | 3.03 | 8 |
| Ex. 16 | 1580 | 1410 | 1.78 | 3.67 | 12 |
| Ex. 17 | 1480 | 1290 | 1.43 | 3.15 | 9 |
| Ex. 18 | 1360 | 1130 | 1.58 | 3.75 | 10 |
| Ex. 19 | 1530 | 1340 | 1.61 | 3.82 | 11 |
| Comp. Ex. 1 | 1340 | 1180 | 1.08 | 2.21 | 0 |
| Comp. Ex. 2 | 1380 | 1220 | 1.10 | 2.25 | 0 |

TABLE 4

| Examples & Comp. Examples | Abrasion of CTL (μm) | Variations of Potential (V) Decrease in $V_D$ | Variations of Potential (V) Increase in $V_L$ | Evaluation of Images |
|---|---|---|---|---|
| Ex. 1–19 | 0.8–1.2 | 20–40 | 20–40 | Clean images were obtained before and after the durability test |
| Comp. Ex. 1 | 7.8 | 70 | 90 | Initially, obtained images were clear, but non-printed streak patterns and black streak patterns appeared in half-tone images when about 40,000 copies were made. |
| Comp. Ex. 2 | 4.2 | 80 | 90 | Initially, obtained images were clear, but non-printed streak patterns and black streak patterns appeared in half-tone images when about 80,000 copies were made. |

The results shown in TABLE 4 indicate that in the electrophotographic photoconductors Nos. 1 to 19 of the present invention, the deterioration of image quality was not caused by the abrasion of the respective charge transport layers. In contrast to this, in the comparative electrophotographic photoconductors Nos. 1 and 2, the deterioration of images was caused by the abrasion of the charge transport layers thereof.

EXAMPLE 20

A charge transport layer formation liquid prepared by mixing the following components:

| | Parts by Weight |
|---|---|
| Polycarbonate resin (Trademark: "C-1400", made by Teijin Chemicals Ltd.) | 100 |
|  | 90 |
| Dichloromethane | 1000 |

The thus prepared charge transport layer formation liquid was coated by immersion coating on the outer surface of an aluminum cylinder with an outer diameter of 80 mm and a length of 340 mm, and dried at 120° C. for 20 minutes, whereby a charge transport layer with a thickness of 20 μm was provided on the aluminum cylinder.

A charge generation layer formation liquid was prepared as follows:

A mixture of the following components was pulverized and dispersed in a ball mill for 72 hours:

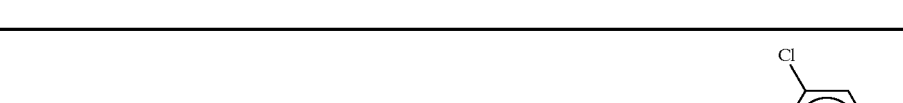

| | Parts by Weight |
|---|---|
| (compound shown above) | 22 |
| Polyethylene glycol monostearate (Trademark: "Ionet 400MS", made by Sanyo Chemical Industries, Ltd.) | 2 |
| Cyclohexanone | 440 |

To the above mixture was added a solution of 20 parts by weight of a polycarbonate resin in 400 parts by weight of methyl ethyl ketone, which polycarbonate resin was prepared in the same manner as in Production Example 11 except that the 1,1-bis(4-hydroxyphenyl)-1-(N,N-d-p-tolyl-4-aminophenyl)-ethane (Compound No. 1 in TABLE 1) was replaced by Compound No. 18 in TABLE 1.

The above mixture was dispersed for 3 hours and was then diluted with 1000 parts by weight of a mixed solvent composed of cyclohexanone and methyl ethyl ketone (1:1 by weight), whereby the charge generation layer formation liquid was prepared.

The thus prepared charge generation layer formation liquid was spray coated on the charge transport layer, dried at 130° C. for 60 minutes, whereby a charge generation layer with a thickness of 3 μm was provided on the charge transport layer. The thus provided charge generation layer was cured by being exposed to the light of a mercury lamp with a power of 120 W/Cm which was disposed at a distance of 8 cm from the charge generation layer and scanned at a speed of 1 m/min.

Thus, an electrophotographic photoconductor No. 20 of the present invention was fabricated.

EXAMPLE 21

The same charge transport layer as provided in Example 20 was provided on the outer surface of an aluminum cylinder with an outer diameter of 80 mm and a length of 340 mm in the same manner as in Example 20.

A charge generation layer formation liquid was then prepared are as follows:

A mixture of the following components was pulverized and dispersed in a ball mill for 48 hours:

| | Parts by Weight |
|---|---|
| Brominate Anthranthrone (Trademark, made by Imperial Chemical Industries Co., Ltd.) | 40 |
| Polyethylene glycol monostearyl | 2 |
| Cyclohexanone | 460 |

To the above mixture, 400 parts by weight of methyl ethyl ketone were added, and the mixture was dispersed again for 3 hours. This mixture was diluted with a solution of 40 parts by weight of a polycarbonate resin in a mixed solvent composed of 500 parts by weight of cyclohexanone and 500 parts by weight of methyl ethyl ketone, which polycarbonate resin was prepared in the same manner as in Production Example 11 except that the 1,1-bis(4-hydroxyphenyl)-1-(N,N-d-tolyl-4-aminophenyl)-ethane (Compound No. 1 in TABLE 1) was replaced by Compound No. 6 in TABLE 1.

The thus prepared charge generation layer formation liquid was spray coated on the charge transport layer, dried at 130° C. for 60 minutes, whereby a charge generation layer with a thickness of 5 μm was provided on the charge transport layer.

Thus, an electrophotographic photoconductor No. 21 of the present invention was fabricated.

EXAMPLE 22

A charge transport layer formation liquid prepared by mixing the following components:

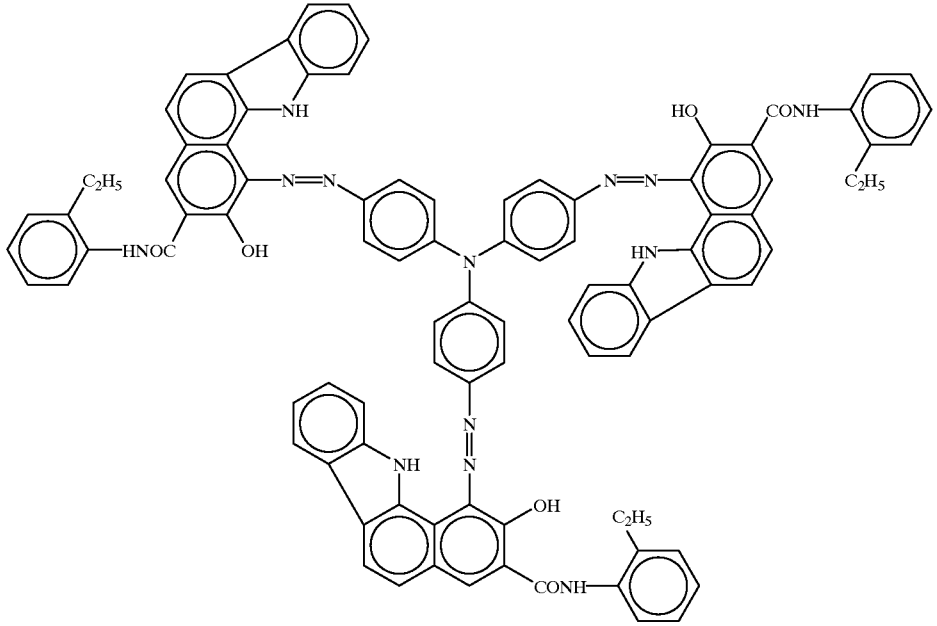

| | Parts by Weight |
|---|---|
| | 40 |
| Polyethylene glycol monostearyl | 3 |

| | Parts by Weight |
|---|---|
| Polycarbonate resin (Trademark: "C-1400", made by Teijin Chemicals Ltd.) | 100 |
| 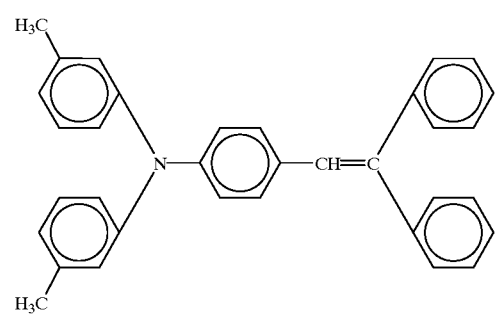 | 90 |
| Dichloromethane | 1000 |

The thus prepared charge transport layer formation liquid was coated by immersion coating on the outer surface of an aluminum cylinder with an outer diameter of 80 mm and a length of 340 mm, and dried at 120° C. for 20 minutes, whereby a charge transport layer with a thickness of 20 µm was provided on the aluminum cylinder.

A charge generation layer formation liquid was then prepared by pulverizing and dispersing a mixture of the following components in a ball mill for 48 hours:

To the above dispersion, 400 parts by weight of methyl ethyl ketone were added, and the mixture was dispersed for 3 hours.

This dispersed mixture was then diluted with a mixture of 40 parts by weight of polycarbonate resin No. 3 in TABLE 2, 500 parts by weight of cyclohexanone and 500 parts by weight of methyl ethyl ketone, whereby a charge generation layer formation liquid was prepared.

The thus prepared charge generation layer formation liquid was spray coated on the charge transport layer, dried at 130° C. for 60 minutes, whereby a charge generation layer with a thickness of 5 µm was provided on the charge transport layer.

Thus, an electrophotographic photoconductor No. 22 of the present invention was fabricated.

EXAMPLE 23

The same charge transport layer as provided in Example 22 was provided on the outer surface of an aluminum cylinder with an outer diameter of 80 mm and a length of 340 mm in the same manner as in Example 20.

A charge generation layer formation liquid was then prepared by pulverizing and dispersing a mixture of the following components by use of zirconia beads in a vibration mill:

| | Parts by Weight |
|---|---|
| Titanyl phthalocyanine with a maximum diffraction peak at 27.2° in terms of Bragg angle (2θ) in X-ray diffraction spectrum | 5 |
| Polyethylene glycol monostearyl | 0.3 |
| Polycarbonate resin No. 4 in TABLE 2 | 5 |
| Cyclohexanone | 300 |

The thus prepared charge generation layer formation liquid was spray coated on the charge transport layer, dried at 130° C. for 60 minutes, whereby a charge generation layer with a thickness of 5 μm was provided on the charge transport layer.

Thus, an electrophotographic photoconductor No. 23 of the present invention was fabricated.

COMPARATIVE EXAMPLE 3

The same charge transport layer as provided in Example 22 was provided on the outer surface of an aluminum cylinder with an outer diameter of 80 mm and a length of 340 mm.

A mixture of the following components was pulverized and dispersed in a ball mill for 72 hours:

| | Parts by Weight |
|---|---|
| [Structure: bis(methylphenyl)amino-phenyl-CH=C(phenyl)₂ compound] | 50 |
| Polycarbonate resin (Trademark: "C-1400", made by Teijin Chemicals Ltd.) | 100 |
| Tetrahydrofuran | 2000 |

The above charge generation layer coating liquid was spray coated on the charge transport layer and dried at 130° C. for 60 minutes, whereby a charge generation layer with a thickness of 5 μm was provided on the charge transport layer.

Thus, a comparative electrophotographic photoconductor No. 3 was fabricated.

Each of the electrophotographic photoconductors Nos. 20 to 23 of the present invention and the comparative electro-

| | Parts by Weight |
|---|---|
| [Bis-azo pigment structure with chlorophenyl-CONH, hydroxy, and fluorenone groups] | 22 |
| Polyethylene glycol monostearate (Trademark: "Ionet 400MS", made by Sanyo Chemical Industries, Ltd.) | 2 |
| Cyclohexanone | 440 |

To the above mixture, 600 parts by weight of cyclohexanone were added, and the mixture was dispersed for 3 hours. This dispersion was then diluted with 1000 parts by weight of cyclohexanone.

To the above diluted dispersion, there was added a mixture of the following components, whereby a charge generation layer coating liquid was prepared:

photographic photoconductor No. 3 was incorporated in a commercially available electrophotographic copying machine (Trademark "FT-6550" made by Ricoh Company, Ltd.), with an initial dark area surface potential ($V_0$) being set at −800 V, and an initial light area surface potential ($V_L$) at −80 V, and subjected to a durability test for making 20,000 copies.

The electrophotographic photoconductors Nos. 20 to 23 of the present invention produced clear images throughout the durability test for making 20,000 copies, but the comparative electrophotographic photoconductor No. 3 produced images with many non-printed streaks and black streaks during the durability test.

EXAMPLE 24

A mixture of the following components was dispersed in a ball mill for 72 hours:

2 in 500 parts by weight of cyclohexanone, whereby a photoconductive layer formation liquid was prepared.

The thus prepared photoconductive layer formation liquid was spray coated on the outer surface of an aluminum cylinder with an outer diameter of 80 mm and a length of 340 mm and dried at 140° C. for 30 minutes, whereby a single-layered type electrophotographic photoconductor No. 24 of the present invention was fabricated.

| | Parts by Weight |
|---|---|
| [Chemical structure] | 30 |
| Polyethylene glycol monostearyl (Trademark: "Ionet 400MS", made by Sanyo Chemical Industries, Ltd.) | 3 |
| Cyclohexanone | 440 |

To the above mixture, 400 parts by weight of methyl ethyl ketone were added, and the mixture was dispersed for 3 hours. This dispersion was then diluted with a solution of 50 parts by weight of the polycarbonate resin No. 5 in TABLE

COMPARATIVE EXAMPLE 4

A mixture of the following components was dispersed in a ball mill for 72 hours:

| | Parts by Weight |
|---|---|
| [bisazo pigment structure shown] | 30 |
| Polyethylene glycol monostearyl (Trademark: "Ionet 400MS", made by Sanyo Chemical Industries, Ltd.) | 3 |
| Cyclohexanone | 440 |

To the above mixture, 400 parts by weight of methyl ethyl ketone were added, and the mixture was dispersed for 3 hours. This dispersion was then diluted with a solution composed of 50 parts by weight of a commercially available polycarbonate resin (Trademark "PC%", made by Teijin Chemicals Ltd.), a charge transporting material of the following formula, and 500 parts by weight of cyclohexanone, whereby a photoconductive layer formation liquid was prepared:

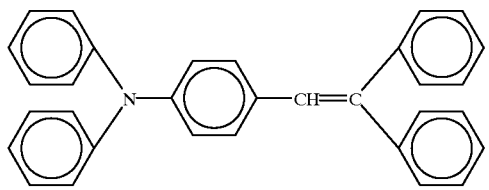

The thus prepared photoconductive layer formation liquid was spray coated on the outer surface of an aluminum cylinder with an outer diameter of 80 mm and a length of 340 mm and dried at 140° C. for 30 minutes, whereby a photoconductive layer with a thickness of 30 μm was provided on the aluminum cylinder.

Thus, a comparative single-layered type electrophotographic photoconductor No. 4 was fabricated.

EXAMPLE 25

A mixture of the following components was dispersed in a ball mill for 72 hours:

| | Parts by Weight |
|---|---|
| [dibromo dibenzanthrone structure with (Br)$_2$] | 6 |
| Polyethylene glycol monostearyl (Trademark: "Ionet 400MS", made by Sanyo Chemical Industries, Ltd.) | 2 |
| Cyclohexanone | 60 |

To the above mixture, 50 parts by weight of cyclohexanone were added, and the mixture was dispersed for 3 hours. This dispersion was then diluted with a solution of 20 parts by weight of the polycarbonate resin No. 1 in TABLE 2 in 120 parts by weight of cyclohexanone, whereby a photoconductive layer formation liquid was prepared.

The thus prepared photoconductive layer formation liquid was spray coated on the outer surface of an aluminum cylinder with an outer diameter of 80 mm and a length of 340 mm and dried at 140° C. for 30 minutes, whereby a photoconductive layer with a thickness of 30 μm was formed on the aluminum cylinder.

Thus, a single-layered type electrophotographic photoconductor No. 25 of the present invention was fabricated.

EXAMPLE 26

A mixture of the following components was dispersed in a ball mill for 72 hours:

|  | Parts by Weight |
|---|---|
| [Structural formula: bis-azo compound with two chlorophenyl-HNOC-OH-naphthyl-N=N- groups linked through a fluorenone center] | 7 |
| Polyethylene glycol monostearyl (Trademark: "Ionet 400MS", made by Sanyo Chemical Industries, Ltd.) | 3 |
| Cyclohexanone | 60 |

To the above mixture, 50 parts by weight of cyclohexanone were added, and the mixture was dispersed for 3 hours. This dispersion was then diluted with a solution of 20 parts by weight of the polycarbonate resin No. 3 and 10 parts by weight of the polycarbonate resin No. 2 in TABLE 2 in 120 parts by weight of cyclohexanone, whereby a photoconductive layer formation liquid was prepared.

The thus prepared photoconductive layer formation liquid was spray coated on the outer surface of an aluminum cylinder with an outer diameter of 80 mm and a length of 340 mm and dried at 140° C. for 30 minutes, whereby a photoconductive layer with a thickness of 30 μm was formed on the aluminum cylinder.

Thus, a single layered type electrophotographic photoconductor No. 26 of the present invention was fabricated.

EXAMPLE 27

A mixture of the following components was dispersed in a ball mill for 72 hours:

|  | Parts by Weight |
|---|---|
| Titanyl phthalocyanine with a maximum diffraction peak at 27.2° in terms of Bragg angle (2θ) in X-ray diffraction spectrum | 6 |
| Polyethylene glycol monostearyl (Trademark: "Ionet 400MS", made by Sanyo Chemical Industries, Ltd.) | 3 |
| Cyclohexanone | 60 |

To the above mixture, 50 parts by weight of cyclohexanone were added, and the mixture was dispersed for 3 hours. This dispersion was then diluted with a solution of 20 parts by weight of the polycarbonate resin No. 6 and 20 parts by weight of the polycarbonate resin No. 7 in TABLE 2 in 120 parts by weight of cyclohexanone, whereby a photoconductive layer formation liquid was prepared.

The thus prepared photoconductive layer formation liquid was spray coated on the outer surface of an aluminum cylinder with an outer diameter of 80 mm and a length of 340 mm and dried at 140° C. for 30 minutes, whereby a photoconductive layer with a thickness of 30 μm was formed on the aluminum cylinder.

Thus, a single-layered type electrophotographic photoconductor No. 27 of the present invention was fabricated.

COMPARATIVE EXAMPLE 5

A mixture of the following components was dispersed in a ball mill for 72 hours;

|  | Parts by Weight |
|---|---|
| [Structural formula: polycyclic aromatic diketone with $(Br)_2$ substituent] | 6 |
| Polyethylene glycol monostearyl (Trademark: "Ionet 400MS", made by Sanyo Chemical Industries, Ltd.) | 3 |
| Cyclohexanone | 60 |

To the above mixture, 50 parts by weight of cyclohexanone were added, and the mixture was dispersed for 3 hours. This dispersion was then diluted with a solution of 10 parts by weight of a commercially available polycarbonate resin (Trademark: "C-1400", made by Teijin Chemicals Ltd.) and 10 parts by weight of a charge transporting material of the following formula in a mixed solvent of 60 parts by weight of cyclohexanone and 60 parts by weight of tetrahydrofuran, whereby a photoconductive layer formation liquid was prepared:

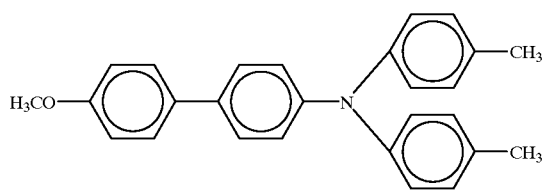

The thus prepared photoconductive layer formation liquid was spray coated on the outer surface of an aluminum cylinder with an outer diameter of 80 mm and a length of 340 mm and dried at 140° C. for 30 minutes, whereby a photoconductive layer with a thickness of 30 μm was formed on the aluminum cylinder.

Thus, a comparative single-layered type electrophotographic photoconductor No. 5 was fabricated.

COMPARATIVE EXAMPLE 6

A mixture of the following components was dispersed in a ball mill for 72 hours:

photoconductive layer with a thickness of 30 μm was formed on the aluminum cylinder.

Thus, a comparative single-layered type electrophotographic photoconductor No. 6 was fabricated.

Each of the above fabricated electrophotographic photoconductor Nos. 24 to 27 of the present invention and the comparative electrophotographic photoconductors Nos. 4 to 6 was incorporated in the previously mentioned test apparatus as described in Japanese Laid-Open Patent Application 60-100167. A voltage of +6 KV was applied to each photoconductor in the dark for 20 seconds while the photoconductor was rotated at 1000 rpm and the surface potential Vm of the photoconductor after this charge application was measured.

Each photoconductor was allowed to stand in the dark without applying any charges thereto for 20 seconds to measure the dark decay thereof, and the surface potential $V_0(V)$ of the photoconductor after the dark decay was measured.

The photoconductor was then illuminated by a tungsten lamp with a slit width of 6 mm in such a manner that the illuminance on the illuminated surface of the photoconduc-

|  | Parts by Weight |
|---|---|
| [structure shown] | 7 |
| Polyethylene glycol monostearyl (Trademark: "Ionet 400MS", made by Sanyo Chemical Industries, Ltd.) | 3 |
| Cyclohexanone | 60 |

To the above mixture, 50 parts by weight of cyclohexanone were added, and the mixture was dispersed for 3 hours. This dispersion was then diluted with a solution of 10 parts by weight of a commercially available polycarbonate resin (Trademark: "PCZ", made by Mitsubishi Gas Chemical Company, Ltd.) and 10 parts by weight of a charge transporting material of the following formula in 120 parts by weight of cyclohexanone, whereby a photoconductive layer formation liquid was prepared:

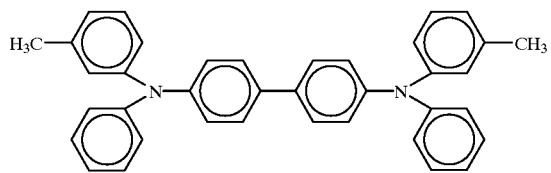

The thus prepared photoconductive layer formation liquid was spray coated on the outer surface of an aluminum cylinder with an outer diameter of 80 mm and a length of 340 mm and dried at 140° C. for 30 minutes, whereby a tor was 26 lux, and the exposure $E_{1/2}$ (lux sec) required to reduce the surface potential $V_0$ (V) to ½ the surface potential $V_0$ (V) was measured. Furthermore, the exposure $E_{1/10}$ (lux sec) required to reduce the surface potential $V_0$ (V) to 1/10 the surface potential $V_0$ (V) was also measured under the same conditions as mentioned above. The results are shown in TABLE 5.

Furthermore, the residual surface potential Vr (V) of each photoconductor was measured by exposing the surface of the photoconductor to the above-mentioned light of the tungsten lamp for 20 seconds. The result is also shown in TABLE 5.

TABLE 5

|  | Vm (V) | $V_0$ (V) | $E_{1/2}$ (Lux · Sec) | $E_{1/10}$ (Lux · Sec) | Vr (V) |
|---|---|---|---|---|---|
| Ex. 24 | 1280 | 1590 | 1.08 | 3.56 | 10 |
| Ex. 25 | 1360 | 1170 | 2.80 | 5.82 | 20 |
| Ex. 26 | 1100 | 870 | 1.28 | 2.78 | 15 |
| Ex. 27 | 1050 | 790 | 0.63 | 1.64 | 30 |

TABLE 5-continued

|  | Vm (V) | $V_0$ (V) | $E_{1/2}$ (Lux · Sec) | $E_{1/10}$ (Lux · Sec) | Vr (V) |
|---|---|---|---|---|---|
| Comp. Ex. 4 | 1330 | 1180 | 1.01 | 3.13 | 10 |
| Comp. Ex. 5 | 1420 | 1270 | 2.65 | 5.52 | 25 |
| Comp. Ex. 6 | 1380 | 1150 | 1.23 | 2.58 | 10 |

Each of the electrophotographic photoconductors Nos. 24 to 27 of the present invention and the comparative electrophotographic photoconductors Nos. 4 to 6 was incorporated in a commercially available electrophotographic copying machine (Trademark "FT-6550" made by Ricoh Company, Ltd.), with an initial dark area surface potential ($V_0$) being set at 800 V, and an initial light area surface potential ($V_L$) at 80 V, and subjected to a durability test for making 50,000 copies.

The electrophotographic photoconductors Nos. 24 to 27 of the present invention produced clear images throughout the durability test for making 50,000 copies, free from abnormal images and the abrasion and scratches in the photoconductors, but the comparative electrophotographic photoconductors Nos. 4 to 6 produced images with many non-printed streaks, black streaks and black dots during the durability test.

EXAMPLE 28

An overcoat layer with a thickness of 4 μm was provided on the charge transport layer of the comparative electrophotographic photoconductor No. 1 fabricated in Comparative Example 1 by spray coating a 5% cyclohexanone solution of the polycarbonate resin No. 7 in TABLE 2 on the charge transport layer, and drying the coated cyclohexanone solution at 130° C. for 40 minutes, whereby an electrophotographic photoconductor No. 28 of the present invention was fabricated.

The thus fabricated photoconductor No. 28 was incorporated in a commercially available electrophotographic copying machine (Trademark "FT-4820" made by Ricoh Company, Ltd.) and subjected to the same durability test for making 100,000 copies as in Example 1.

The result was that clear images were obtained throughout this durability test.

Thus, even when the polycarbonate resin for use in the present invention was employed in the overcoat layer, the polycarbonate imparted excellent electric characteristics and anti-abrasion performance to the photoconductor, thereby providing the excellent image quality.

The results of Examples 1 to 28 and Comparative Examples 1 to 6 indicate that the polycarbonate resins having the triarylamine structure for use in the present invention have a charge transporting function and high mechanical strength, so that such a polycarbonate resin is employed in the electrophotographic photoconductors of the above-mentioned type, high photosensitivity and excellent durability are imparted thereto.

Furthermore, such polycarbonate resins having the triarylamine structure can also be employed in electrophotographic photoconductors for wet development, which use paraffin solvents such as Isopar G, and Isopar H as the carrier for liquid developers therefor since low-molecular-weight charge transporting materials are not eluted from such polycarbonate resins.

In fact, when the single-layered type electrophotographic photoconductor No. 27 fabricated in Example 27 was employed in a commercially available copying machine (Trademark "9350 Type" made by Savin Company, Ltd.) of a wet type electrophotographic process, the photoconductor was not damaged at all even when 5,000 copies were made.

EXAMPLE 29

On an aluminum plate with a thickness of 0.2 mm, an adhesive layer with a thickness of 0.5 μm was provided by applying a tetrahydrofuran solution of a commercially available polyvinyl butyral (Trademark "XYHL", made by UCC Company, Ltd.) thereto and drying the same.

A 13% dichloromethane solution of polycarbonate resin No. 8 in TABLE 2 was coated on the adhesive layer by use of a blade, and dried at 130° C. for 30 minutes, whereby a resin layer with a thickness of 25 μm was formed on the adhesive layer.

This resin layer was abraded by an abrasion wheel CS-10 of a commercially available rotary application tester made by Toyo Seiki Seisaku-Sho, Ltd., with the abrasion wheel rotated at 1500 rpm. The abraded amount of the resin layer was 2.2 mg as shown in TABLE 6.

EXAMPLES 30 to 32

The same abrasion test as in Example 29 was repeated except that polycarbonate resin No. 8 in TABLE 2 employed in Example 29 was replaced by polycarbonate resins No. 9, No. 10 and No. 11, respectively, whereby the abraded amounts of the respective resin layers were measured.

The results are shown in TABLE 6.

COMPARATIVE EXAMPLES 7 TO 8

The same abrasion test as in Example 29 was repeated except that polycarbonate resin No. 8 in TABLE 2 employed in Example 29 was replaced by the charge transport layer formation liquid in Comparative Example 1 and the charge transport layer formation liquid in Comparative Example 2, respectively, whereby the abraded amounts of the respective resin layers were measured. The results are shown in TABLE 6.

TABLE 6

|  | Resin-containing Liquid | Abrasion Amount (mg) |
|---|---|---|
| Ex. 29 | Polycarbonate resin No. 8 in TABLE 2 contained | 2.2 |
| Ex. 30 | Polycarbonate resin No. 9 in TABLE 2 contained | 2.3 |
| Ex. 31 | Polycarbonate resin No. 10 in TABLE 2 contained | 2.8 |
| Ex. 32 | Polycarbonate resin No. 11in TABLE 2 contained | 3.1 |
| Comp. Ex. 7 | CTL Formation Liquid in Comparative Example 1 | 9.3 |
| Comp. Ex. 8 | CTL Formation Liquid in Comparative Example 2 | 12.5 |

The present invention also provides an aromatic polycarbonate resin (III) comprising a repeating unit of formula (1):

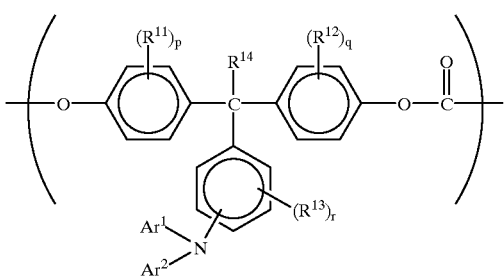

(1)

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; $Ar^1$ and $Ar^2$ each represents an unsubstituted or substituted aromatic hydrocarbon group; and a methylene chloride solution of the polycarbonate resin, which is prepared by dissolving 0.7 g of the polycarbonate resin in 100 ml of methylene chloride, having a specific viscosity in a range of 0.068 to 1.04 at 20° C.

Furthermore, the present invention provides an aromatic polycarbonate resin (IV) comprising:

a repeating unit of formula (1):

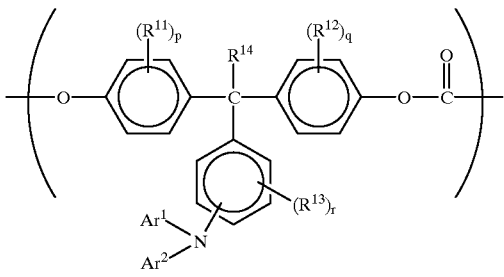

wherein $R^{11}$, $R^{12}$ and $R^{13}$ each independently represents a hydrocarbon group having 1 to 5 carbon atoms, or a halogen atom; p, q and r independently is an integer of 0 to 4; $R^{14}$ represents a hydrogen atom, a hydrocarbon group; $Ar^1$ and $Ar^2$ each represents an unsubstituted or substituted aromatic hydrocarbon group; and a repeating unit of formula (2):

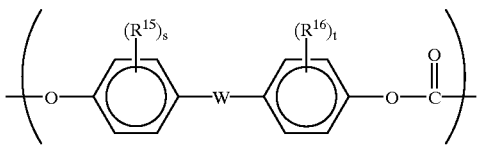

wherein $R^{15}$ and $R^{16}$ each independently represents a hydrocarbon group having 1 to 5 carbon atoms, or a halogen atom; s and t each independently is an integer of 0 to 4; W represents a single bond, a straight chain, branched or cyclic bivalent hydrocarbon group having 1 to 12 carbon atoms, which may comprise a benzene ring therein, an oxide group, a sulfide group, a sulfoxide group, a sulfone group, or a ketone group; a methylene chloride solution of the aromatic polycarbonate resin, which is prepared by dissolving 0.7 g of the aromatic polycarbonate resin in 100 ml of methylene chloride, having a specific viscosity in a range of 0.168 to 1.04 at 20° C.

The above aromatic polycarbonate resins (III) and (IV) are useful not only for the previously mentioned electrophotographic photoconductors, but also for the materials for liquid display panels, optical cards, optical discs, varieties of films having high transparency and heat resistance, deposited plastic reflecting mirrors, and lenses.

The aromatic polycarbonate resin (III) can be synthesized by allowing a bivalent phenolic compound having a tertiary amino group of the following formula (V) to react with a carbonate precursor material:

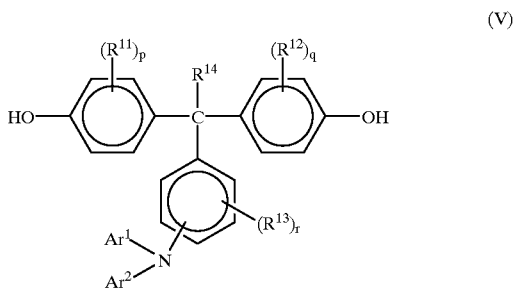

(V)

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; and $Ar^1$ and $Ar^2$ each represents an unsubstituted or substituted aromatic hydrocarbon group.

Specific examples of the above bivalent phenolic compound are as follows:

1,1-bis(4-hydroxyphenyl)-1-(4-N,N-ditolylaminophenyl) methane,
1,1-bis(3-methyl-4-hydroxyphenyl)-1-(4-N,N-ditolylaminophenyl)methane,
1,1-bis(4-hydroxyphenyl)-1-(4-N,N-ditolylaminophenyl) ethane,
1,1-bis(3-methyl-4-hydroxyphenyl)-1-(4-N,N-ditolylaminophenyl)ethane,
1,1-bis(3-bromo-4-hydroxyphenyl)-1-(4-N,N-ditolylaminophenyl)ethane,
1,1-bis(4-hydroxyphenyl)-1-(4-N,N-ditolylaminophenyl) propane,
1,1-bis(4-hydroxyphenyl)-1-(4-N,N-bis(biphenylyl) aminophenyl)methane,
1,1-bis(4-hydroxyphenyl)-1-[4-N,N-bis(biphenylyl) aminophenyl]ethane,
1,1-bis(4-hydroxyphenyl)-1-[4-N,N-bis(biphenyl) aminophenyl]propane,
1,1-bis(4-hydroxyphenyl)-1-(4-N,N-bis(p-methoxyphenyl) aminophenyl)methane,
1,1-bis(4-hydroxyphenyl)-1-(4-N,N-di-p-tolylaminophenyl) ethane,
1,1-bis(4-hydroxyphenyl)-1-(4-N,N-bis(p-methoxyphenyl) aminophenyl)ethane,
1,1-bis(4-hydroxyphenyl)-1-(4-N,N-bis(p-methoxyphenyl) aminophenyl)propane,
1,1-bis(4-hydroxyphenyl)-1-(4-N,N-dipyrenylaminophenyl)ethane,
1,1-bis(4-hydroxyphenyl)-1-[4-(N-tolyl-N-biphenylyl) aminophenyl]ethane, 1,1-bis(4-hydroxyphenyl)-1-[4-(N,N-bis(4-methylbiphenylyl)aminophenyl]ethane, 1,1-bis(4-hydroxyphenyl)-1-(4-N,N-diphenylaminophenyl)ethane, and 1,1-bis(4-hydroxyphenyl)-1-(4-N-tolyl-N-pyrenylaminophenyl)ethane Specific examples of the carbonate precursor compound are phosgene, diphenyl carbonate, di-p-tolyl carbonate, phenyl-p-tricarbonate, di-p-chlorophenyl carbonate, diphenyl naphthyl carbonate, and bischloroformates of the above given biphenols.

Of the above carbonate precursors, phosgene and diphenyl carbonate are preferable for use in the present invention.

The previously mentioned bivalent phenolic compound having a tertiary amino group of formula (V) can be allowed to react with any of the above-mentioned carbonate precursor compounds in accordance with the conventional reaction procedures for producing conventional aromatic polycarbonate resins, for instance, by the reaction between a bivalent phenol and phosgene, or by the ester interchange reaction between a bivalent phenol and a bisaryl carbonate.

The reaction between a bivalent phenol and phosgene is usually carried out in the presence of an acid bonding agent and a solvent.

As the acid bonding agent, for instance, an alkali metal hydroxide such as sodium hydroxide or potassium hydroxide, or pyridine is employed.

As the solvent for the reaction, for instance, a halogenated hydrocarbon, such as methylene chloride or chlorobenzene, is employed.

For promoting the reaction, catalysts such as tertiary amines and quaternary ammonium salts may be employed.

For adjusting the molecular weight of the polycarbonate to be produced, it is preferable to employ a terminator such as phenol or p-tert-butylphenol. The reaction is usually carried out at 0 to 40° C. for several minutes to 5 hours. It is preferable that the pH of the reaction mixture be maintained at 10 or more.

The ester interchange reaction is carried out by mixing a bivalent phenol and a bisaryl carbonate in the presence of an inert gas at 120 to 350° C. under reduced pressure. The degree of the pressure reduction is changed stepwise in the course of the reaction, and finally, the produced phenols are distilled away from the reaction system with the pressure thereof being reduced to less than 1 mmHg. The reaction time is usually about 1 to 4 hours. When necessary, a molecular weight adjustment agent and an antioxidant may be added to the reaction mixture.

The thus synthesized polycarbonate resin is useful for making molded products, and as a modifier for improving the heat resistance of other aromatic polycarbonates.

As the polycarbonate resin for such molded products and modifier, it is preferable that the specific viscosity of a methylene chloride solution of the aromatic polycarbonate resin, which is prepared by dissolving 0.7 g of the aromatic polycarbonate resin in 100 ml of methylene chloride, be in a range of 0.168 to 1.04 at 20° C., although a polycarbonate resin with the specific viscosity thereof being in a range of 0.068 to less than 0.168 can be employed as a material for the modifier.

When the previously mentioned polycarbonate resin (III) of the present invention is synthesized by allowing the bivalent phenolic compound having a tertiary amino group of formula (V) to react with a carbonate precursor, if a bivalent phenolic compound of the following formula (VI) is also employed, the previously mentioned aromatic polycarbonate resin (IV) can be produced:

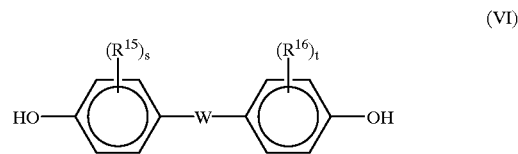

(VI)

wherein $R^{15}$ and $R^{16}$ each independently represents a hydrocarbon group having 1 to 5 carbon atoms, or a halogen atom; s and t each independently is an integer of 0 to 4; W represents a single bond, a straight chain, branched or cyclic bivalent hydrocarbon group having 1 to 12 carbon atoms, which may comprises a benzene ring therein, an oxide group, or a sulfide group, a sulfoxide group, a sulfone group, or a ketone group.

In the aromatic polycarbonate resin (IV), the ratio of the previously mentioned repeating unit (1) to the repeating unit (2) can be largely adjusted in accordance with the desired properties of the aromatic polycarbonate resin (IV) to be synthesized.

Specific examples of the bivalent phenolic compound of formula (VI) are as follows:

4,4'-dihydroxydiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane (hereinafter referred to as "bisphenol A"), 2,2-bis(3-methyl-4-hydroxyphenyl)propane, 1,1-bis(4-hydroxyphenyl)cyclohexane (hereinafter referred to as "bisphenol Z"), 2,2-bis(3-phenyl-4-hydroxyphenyl)propane, 2,2-bis(3-isopropyl-4-hydroxyphenyl)propane, 2,2-bis(4-hydroxyphenyl)butane, 2,2-bis(3,5-dimethyl-4-hydroxyphenyl)propane, 2,2-bis(3,5-dibromo-4-hydroxyphenyl)propane, 4,4'-dihydroxydiphenylsulfone, 4,4'-dihydroxydiphenylsulfoxide, 4,4'-dihydroxydiphenylsulfide, 3,3'-dimethyl-4,4'-dihydroxydiphenylsulfide, and 4,4'-dihydroxydiphenyloxide.

Of the above bivalent phenolic compounds, bisphenol A and bisphenol B are particularly preferable for use in the above synthesis.

In the synthesis of the above polycarbonate resin, a small amount of a three-functional compound may be employed as a branching agent. Alternatively, part of, for instance, bisphenol, can be replaced by a dicarboxylic acid.

It is preferable that the specific viscosity of a methylene chloride solution of the aromatic polycarbonate resin (IV) comprising the repeating unit of formula (1) and the repeating unit of formula (2), which methylene chloride solution is prepared by dissolving 0.7 g of the aromatic polycarbonate resin in 100 ml of methylene chloride, be in a range of 0.168 to 1.040 at 20° C.

The aromatic polycarbonate resins of the present invention can be molded by any molding methods such as injection molding, extrusion molding, and solution casting. In the case of an aromatic polycarbonate resin with an extremely high glass transition point, solution casting is preferable for the molding thereof.

When necessary, additives such as thermal stabilizer, antioxidant, light stabilizer, coloring agent, antistatic agent, lubricant and releasing agent can be added to the aromatic polycarbonate resins of the present invention.

EXAMPLE 33

154.2 parts by weight of ion-exchanged water and 19.7 parts by weight of a 48% aqueous solution of sodium hydroxide were placed in a reactor equipped with a thermometer, a stirrer and a dropping funnel.

38.7 parts by weight of 1,1-bis(4-hydroxyphenyl)-1-(4-N,N-di-p-tolylaminophenyl)ethane, 0.14 parts by weight of p-tert-butylphenol, and 0.07 parts by weight of hydrosulfite were dissolved in the above reaction mixture.

To the above-mentioned reaction mixture, 108.8 parts by weight of methylene chloride and 0.04 parts by weight of triethylamine were added, and 9.5 parts by weight of phosgene was blown through the reaction mixture over a period of 45 minutes. After the blowing of the phosgene, 3.3 parts by weight of a 48% aqueous solution of sodium hydroxide was added to the reaction mixture, and the reaction mixture was stirred at 28–33° C. for about 1 hour to complete the reaction.

The reaction product was then diluted with methylene chloride. The diluted mixture was washed with water, made acidic with the addition of hydrochloric acid, and then washed with water. When the electric conductivity of the water phase of this mixture became almost the same as that of the ion exchanged water, the methylene chloride was caused to evaporate, whereby 38.8 parts by weight of a colorless polymer, an aromatic polycarbonate resin, were obtained in a yield of 95%.

The specific viscosity of the thus obtained polymer was 0.403 and the glass transition point thereof was 199° C.

The above specific viscosity was determined by dissolving 0.7 g of the above obtained polymer in 100 ml of methylene chloride, and measuring the specific viscosity of the solution at 20° C.

The glass transition point of the above polymer was measured by a commercially available tester (Trademark "DSC-910 Type" made by Du Pont Co., Ltd.).

A casting film with a thickness of 0.2 mm was prepared from a methylene chloride solution of the thus obtained polymer. The total light transparency of the casting film was 91%.

Figure 9:
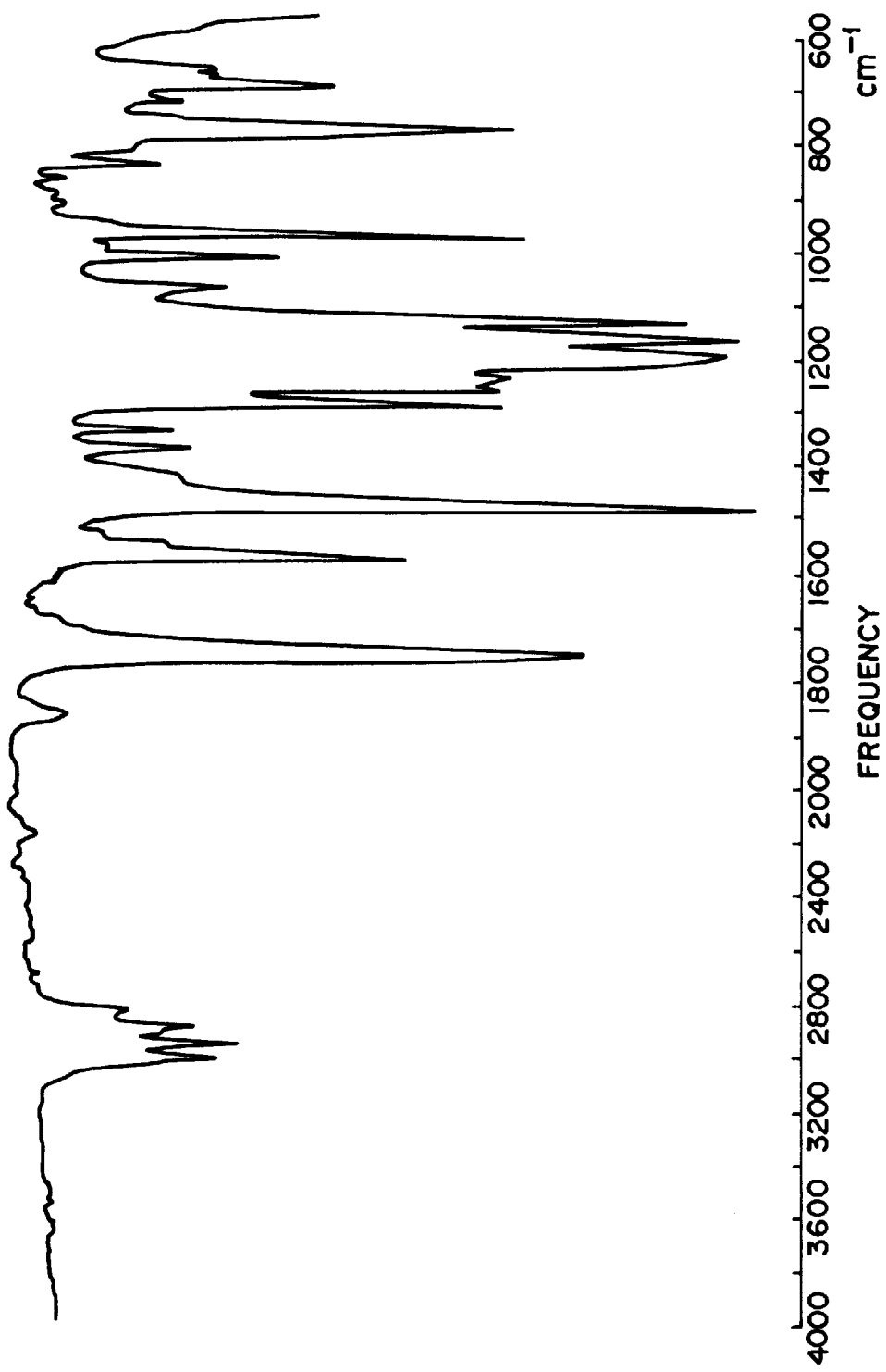
FIG. 9 is an infrared spectrum of an aromatic polycarbonate resin synthesized in Example 33.

An infrared spectrum of the thus synthesized aromatic polycarbonate resin is shown in FIG. 9.

EXAMPLE 34

The procedure for the synthesis of the aromatic polycarbonate resin in Example 33 was repeated except that 38.7 parts by weight of 1,1-bis(4-hydroxyphenyl)-1-(4-N,N-di-p-tolylaminophenyl)ethane employed in Example 33 were replaced by 19.3 parts by weight of 1,1-bis(4-hydroxyphenyl)-1-(4-N,N-di-p-tolylaminophenyl)ethane and 10.7 parts by weight of bisphenol z, whereby 48.2 parts by weight of a colorless polymer, an aromatic polycarbonate, were obtained in a yield of 97%. The specific viscosity of the thus obtained aromatic polycarbonate was 0.688 and the glass transition point thereof was 193° C., which were respectively measured in the same manner as in Example 33.

The total light transparency of a casting film with a thickness of 0.2 mm prepared in the same manner as in Example 33 from a methylene chloride solution of the thus obtained polymer was 91%.

Figure 10:
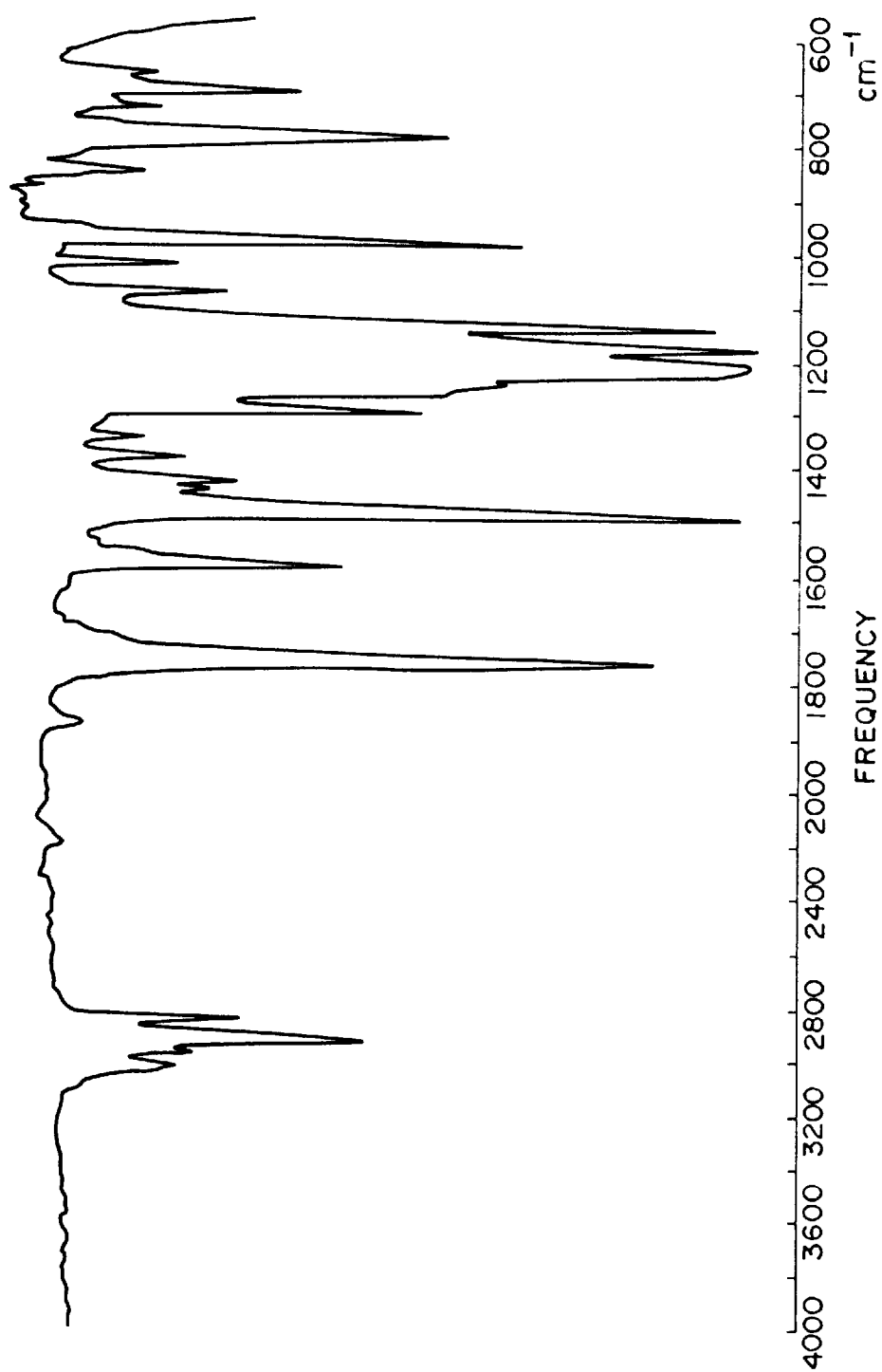
FIG. 10 is an infrared spectrum of an aromatic polycarbonate resin synthesized in Example 34.

An infrared spectrum of the thus synthesized aromatic polycarbonate resin is shown in FIG. 10.

EXAMPLE 35

The procedure for the synthesis of the aromatic polycarbonate resin in Example 33 was repeated except that 38.7 parts by weight of 1,1-bis(4-hydroxyphenyl)-1-(4-N,N-di-p-tolylaminophenyl)ethane employed in Example 33 were replaced by 38.7 parts by weight of 1,1-bis(4-hydroxyphenyl)- 1-(3-N,N-di-p-tolylaminophenyl)ethane, whereby 39.6 parts by weight of a colorless polymer, an aromatic polycarbonate, were obtained in a yield of 97%.

The specific viscosity of the thus obtained aromatic polycarbonate was 0.406 and the glass transition point thereof was 157° C., which were respectively measured in the same manner as in Example 33.

The total light transparency of a casting film with a thickness of 0.2 mm prepared in the same manner as in Example 33 from a methylene chloride solution of the thus obtained polymer was 91%.

Figure 11:
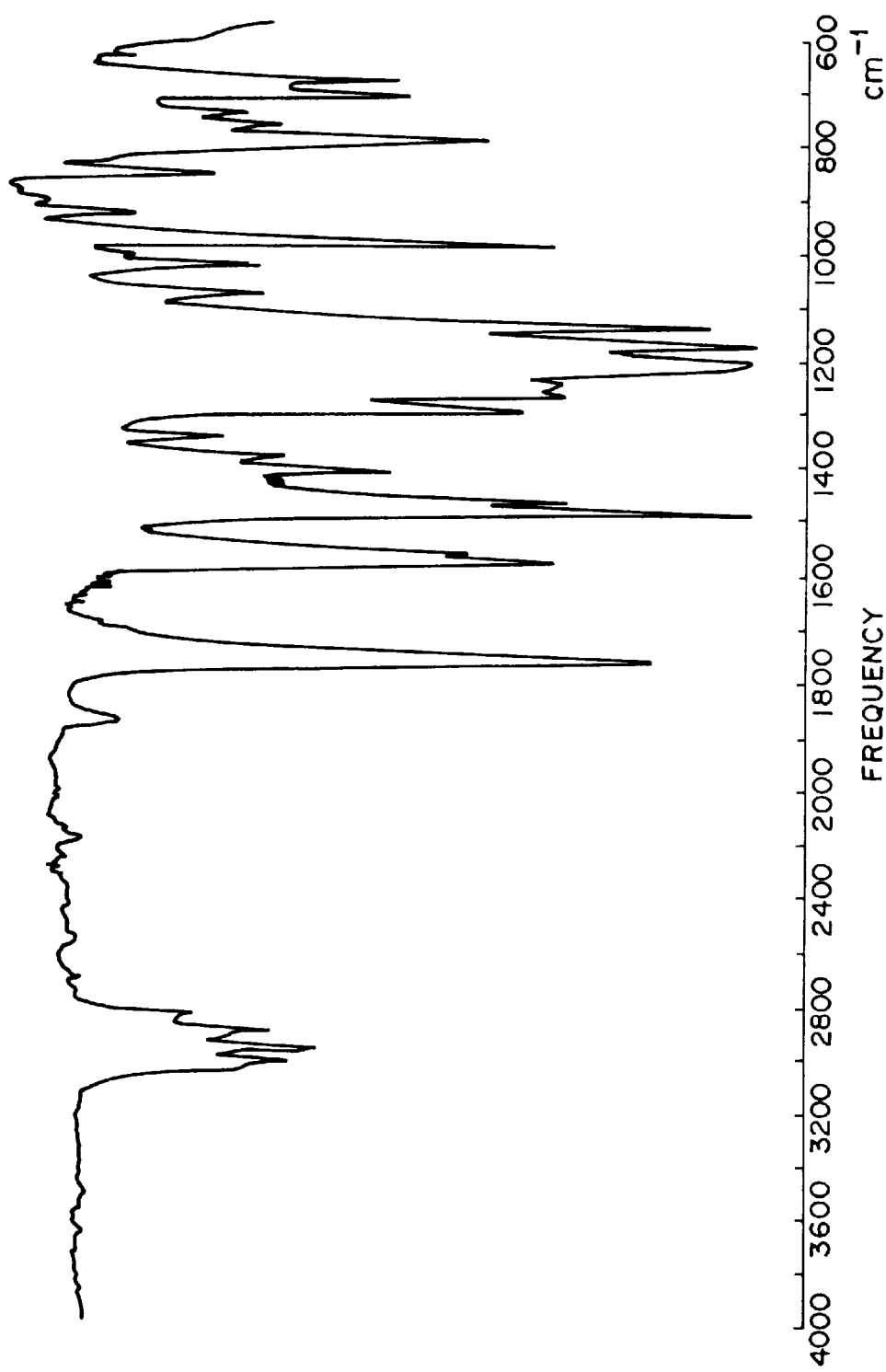
FIG. 11 is an infrared spectrum of an aromatic polycarbonate resin synthesized in Example 35.
Figure 12:
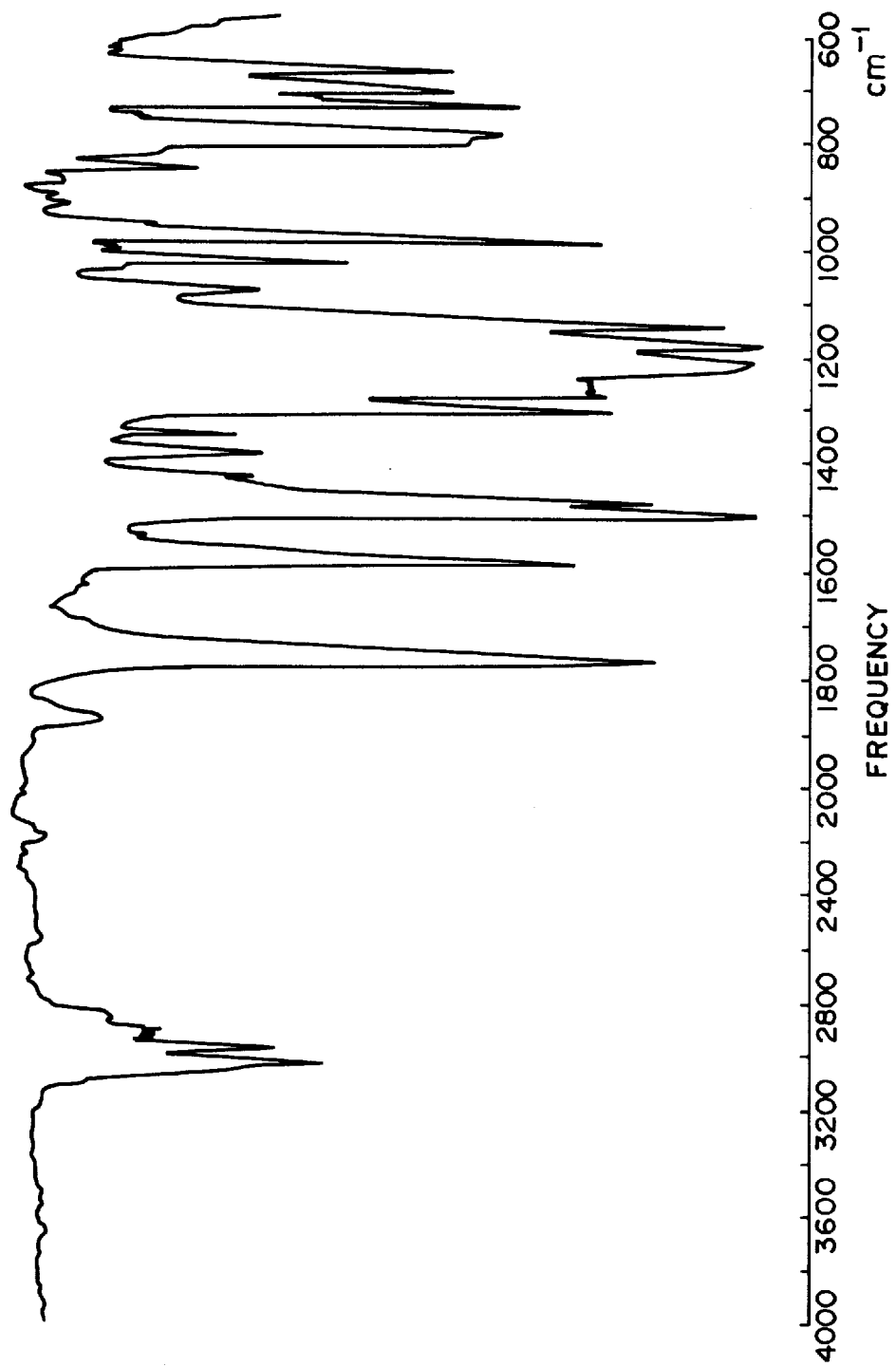
FIGS. 12–20 are infrared spectra of aromatic polycarbonate resins synthesized, respectively, in Examples 36–44.
Figure 13:
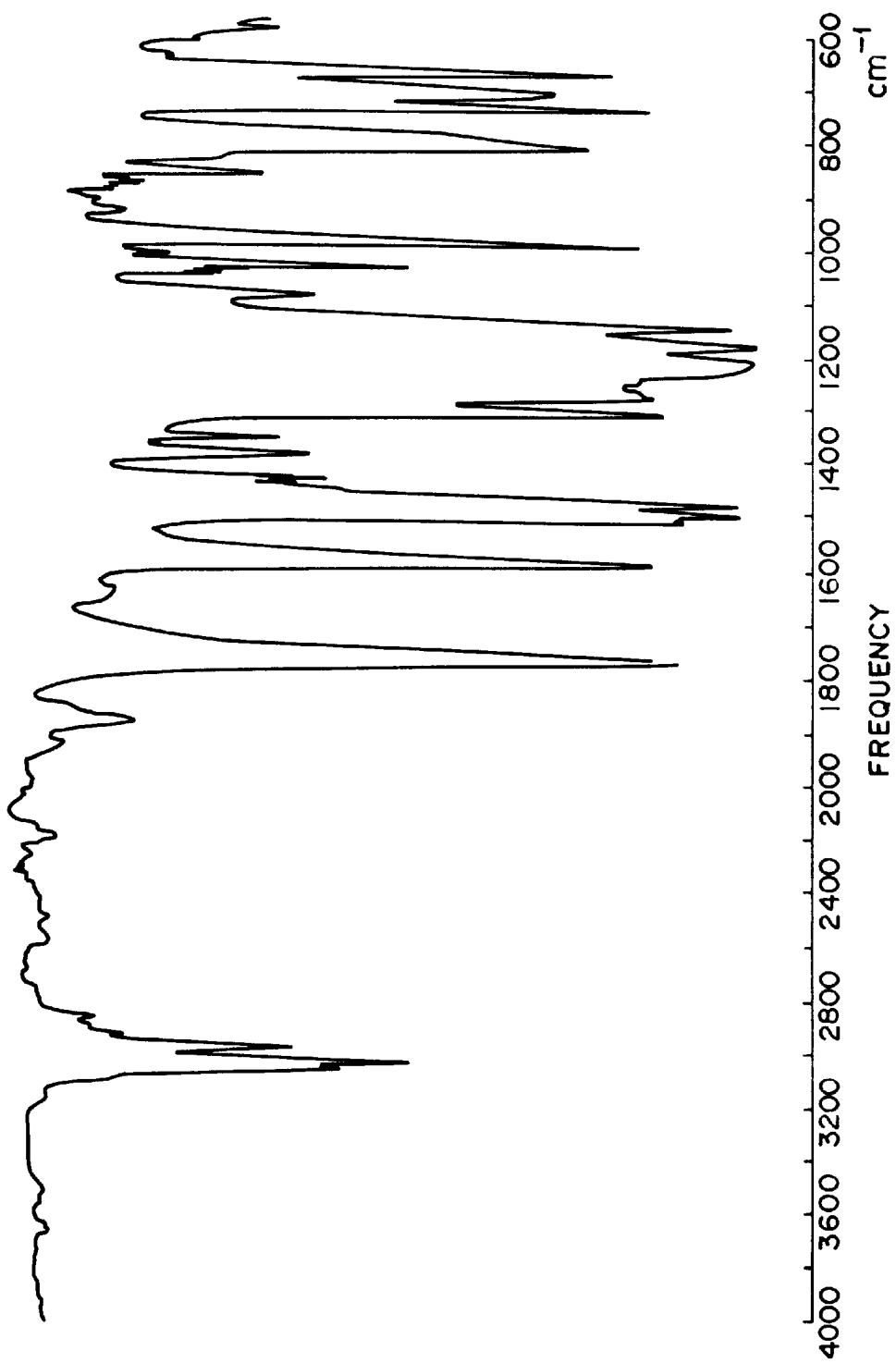
Figure 14:
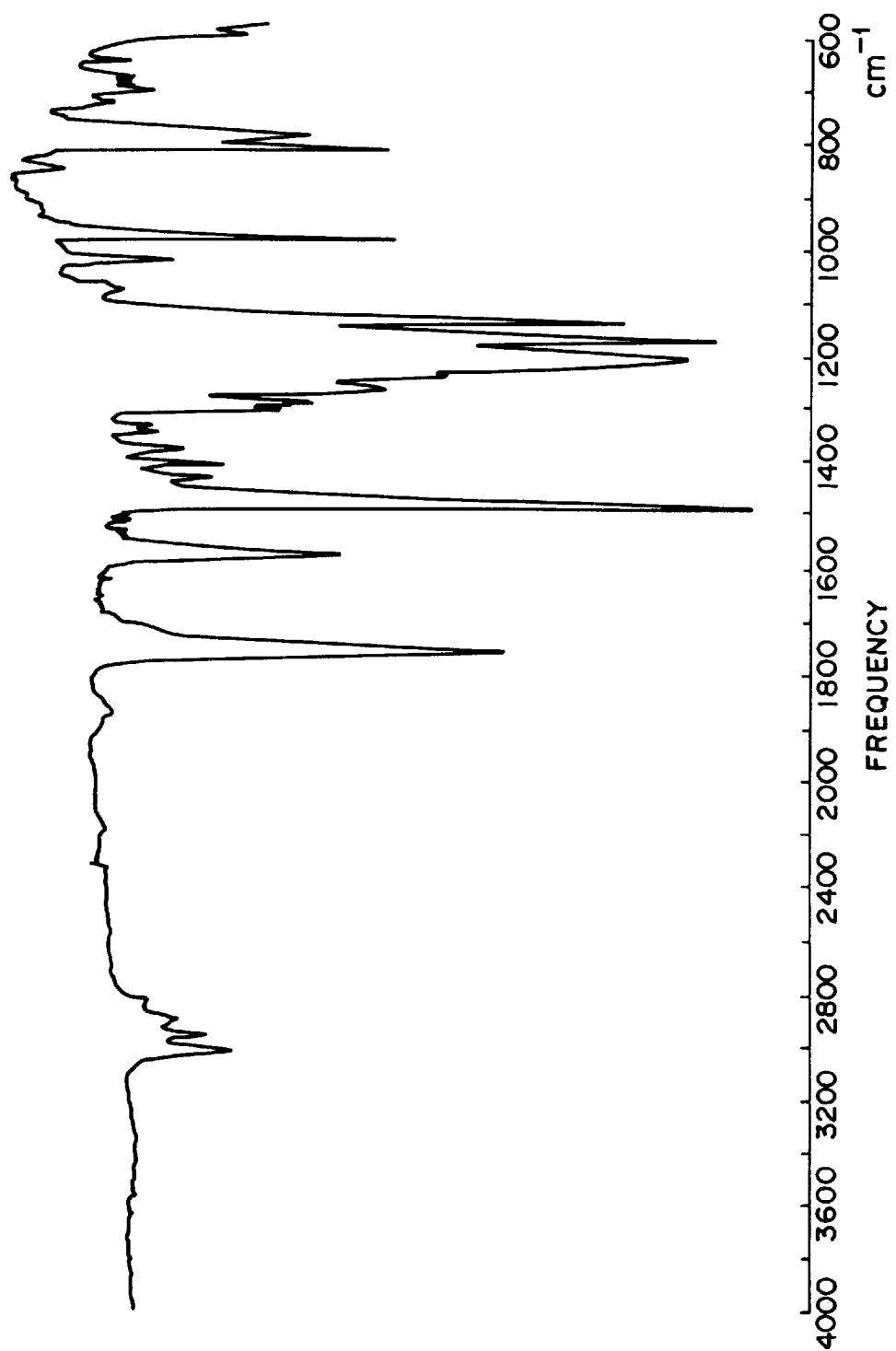
Figure 15:
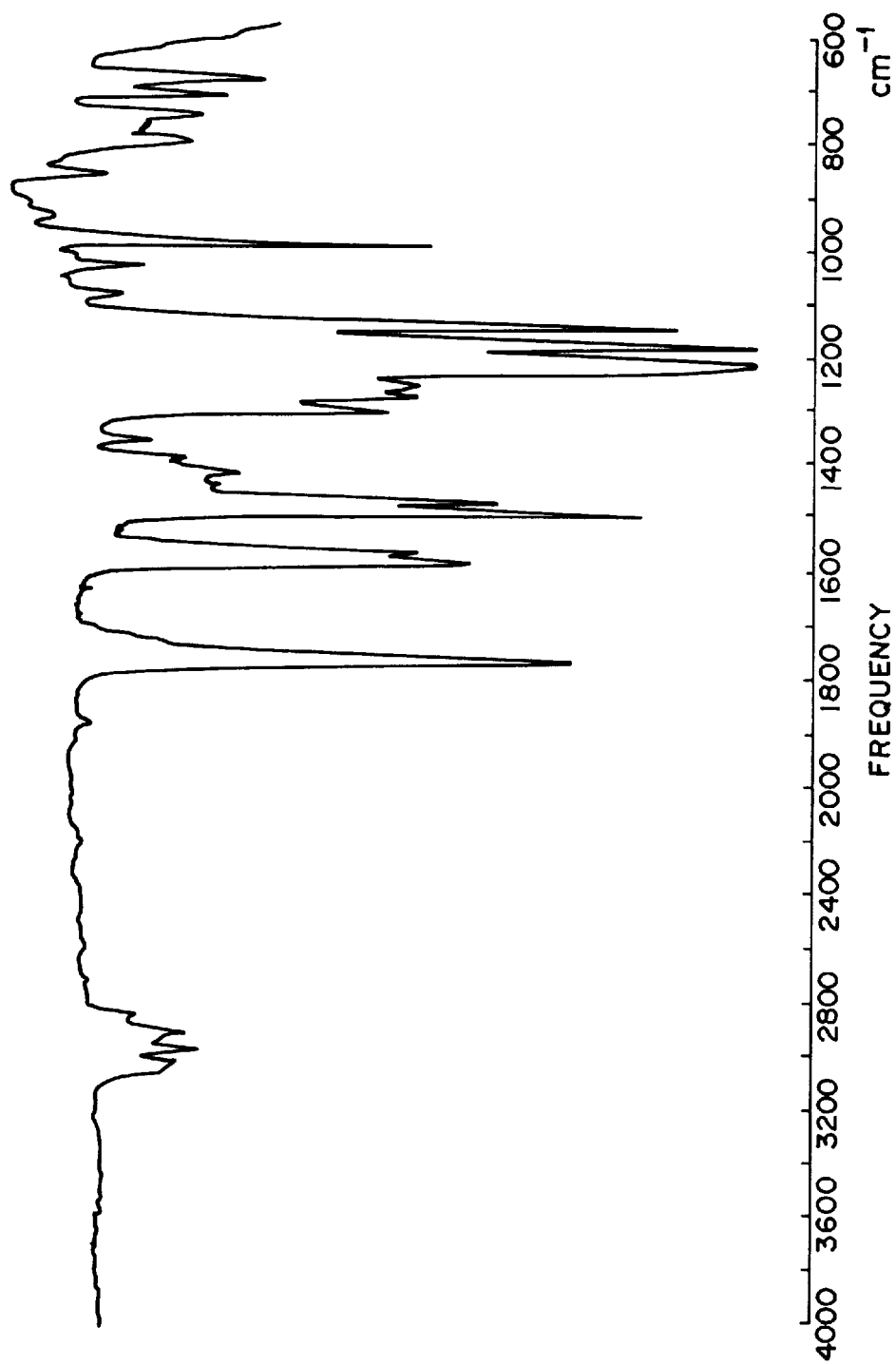
Figure 16:
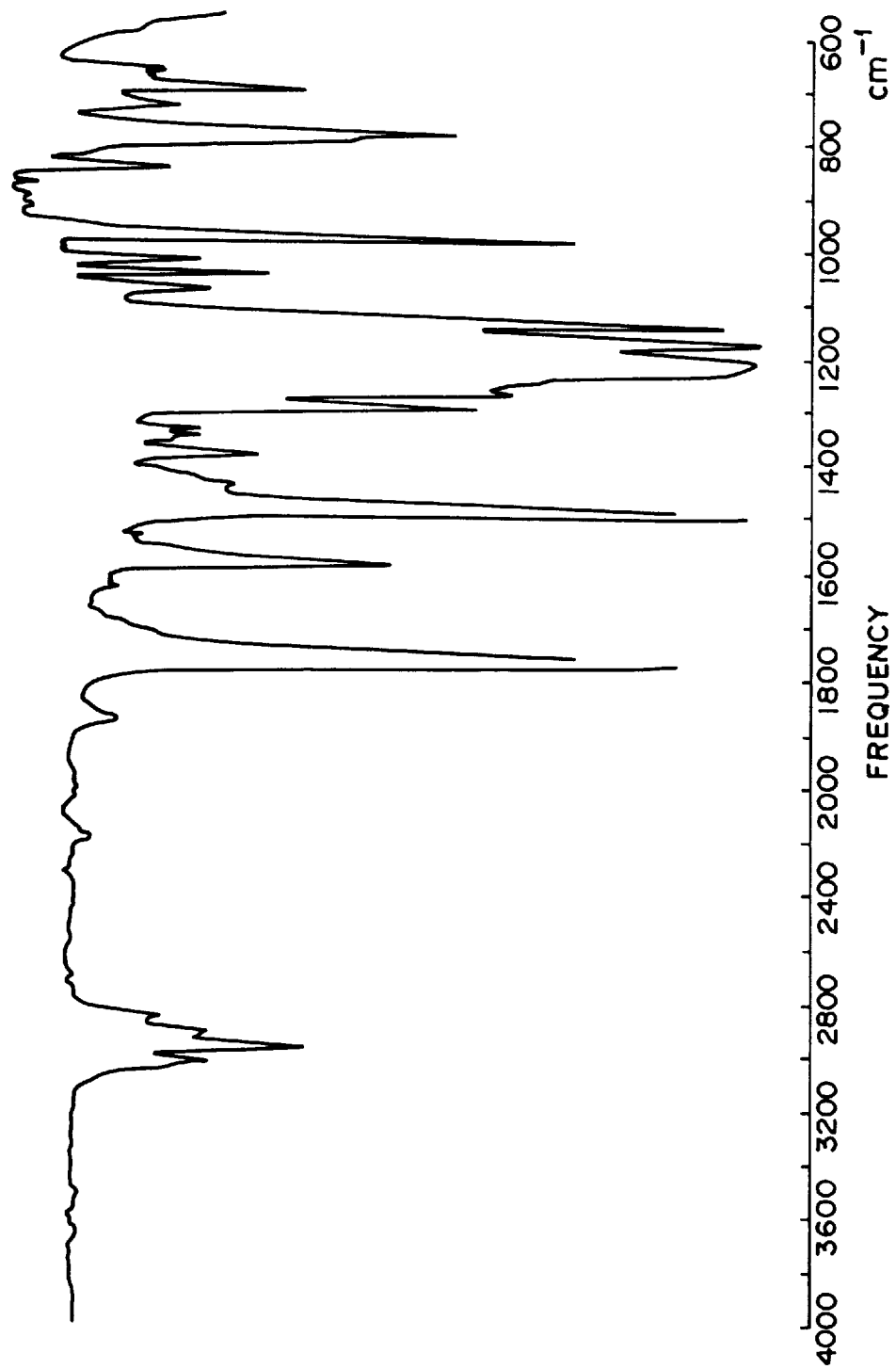
Figure 17:
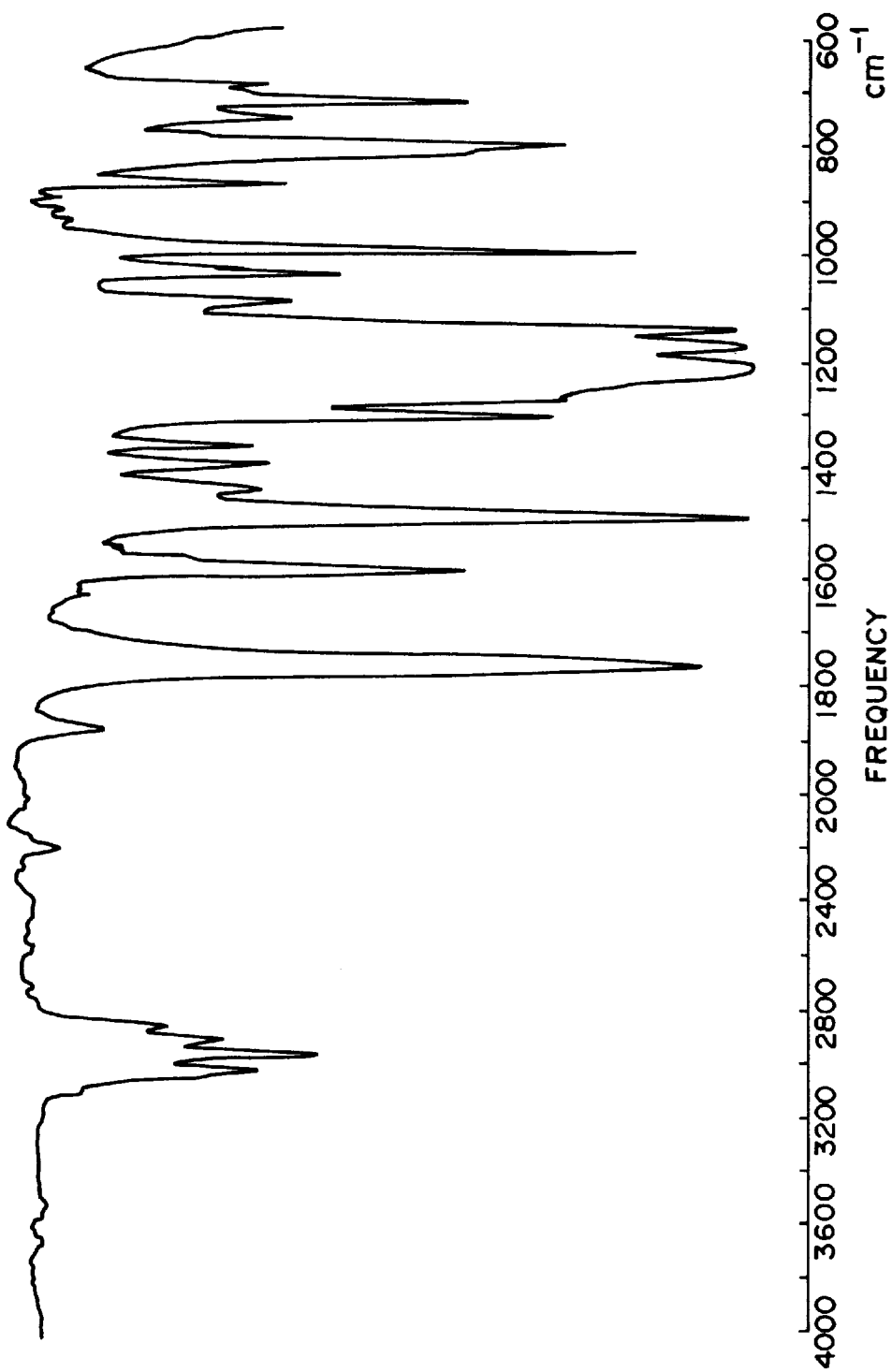
Figure 18:
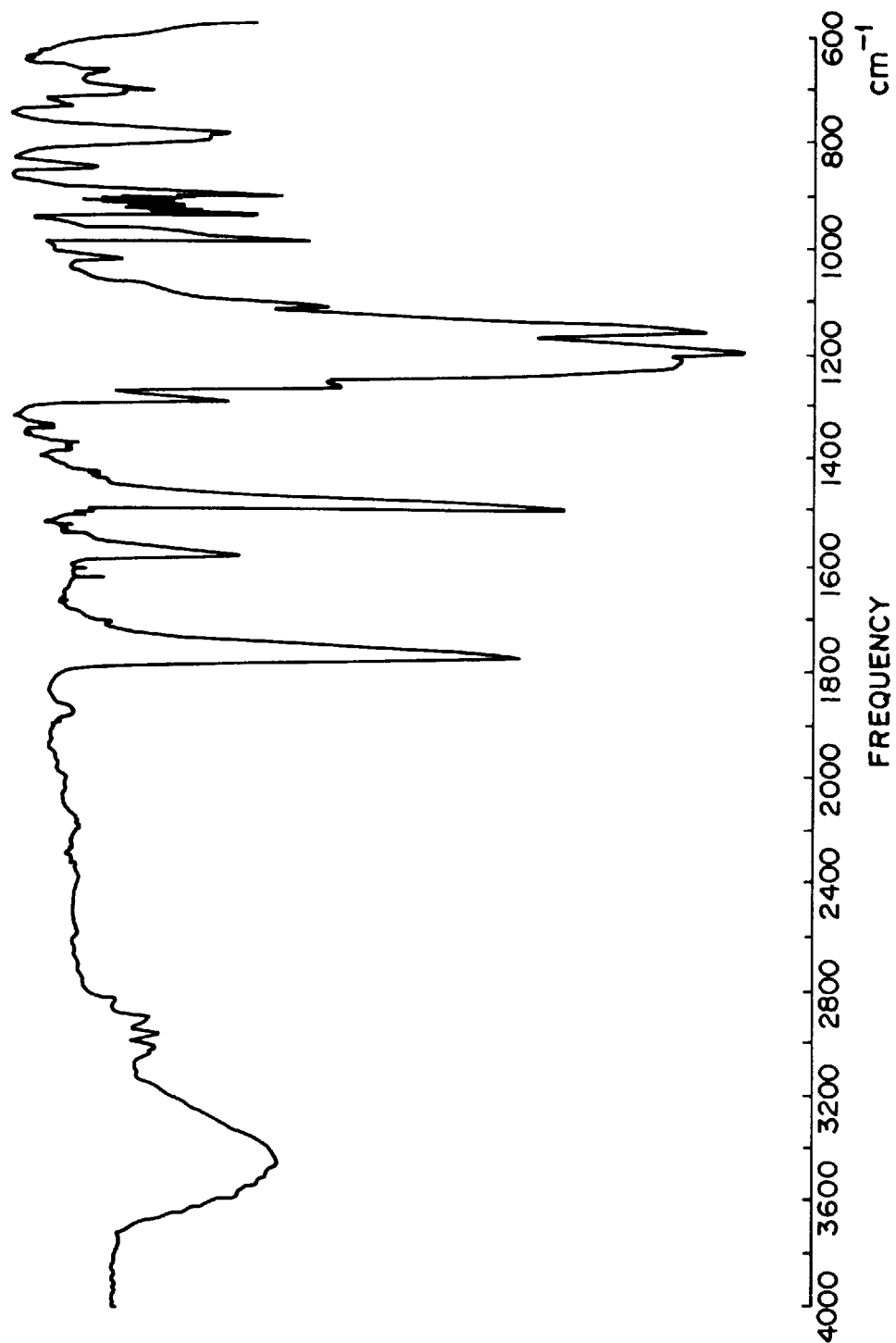
Figure 19:
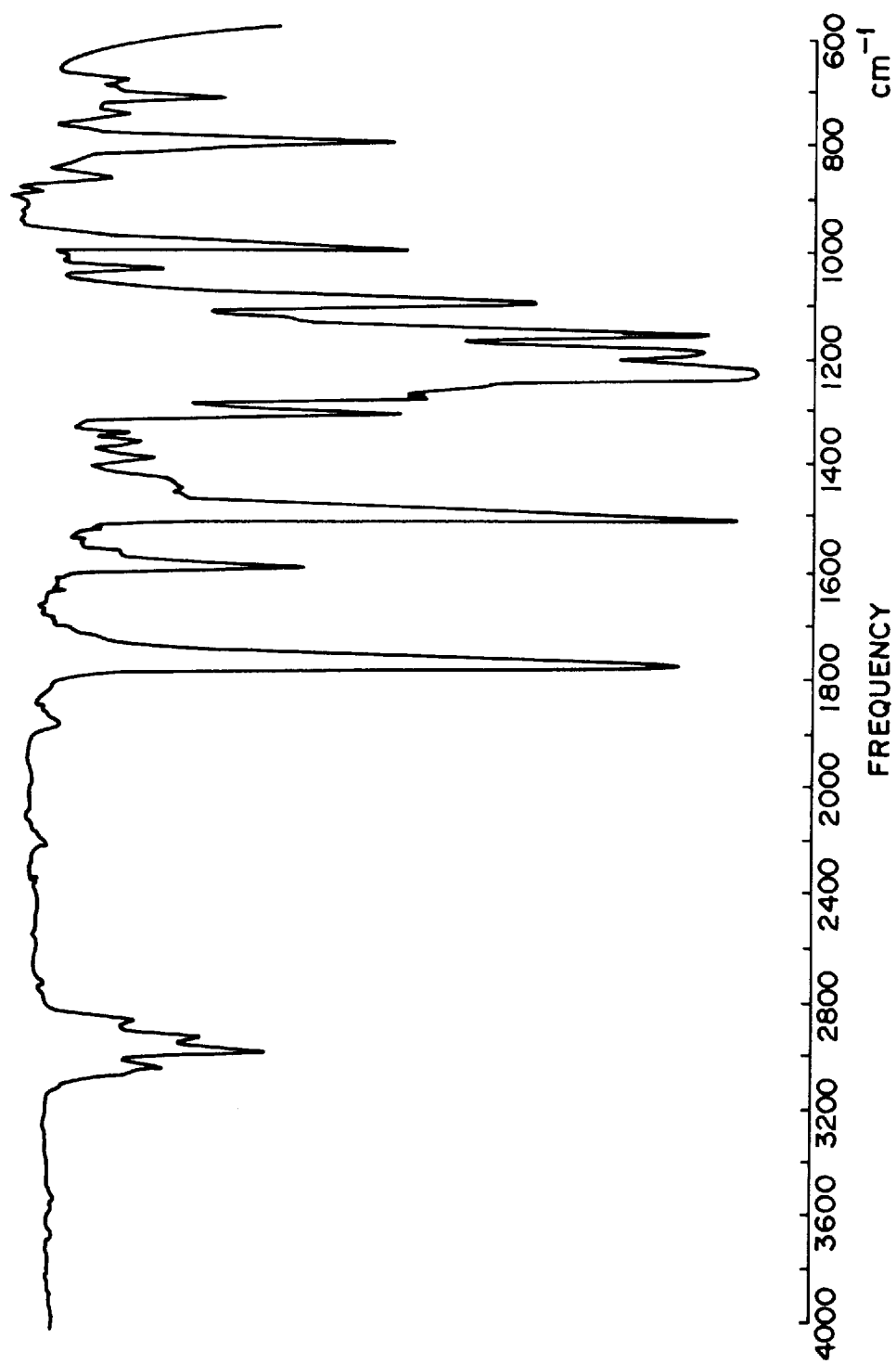
Figure 20:
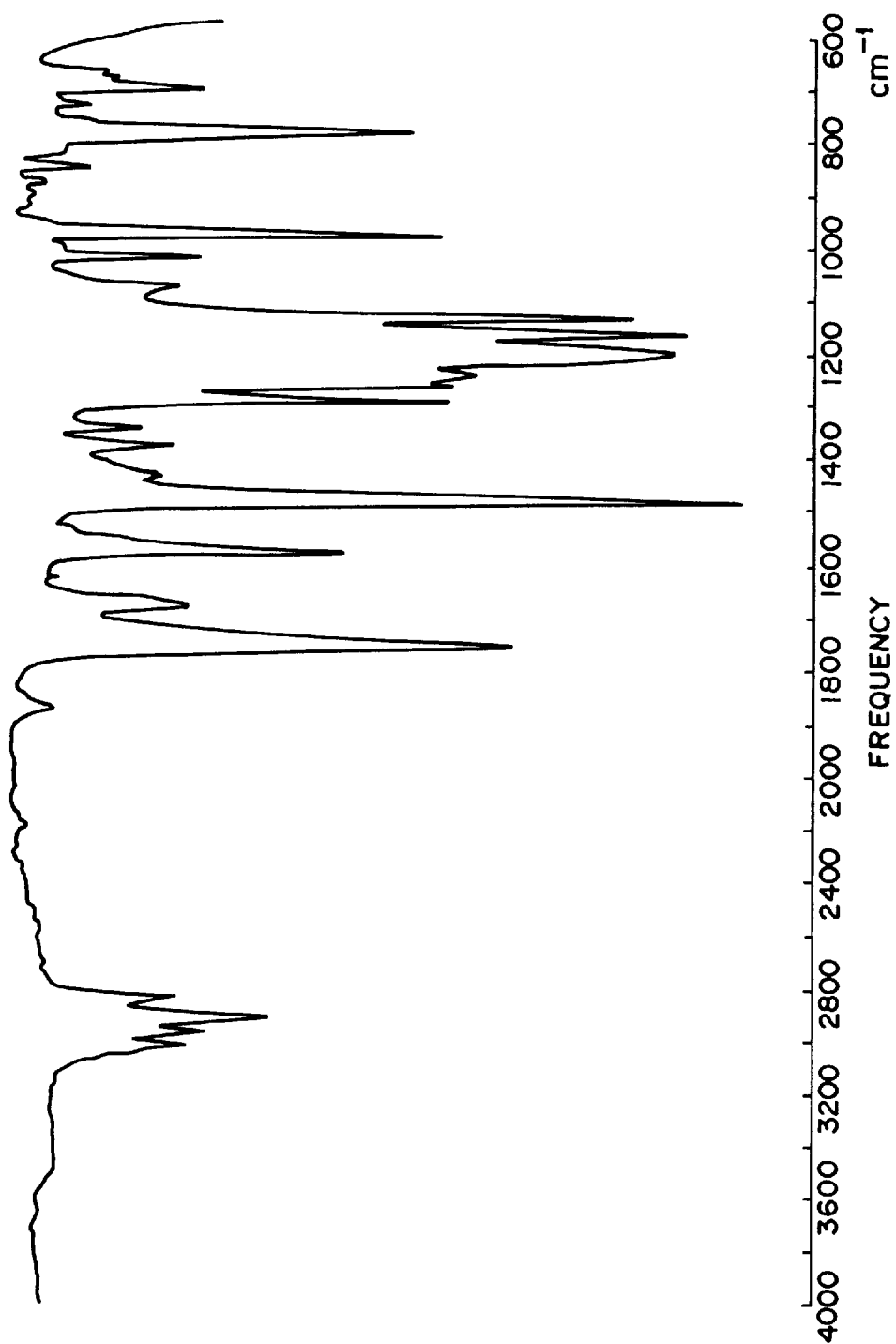

An infrared spectrum of the thus synthesized aromatic polycarbonate resin is shown in FIG. 11.

EXAMPLES 36–39

Aromatic polycarbonates with the respective repeating units, glass transition points and viscosity average molecular weights as shown in TABLE 7 were synthesized in the same manner as in the procedure for the synthesis of the aromatic polycarbonate resin in Example 33.

The infrared spectra of the thus synthesized aromatic polycarbonate resins are respectively shown in FIGS. 12–15.

EXAMPLES 40–44

Aromatic polycarbonates with the respective repeating units, glass transition points and viscosity average molecular weights as shown in TABLE 7 were synthesized in the same manner as in the procedure for the synthesis of the aromatic polycarbonate resin in Example 34.

The infrared spectra of the thus synthesized aromatic polycarbonate resins are respectively shown in FIGS. 16–20.

TABLE 7

| Ex. | Structure of Polycarbonate | Tg (° C.) | Average Molecular Weight* |
|---|---|---|---|
| 36 | | 189 | 60,500 |
| 37 | | 220 | 17,100 |
| 38 | | 226 | 23,000 |
| 39 | | 139 | 15,900 |

TABLE 7-continued

| Ex. | Structure of Polycarbonate | Tg (° C.) | Average Molecular Weight* |
|---|---|---|---|
| 40 | | 182 | 34,400 |
| 41 | | 169 | 44,900 |
| 42 | | 183 | 30,600 |
| 43 | | 162 | 36,100 |

TABLE 7-continued

| Ex. | Structure of Polycarbonate | Tg (° C.) | Average Molecular Weight* |
|---|---|---|---|
| 44 | [structure: polycarbonate with bisphenol containing triarylamine with CH₃ groups, linked to -O-C(=O)-O-C(=O)(CH₂)₁₀C(=O)-O-] | 176 | 12,600 |

*Obtained from Viscosity

COMPARATIVE EXAMPLE 9

An aromatic polycarbonate resin was synthesized from bisphenol A and phosgene by a conventional method. The specific viscosity of the thus obtained aromatic polycarbonate resin was 0.561 and the glass transition point thereof was 150° C.

The bisphenol compounds having a triarylamine structure as produced in the previously mentioned Production Examples 1 to 10 can also be employed as charge transporting materials (CGM) for use in electrophotographic photoconductors.

An application example of such a bisphenol compound as a charge transporting material for use in an electrophotographic photoconductor is demonstrated in the following Reference Example:

REFERENCE EXAMPLE

A mixture of the following components was pulverized and dispersed in a ball mill for 48 hours, whereby a charge generation layer formation liquid was prepared: formula:

The thus prepared charge generation layer formation liquid was coated by a doctor blade on the aluminum-evaporated surface of an aluminum-evaporated polyester base film, which served as an electroconductive support, and dried, whereby a charge generation layer with a thickness of 0.2 μm was formed on the aluminum-evaporated polyester base film.

A charge transport layer formation liquid was prepared by mixing 1 part by weight of bisphenol compound No. 1 in TABLE 1, 1 part by weight of a commercially available polycarbonate resin (Trademark "C-1400", made by Teijin Chemicals Ltd.), and 8 parts by weight of tetrahydrofuran.

The thus prepared charge transport layer formation liquid was coated on the aforementioned charge generation layer by a doctor blade and dried, whereby a charge transport layer with a thickness of 20 μm was formed on the charge generation layer. Thus, an electrophotographic photoconductor was fabricated.

This electrophotographic photoconductor was negatively charged in the dark under application of −5 Kv for 20 seconds and the surface potential Vm of the photoconductor

| | Parts by Weight |
|---|---|
| Azo compound of the following formula: [bis-azo compound with fluorenone core, naphthol groups, and chlorophenyl amide end groups] | 1 |
| Polyvinyl butyral resin (Trademark "XYHL", made by Union Carbide Co., Ltd.) | 1 |
| Tetrahydrofuran | 50 | was measured by a Paper Analyzer (Trademark "EPA SP-428", made by Kawaguchi Electro Works Co., Ltd.).

The photoconductor was then allowed to stand without applying any charges thereto for 20 seconds. At this moment, the initial surface potential $V_0$ of the photoconductor was measured.

The photoconductor was then illuminated by a tungsten lamp in such a manner that the illuminance on the illuminated surface of the photoconductor was 24 lux, and the exposure $E_{1/2}$ (lux seconds) required to reduce the initial surface potential $V_0$ to ½ the initial surface potential $V_0$ was measured.

Furthermore, the photoconductor was exposed to the above light of the tungsten lamp for 30 seconds, and the residual surface potential $V_{30}$ of the photoconductor was measured.

The result was that Vm was −1350 V, $E_{1/2}$ was 0.53 lux sec, and the residual surface potential $V_{30}$ was 0 V. This indicates that the bisphenol compound No. 1 in TABLE 1 serves as an excellent charge transporting material for the above electrophotographic photoconductor.

Japanese Patent Application No. 5-346500 filed on Dec. 22, 1993, Japanese Patent Application No. 5-345597 filed on Dec. 22, 1993, Japanese Patent Application No. 6-089152 filed on Apr. 4, 1994, Japanese Patent Application No. 6-180969 filed on Jul. 8, 1994 are hereby incorporated by reference.

What is claimed is:

1. An electrophotographic photoconductor comprising an electroconductive support and a photoconductive layer formed thereon, said photoconductive layer comprising a polycarbonate resin of formula (I):

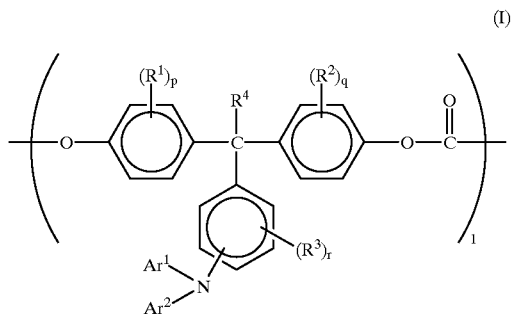

wherein $R^1$, $R^2$ and $R^3$ each independently represent a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represent an unsubstituted or substituted aryl group; and l is an integer of 5 to 10,000.

2. The electrophotographic photoconductor as claimed in Claim 1, wherein said alkyl group represented by $R^1$, $R^2$, $R^3$ or $R^4$ is a straight chain or branched alkyl group with 1 to 12 carbon atoms.

3. The electrophotographic photoconductor as claimed in Claim 2, wherein said alkyl group represented by $R^1$, $R^2$, $R^3$ or $R^4$ has a substituent selected from the group consisting of a fluorine atom, cyano group, phenyl group, a halogen atom, and a phenyl group substituted with an alkyl group having 1 to 4 carbon atoms.

4. The electrophotographic photoconductor as claimed in Claim 1, wherein said unsubstituted or substituted alkyl group represented by $R^1$, $R^2$, $R^3$ or $R^4$ is selected from the group consisting of methyl group, ethyl group, n-propyl group, i-propyl group, n-butyl group, i-butyl group, s-butyl group, t-butyl group, trifluoro-methyl group, 2-cyanoethyl group, benzyl group, 4-chlorobenzyl group, 4-methylbenzyl group, and 4-phenyl benzyl group.

5. The electrophotographic photoconductor as claimed in claim 1, wherein said aryl group represented by $R^1$, $R^2$, $R^3$, $R^4$, $Ar^1$ or $Ar^2$ is selected from the group consisting of phenyl group, naphthyl group, biphenylyl group, terphenylyl group, pyrenyl group, fluorenyl group, azurenyl group, triphenylenyl group, chrysenyl group, and anthryl group.

6. An electrophotographic photoconductor comprising an electroconductive support and a photoconductive layer formed thereon, said photoconductive layer comprising a copolymer polycarbonate resin of formula (II):

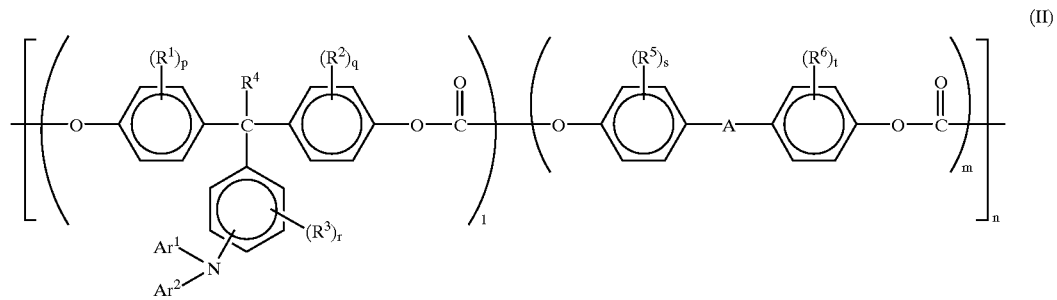

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer or 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

7. The electrophotographic photoconductor as claimed in claim 6, wherein said unsubstituted or substituted alkyl group represented by $R^1$, $R^2$, $R^3$, $R^4$, $R^5$ or $R^6$ is a straight chain or branched alkyl group with 1 to 12 carbon atoms.

8. The electrophotographic photoconductor as claimed in claim 6, wherein said alkyl group represented by $R^1$, $R^2$, $R^3$, $R^4$, $R^5$ or $R^6$ has a substituent selected from the group consisting of a fluorine atom, cyano group, phenyl group, a halogen atom, and a phenyl group substituted with an alkyl group having 1 to 4 carbon atoms.

9. The electrophotographic photoconductor as claimed in claim 6, wherein said unsubstituted or substituted alkyl group represented by $R^1$, $R^2$, $R^3$, $R^4$, $R^5$ or $R^6$ is selected from the group consisting of methyl group, ethyl group, n-propyl group, i-propyl group, n-butyl group, i-butyl group, s-butyl group, t-butyl group, trifluoro-methyl group, 2-cyanoethyl group, benzyl group, 4-chlorobenzyl group, 4-methylbenzyl group, and 4-phenyl benzyl group.

10. The electrophotographic photoconductor as claimed in claim 6, wherein said aryl group represented by $R^1$, $R^2$, $R^3$, $R^4$, $R^5$, $R^6$, $Ar^1$ or $Ar^2$ is selected from the group consisting of phenyl group, naphthyl group, biphenylyl group, terphenylyl group, pyrenyl group, fluorenyl group, azurenyl group, triphenylenyl group, chrysenyl group, and anthryl group.

13. The polycarbonate resin as claimed in claim 12, wherein said alkyl group represented by $R^1$, $R^2$, $R^3$ or $R^4$ has a substituent selected from the group consisting of a fluorine atom, cyano group, phenyl group, a halogen atom, and a phenyl group substituted with an alkyl group having 1 to 4 carbon atoms.

14. The polycarbonate resin as claimed in claim 11, wherein said unsubstituted or substituted alkyl group represented by $R^1$, $R^2$, $R^3$ or $R^4$ is selected from the group consisting of methyl group, ethyl group, n-propyl group, i-propyl group, n-butyl group, i-butyl group, s-butyl group, t-butyl group, trifluoro-methyl group, 2-cyanoethyl group, benzyl group, 4-chlorobenzyl group, 4-methylbenzyl group, and 4-phenyl benzyl group.

15. The polycarbonate resin as claimed in claim 11, wherein said aryl group represented by $R^1$, $R^2$, $R^3$, $R^4$, $Ar^1$ or $Ar^2$ is selected from the group consisting of phenyl group, naphthyl group, biphenylyl group, terphenylyl group, pyrenyl group, fluorenyl group, azurenyl group, triphenylenyl group, chrysenyl group, and anthryl group.

16. A copolymer polycarbonate resin of formula (II):

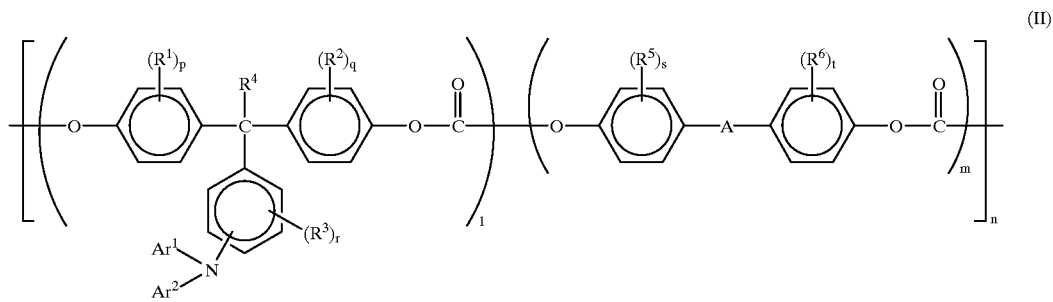

11. A polycarbonate resin of formula (I):

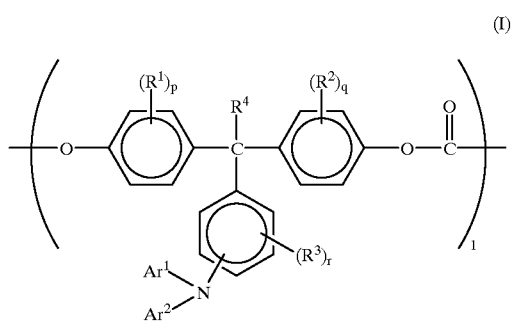

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; and l is an integer of 5 to 10,000.

12. The polycarbonate resin as claimed in claim 11, wherein said alkyl group represented by $R^1$, $R^2$, $R^3$ or $R^4$ is a straight chain or branched alkyl group with 1 to 12 carbon atoms.

wherein $R^1$, $R^2$ and $R^3$ each independently represents a hydrogen atom, an unsubstituted or substituted alkyl group, an unsubstituted or substituted aryl group, or a halogen atom; p, q and r each independently is an integer of 0 to 4; $R^4$ represents a hydrogen atom, an unsubstituted or substituted alkyl group, or an unsubstituted or substituted aryl group; $Ar^1$ and $Ar^2$ each represents an unsubstituted or substituted aryl group; l is an integer of 5 to 10,000; $R^5$ and $R^6$ each independently represents a hydrogen atom, an unsubstituted or substituted alkyl group, an unsubstituted or substituted aryl group, or a halogen atom; s and t each independently is an integer of 0 to 4; A represents a single bond, an unsubstituted or substituted straight chain, branched or cyclic bivalent hydrocarbon group, an unsubstituted or substituted arylene group, an oxide group, a sulfide group, a sulfoxide group, a sulfone group, or a ketone group; m is an integer of 5 to 10,000; and n is an integer of 5 to 10,000.

17. The copolymer polycarbonate resin as claimed in claim 16, wherein said unsubstituted or substituted alkyl group represented by $R^1$, $R^2$, $R^3$, $R^4$, $R^5$ or $R^6$ is a straight chain or branched alkyl group with 1 to 12 carbon atoms.

18. The copolymer polycarbonate resin as claimed in claim 16, wherein said alkyl group represented by $R^1$, $R^2$, $R^3$, $R^4$, $R^5$ or $R^6$ has a substituent selected from the group consisting of a fluorine atom, cyano group, phenyl group, a halogen atom, and a phenyl group substituted with an alkyl group having 1 to 4 carbon atoms.

19. The copolymer polycarbonate resin as claimed in claim 16, wherein said unsubstituted or substituted alkyl group represented by $R^1$, $R^2$, $R^3$, $R^4$, $R^5$ or $R^6$ is selected from the group consisting of methyl group, ethyl group, n-propyl group, i-propyl group, n-butyl group, i-butyl group, s-butyl group, t-butyl group, trifluoro-methyl group, 2-cyanoethyl group, benzyl group, 4-chlorobenzyl group, 4-methylbenzyl group, and 4-phenyl benzyl group.

20. The copolymer polycarbonate resin as claimed in claim 16, wherein said aryl group represented by $R^1$, $R^2$, $R^3$, $R^4$, $R^5$, $R^6$, $Ar^1$ or $Ar^2$ is selected from the group consisting of phenyl group, naphthyl group, biphenylyl group, terphenylyl group, pyrenyl group, fluorenyl group, azurenyl group, triphenylenyl group, chrysenyl group, and anthryl group.

21. An aromatic polycarbonate resin comprising a repeating unit of formula (I):

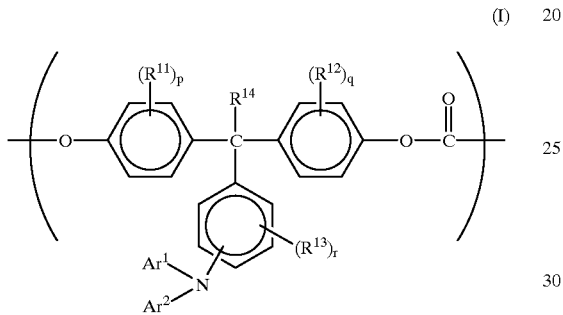

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; $Ar^1$ and $Ar^2$ each represents an unsubstituted or substituted aromatic hydrocarbon group; and a methylene chloride solution of said polycarbonate resin, which is prepared by dissolving 0.7 g of said polycarbonate resin in 100 ml of methylene chloride, having a specific viscosity in a range of 0.068 to 1.04 at 20° C.

22. An aromatic polycarbonate resin comprising:
a repeating unit of formula (I):

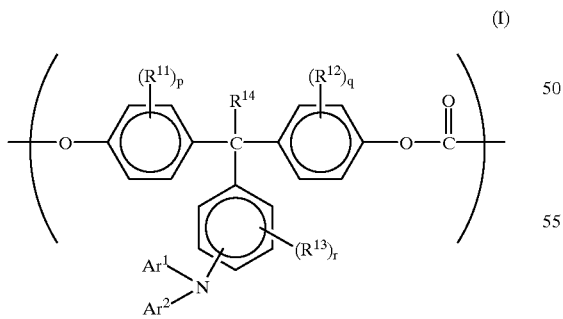

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, a hydrocarbon group; $Ar^1$ to $Ar^2$ each represents an unsubstituted or substituted aromatic hydrocarbon group; and a repeating unit of formula (II):

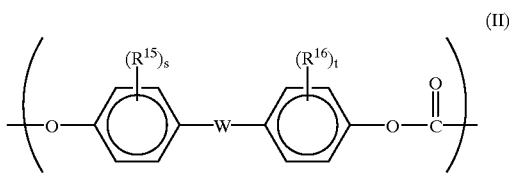

wherein $R^{15}$ and $R^{16}$ each independently represents a hydrocarbon group having 1 to 5 carbon atoms, or a halogen atom; s and t each independently is an integer of 0 to 4; W represents a single bond, a straight chain, branched or cyclic bivalent hydrocarbon group having 1 to 12 carbon atoms, optionally comprising a benzene ring therein, an oxide group, a sulfide group, a sulfoxide group, a sulfone group, or a ketone group; a methylene chloride solution of said aromatic polycarbonate resin, which is prepared by dissolving 0.7 g of said aromatic polycarbonate resin in 100 ml of methylene chloride, having a specific viscosity in a range of 0.168 to 1.04 at 20° C.

23. An electrophotographic photoconductor comprising an electroconductive support and a photoconductive layer formed thereon, said photoconductive layer comprising a polycarbonate resin of formula (I):

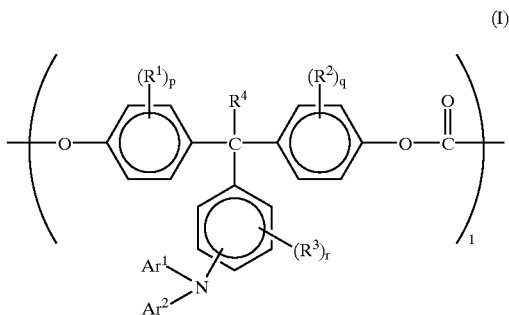

wherein $R^1$, $R^2$, $R^3$ and $R^4$ each independently represents a hydrogen atom, an unsubstituted or substituted alkyl group with 1 to 12 carbon atoms, wherein the substituents of said substituted alkyl group are selected from the group consisting of a cyano group, phenyl group, a halogen atom, and a phenyl group substituted with an alkyl group having 1 to 4 carbon atoms, an unsubstituted or substituted aryl group selected from the group consisting of a phenyl group, naphthyl group, biphenylyl group, terphenylyl group, pyrenyl group, fluorenyl group, azurenly group, triphenylenyl group, crysenyl group, and anthryl group, wherein the substituents of said substituted aryl group are as defined for the substituents of said substituted alkyl group, wherein $R^1$, $R^2$ and $R^3$ each independently also represents a halogen atom;

p, q and r each independently is an integer of 0 to 4;

$Ar^1$ and $Ar^2$ each independently represents an unsubstituted or substituted aryl group as defined for $R^1$, $R^2$, $R^3$ and $R^4$;

and l is an integer of 5 to 10,000.

24. An electrophotographic photoconductor comprising an electroconductive support and a photoconductive layer formed thereon, said photoconductive layer comprising a copolymer polycarbonate resin of formula (II)

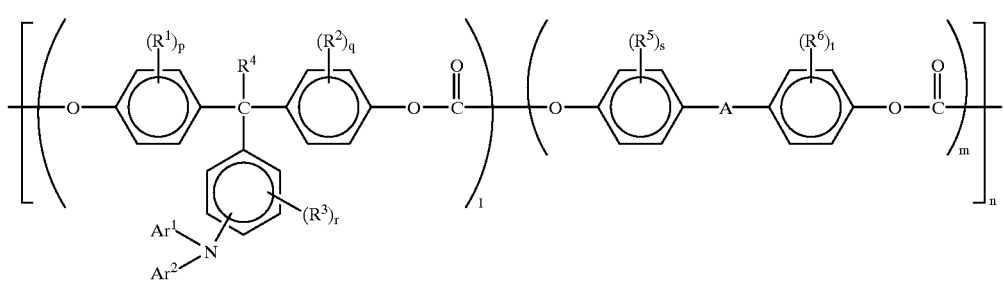

wherein $R^1$, $R^2$, $R^3$ and $R^4$ each independently represents a hydrogen atom, an unsubstituted or substituted alkyl group with 1 to 12 carbon atoms, wherein the substituents of said substituted alkyl group are selected from the group consisting of a cyano group, phenyl group, a halogen atom, and a phenyl group substituted with an alkyl group having 1 to 4 carbon atoms, an unsubstituted or substituted aryl group selected from the group consisting of a phenyl group, naphthyl group, biphenylyl group, terphenylyl group, pyrenyl group, fluorenyl group, azurenyl group, triphenylenyl group, crysenyl group, and anthryl group, wherein the substituents of said substituted aryl group are as defined for the substituents of said substituted alkyl group, wherein $R^1$, $R^2$ and $R^3$ each independently also represents a halogen atom;

p, q and r each independently is an integer of 0 to 4;

$Ar^1$ and $Ar^2$ each independently represents an unsubstituted or substituted aryl group as defined for $R^1$, $R^2$, $R^3$ and $R^4$;

and l is an integer of 5 to 10,000;

$R^5$ and $R^6$ each independently represents a hydrogen atom, an unsubstituted or substituted alkyl group, an unsubstituted or substituted aryl group as defined for $R^1$, $R^2$, $R^3$ and $R^4$, or a halogen atom;

s and t each independently is an integer of 0 to 4;

A represents a single bond, an unsubstituted or substituted straight chain, branched or cyclic bivalent hydrocarbon group, an unsubstituted or substituted arylene group, wherein the substituents are defined as for $R^1$, $R^2$, $R^3$ and $R^4$, and oxide group, a sulfide group, a sulfoxide group, a sulfone group, or a ketone group;

m is an integer of 5 to 10,000; and n is an integer of 5 to 10,000.

25. A polycarbonate resin of formula (I):

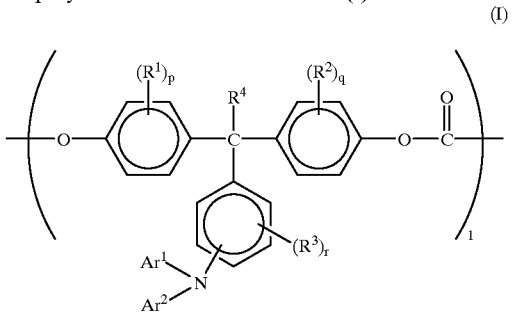

wherein $R^1$, $R^2$, $R^3$ and $R^4$ each independently represents a hydrogen atom, an unsubstituted or substituted alkyl group with 1 to 12 carbon atoms, wherein the substituents of said substituted alkyl group are selected from the group consisting of a cyano group, a phenyl group, a halogen atom, and a phenyl group substituted with an alkyl group having 1 to 4 carbon atoms, an unsubstituted or substituted aryl group selected from the group consisting of phenyl group, naphthyl group, biphenylyl group, terphenylyl group, pyrenyl group, fluorenyl group, azurenyl group, triphenylenyl group, crysenyl group, and anthryl group, wherein the substituents of said substituted aryl group are as defined for the substituents of said substituted alkyl group, wherein $R^1$, $R^2$ and $R^3$ each independently also represents a halogen atom;

p, q and r each independently is an integer of 0 to 4;

$Ar^1$ and $Ar^2$ each represents an unsubstituted or substituted aryl group as defined for $R^1$, $R^2$, $R^3$ and $R^4$; and l is an integer of 5 to 10,000.

26. A copolymer polycarbonate resin of formula (II):

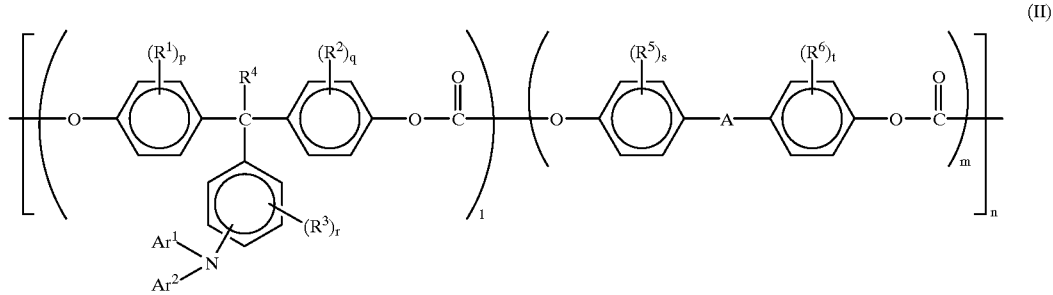

wherein $R^1$, $R^2$, $R^3$ and $R^4$ each independently represents a hydrogen atom, an unsubstituted or substituted alkyl group with 1 to 12 carbon atoms, wherein the substituents of said substituted alkyl group are selected from the group consisting of a cyano group, a phenyl group, a halogen atom, and a phenyl group substituted with an alkyl group having 1 to 4 carbon atoms, an unsubstituted or substituted aryl group selected from the group consisting of phenyl group, naphthyl group, biphenylyl group, terphenylyl group, pyrenyl group, fluorenyl group, azurenyl group, triphenylenyl group, crysenyl group, and anthryl group wherein the substituents of said substituted aryl group are as defined for the substituents of said substituted alkyl group, wherein $R^1$, $R^2$ and $R^3$ each independently also represents a halogen atom;

p, q and r each independently is an integer of 0 to 4;

$Ar^1$ and $Ar^2$ each independently represents an unsubstituted or substituted aryl group as defined for $R^1$, $R^2$, $R^3$ and $R^4$;

l is an integer of 5 to 10,000;

$R^5$ and $R^6$ each independently represents a hydrogen atom, an unsubstituted or substituted alkyl group, an unsubstituted or substituted aryl group as defined for $R^1$, $R^2$, $R^3$ and $R^4$, or a halogen atom;

s and t each independently is an integer of 0 to 4;

A represents a single bond, an unsubstituted or substituted straight chain, branched or cyclic bivalent hydrocarbon group, an unsubstituted or substituted arylene group, wherein the substituents are defined as for $R^1$, $R^2$, $R^3$ and $R^4$, an oxide group, a sulfide group, a sulfoxide group, a sulfone group, or a ketone group;

m is an integer of 5 to 10,000; and n is an integer of 5 to 10,000.

27. An aromatic polycarbonate resin comprising a repeating unit of formula (I):

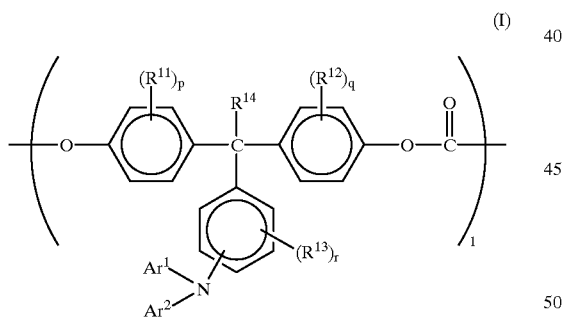

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, an alkyl group with 1 to 12 carbon atoms, an unsubstituted or substituted aromatic hydrocarbon group selected from the group consisting of a phenyl group, naphthyl group, biphenylyl group, terphenylyl group, pyrenyl group, fluorenyl group, azurenyl group, triphenylenyl group, crysenyl group, and anthryl group, wherein the substituents of said substituted aromatic hydrocarbon group are selected from the group consisting of a cyano group, phenyl group, a halogen atom, and a phenyl group substituted with an alkyl group having 1 to 4 carbon atoms;

and a methylene chloride solution of said polycarbonate resin, which is prepared by dissolving 0.7 g of said polycarbonate resin in 100 ml of methylene chloride, having a specific viscosity in a range of 0.068 to 1.04 at 20° C.

28. An aromatic polycarbonate resin comprising:

a repeating unit of formula (I):

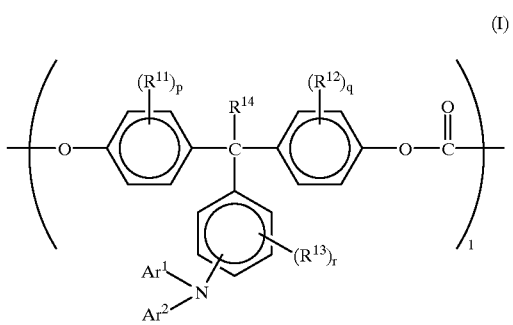

wherein $R^{11}$, $R^{12}$ and $R^{13}$ each independently represents a hydrocarbon group having 1 to 5 carbon atoms, or a halogen atom; p, q and r each independently is an integer of 0 to 4; $R^{14}$ represents a hydrogen atom, an alkyl group with 1 to 12 carbon atoms, an unsubstituted or substituted aromatic hydrocarbon group selected from the group consisting of a phenyl group, naphthyl group, biphenylyl group, terphenylyl group, pyrenyl group, fluorenyl group, azurenyl group, triphenylenyl group, crysenyl group, and anthryl group, wherein the substituents of said substituted aromatic hydrocarbon group are selected from the group consisting of a cyano group, phenyl group, a halogen atom, and a phenyl group substituted with an alkyl group having 1 to 4 carbon atoms; and a repeating unit of the formula (II):

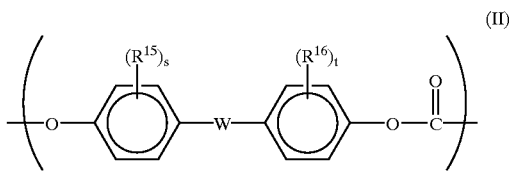

wherein $R^{15}$ and $R^{16}$ each independently represents a hydrocarbon group having 1 to 5 carbon atoms, or a halogen atom; s and t each independently is an integer of 0 to 4; W represents a single bond, a straight chain, branched or cyclic bivalent hydrocarbon group having 1 to 12 carbon atoms, optionally comprising a benzene ring therein, an oxide group, a sulfide group, a sulfoxide group, a sulfone group, or a ketone group; and a methylene chloride solution of said aromatic polycarbonate resin, which is prepared by dissolving 0.7 g of said aromatic polycarbonate resin in 100 ml of methylene chloride, having a specific viscosity in a range of 0.168 to 1.04 at 20° C.

* * * * *

UNITED STATES PATENT AND TRADEMARK OFFICE
CERTIFICATE OF CORRECTION

PATENT NO.   : 6,093,784
DATED        : July 25, 2000
INVENTOR(S)  : Hiroshi Tamura et al.

It is certified that error appears in the above-identified patent and that said Letters Patent is hereby corrected as shown below:

Column 10,
Formula I,

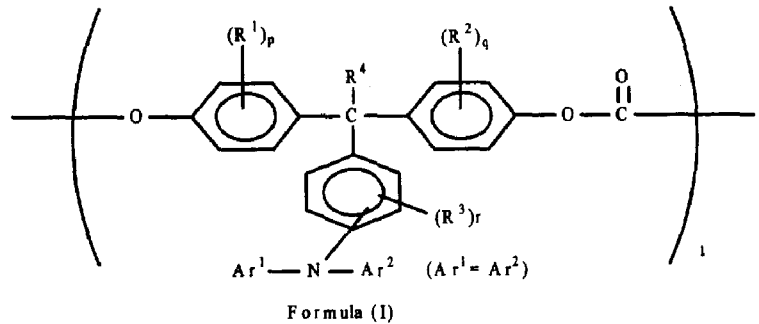

should read,
--

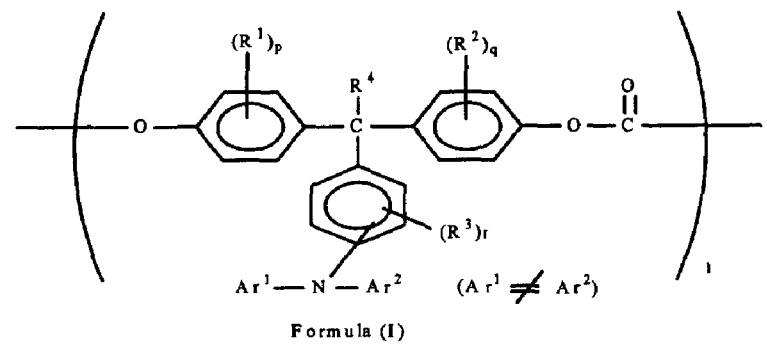

Column 11,
Formula I,

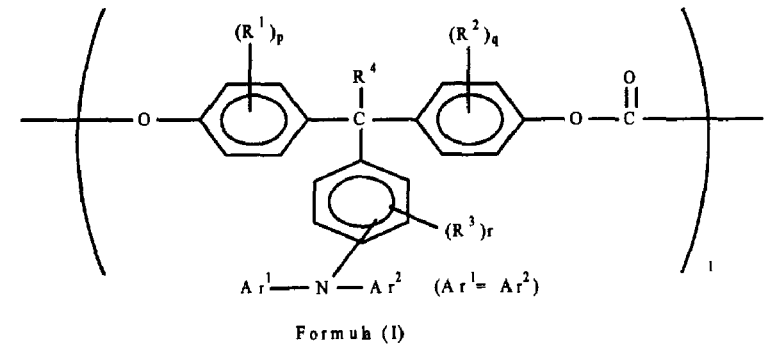

UNITED STATES PATENT AND TRADEMARK OFFICE
CERTIFICATE OF CORRECTION

PATENT NO. : 6,093,784
DATED : July 25, 2000
INVENTOR(S) : Hiroshi Tamura et al.

It is certified that error appears in the above-identified patent and that said Letters Patent is hereby corrected as shown below:

should read,
--

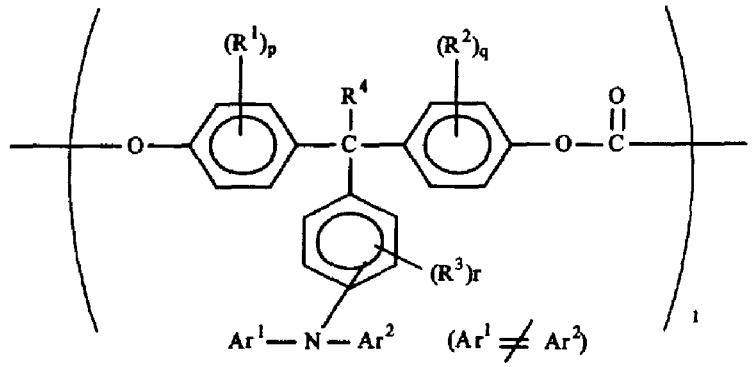

Formula (I)

Column 27,
Table 2-continued,

| No. | Monomer for Copolymerization | Monomer No. in TABLE 1 | Copolymerization Ratio (Wt) |
|---|---|---|---|
| 9 | HO—⌬—C(cyclohexyl)—⌬—OH | 4 | 1:1 |
| 10 | HO—⌬—C(cyclohexyl)—⌬—OH | 6 | 1:1 |
| 11 | HO—⌬—C(CF$_3$)(CF$_3$)—⌬—OH | 3 | 1:1 |

--

UNITED STATES PATENT AND TRADEMARK OFFICE
CERTIFICATE OF CORRECTION

PATENT NO. : 6,093,784
DATED : July 25, 2000
INVENTOR(S) : Hiroshi Tamura et al.

It is certified that error appears in the above-identified patent and that said Letters Patent is hereby corrected as shown below:

should read
--

TABLE 2-continued

| No. | Monomer for Copolymerization | Monomer No. in TABLE 1 | Copolymerization Ratio (Wt) |
|---|---|---|---|
| 9 | 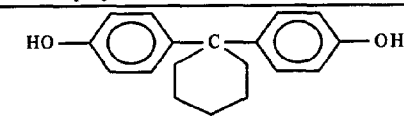 | 4 | 1:1 |
| 10 | 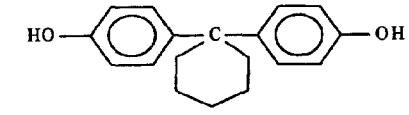 | 6 | 1:1 |
| 11 | 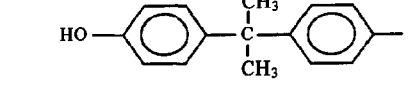 | 3 | 1:1 |

--

Column 33,
Line 32, "elute" should read -- eluted --.

Signed and Sealed this

Eleventh Day of June, 2002

*Attest:*

JAMES E. ROGAN
*Attesting Officer*    *Director of the United States Patent and Trademark Office*